US012739360B2

(12) United States Patent
Kim

(10) Patent No.: US 12,739,360 B2
(45) **Date of Patent: *Sep. 15, 2026**

(54) METHOD AND APPARATUS FOR ENCODING/DECODING IMAGES

(71) Applicant: B1 INSTITUTE OF IMAGE TECHNOLOGY, INC., Seoul (KR)

(72) Inventor: Ki Baek Kim, Daejeon (KR)

(73) Assignee: B1 INSTITUTE OF IMAGE TECHNOLOGY, INC., Seoul (KR)

( * ) Notice: Subject to any disclaimer, the term of this patent is extended or adjusted under 35 U.S.C. 154(b) by 23 days.

This patent is subject to a terminal disclaimer.

(21) Appl. No.: 18/923,651

(22) Filed: Oct. 22, 2024

(65) Prior Publication Data

US 2025/0047839 A1 Feb. 6, 2025

Related U.S. Application Data

(63) Continuation of application No. 18/499,652, filed on Nov. 1, 2023, now Pat. No. 12,250,369, which is a continuation of application No. 18/193,738, filed on Mar. 31, 2023, now Pat. No. 12,101,469, which is a continuation of application No. 16/973,145, filed as (Continued)

(30) Foreign Application Priority Data

Jun. 25, 2018 (KR) ........................ 10-2018-0072560
Jun. 30, 2018 (KR) ........................ 10-2018-0076178
Jul. 2, 2018 (KR) ........................ 10-2018-0076784

(51) Int. Cl.

| | |
|---|---|
| ***H04N 19/105*** | (2014.01) |
| ***H04N 19/117*** | (2014.01) |
| ***H04N 19/159*** | (2014.01) |
| ***H04N 19/176*** | (2014.01) |
| ***H04N 19/182*** | (2014.01) |

(52) U.S. Cl.

CPC ......... *H04N 19/105* (2014.11); *H04N 19/117* (2014.11); *H04N 19/159* (2014.11); *H04N 19/176* (2014.11); *H04N 19/182* (2014.11)

(58) Field of Classification Search

CPC ........................... H04N 19/105; H04N 19/117

See application file for complete search history.

(56) References Cited

U.S. PATENT DOCUMENTS 8,982,957 B2 * 3/2015 Oh ....................... H04N 19/117
375/240.12
9,351,012 B2 * 5/2016 Oh ....................... H04N 19/635

(Continued)

FOREIGN PATENT DOCUMENTS

CN 102474617 A 5/2012
KR 10-2014-0057516 A 5/2014

(Continued)

*Primary Examiner* — Irfan Habib

(74) *Attorney, Agent, or Firm* — NSIP Law

(57) ABSTRACT

A method and apparatus for encoding/decoding images according to the present invention may configure a prediction mode candidate group on a screen of a target block, determine a reference pixel for a prediction mode on the screen of the target block, perform at least one of filtering and interpolation on the reference pixel, and perform prediction on the screen of the target block on the basis of the prediction mode candidate group on the screen and the reference pixel.

6 Claims, 15 Drawing Sheets

Related U.S. Application Data application No. PCT/KR2019/007653 on Jun. 25, 2019, now Pat. No. 11,647,179.

(56) References Cited

U.S. PATENT DOCUMENTS

| | | | | |
|---|---|---|---|---|
| 9,654,802 | B2 * | 5/2017 | Wang | H04N 19/70 |
| 10,212,449 | B2 * | 2/2019 | Oh | H04N 19/105 |
| 11,968,375 | B2 * | 4/2024 | Wang | H04N 19/105 |
| 2013/0215960 | A1 * | 8/2013 | Song | H04N 19/176 375/240.03 |
| 2014/0086311 | A1 * | 3/2014 | Lou | H04N 19/30 375/240.03 |
| 2014/0376631 | A1 * | 12/2014 | Sato | H04N 19/176 375/240.12 |
| 2015/0208090 | A1 | 7/2015 | Sakakibara et al. | |
| 2015/0271498 | A1 * | 9/2015 | Wang | H04N 19/60 375/240.02 |
| 2015/0373348 | A1 * | 12/2015 | Wang | H04N 19/31 375/240.02 |
| 2016/0080745 | A1 * | 3/2016 | Kwak | H04N 19/593 375/240.12 |
| 2019/0052910 | A1 * | 2/2019 | Deshpande | H04N 19/423 |
| 2019/0082184 | A1 * | 3/2019 | Hannuksela | H04N 13/15 |
| 2019/0089976 | A1 * | 3/2019 | Huang | H04N 19/176 |
| 2019/0141318 | A1 * | 5/2019 | Li | H04N 19/159 |
| 2019/0208198 | A1 * | 7/2019 | Pettersson | H04N 19/159 |
| 2019/0238835 | A1 * | 8/2019 | Lee | H04N 19/119 |
| 2020/0077086 | A1 * | 3/2020 | Lee | H04N 19/105 |
| 2020/0107027 | A1 * | 4/2020 | He | H04N 19/33 |

FOREIGN PATENT DOCUMENTS

| | | | |
|---|---|---|---|
| KR | 10-2017-0065686 | A | 6/2017 |
| KR | 10-1772851 | B1 | 8/2017 |
| KR | 10-2017-0120538 | A | 10/2017 |
| KR | 10-2018-0001479 | A | 1/2018 |
| KR | 10-1844698 | B1 | 4/2018 |
| WO | WO 2017/222326 | A1 | 12/2017 |

* cited by examiner

FIG. 10

A
B
C
D
E
J
K
F
G
H
I
L
M
N
Q
R
O
P
S
CTU
$CU_1$
$CU_2$
$CU_3$
$CU_4$

FIG. 15

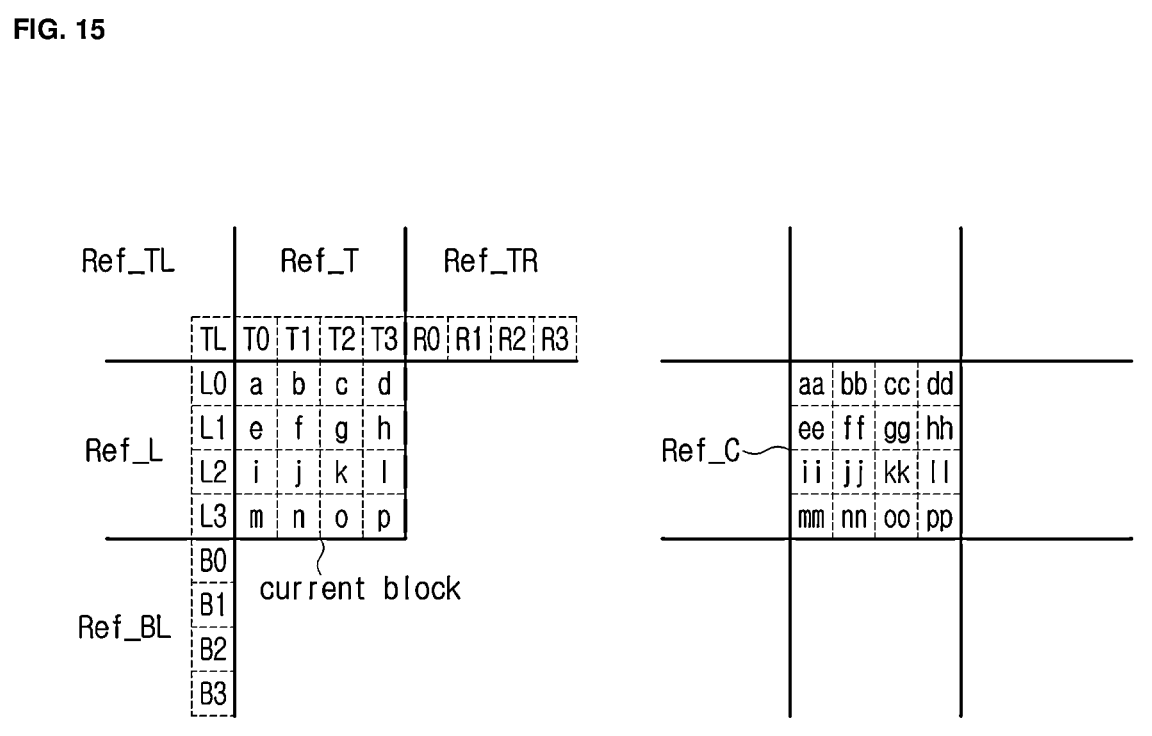

Ref_TL
Ref_T
Ref_TR
TL T0 T1 T2 T3 R0 R1 R2 R3
L0 a b c d
L1 e f g h
L2 i j k l
L3 m n o p
Ref_L
B0
B1
B2
B3
Ref_BL
current block aa bb cc dd
ee ff gg hh
ii jj kk ll
mm nn oo pp
Ref_C

METHOD AND APPARATUS FOR ENCODING/DECODING IMAGES

CROSS-REFERENCE TO RELATED APPLICATIONS

This application is a continuation of application Ser. No. 18/499,652 filed on Nov. 1, 2023, which is a continuation of application Ser. No. 18/193,738 filed on Mar. 31, 2023, now U.S. Pat. No. 12,101,469, which is a continuation of application Ser. No. 16/973,145 filed on Dec. 8, 2020, now U.S. Pat. No. 11,647,179, which is a U.S. national stage application of International Application No. PCT/KR2019/007653 filed on Jun. 25, 2019, which claims the benefit under 35 USC 119(a) and 365(b) of Korean Patent Application No. 10-2018-0072560 filed on Jun. 25, 2018, Korean Patent Application No. 10-2018-0076178 filed on Jun. 30, 2018, and Korean Patent Application No. 10-2018-0076784 filed on Jul. 2, 2018 in the Korean Intellectual Property Office, the entire disclosures of which are incorporated herein by reference for all purposes.

TECHNICAL FIELD

The present disclosure relates to a technique of encoding and decoding an image, and more particularly, to a method and apparatus for performing encoding/decoding in intra-prediction.

BACKGROUND ART

Along with the widespread use of the Internet and portable terminals and the development of information and communication technology, multimedia data is increasingly being used. Accordingly, in order to provide various services or perform various tasks through image prediction in various systems, there is a pressing need for improving the performance and efficiency of an image processing system. However, research and development achievements are yet to catch up with the trend.

As such, an existing method and apparatus for encoding/decoding an image needs performance improvement in image processing, particularly in image encoding or image decoding.

DISCLOSURE

Technical Problem

An object of the present invention is to provide an intra prediction method.

In addition, the present invention provides a method and an apparatus for constructing a reference pixel for intra prediction.

It is also an object of the present invention to provide a method and an apparatus for performing reference pixel filtering and interpolation.

In addition, the present invention provides a method and an apparatus for constructing an intra prediction mode candidate group.

In addition, the present invention provides a method and an apparatus for intra prediction in sub-block units.

Technical Solution

An image encoding/decoding method and apparatus according to the present invention constructs an intra prediction mode candidate group of a target block, determines a reference pixel for the intra prediction mode of the target block, performs at least one of filtering or interpolation on the reference pixel, and performs intra prediction of the target block based on the intra prediction mode candidate group and the reference pixel.

In the image encoding/decoding method and apparatus according to the present invention, the filtering may be selectively performed based on at least one of a size, a shape, a position, a color component, a reference pixel line, whether to apply intra prediction in sub-block units, or an intra prediction mode of the target block.

In the image encoding/decoding method and apparatus according to the present invention, when the intra prediction mode of the target block is a diagonal mode, the filtering may be performed, otherwise, the filtering may not be performed.

In the image encoding/decoding method and apparatus according to the present invention, the diagonal mode may include at least one of a first mode referring only to pixels of an integer unit or a second mode referring to pixels of a fractional unit.

In the image encoding/decoding method and apparatus according to the present invention, when the intra prediction mode of the target block is a first mode that refers only to pixels of an integer unit, interpolation may not be performed on the reference pixel, and when the intra prediction mode of the target block is a second mode that refers to pixels of a fractional unit, interpolation may be performed on the reference pixel.

In the image encoding/decoding method and apparatus according to the present invention, the reference pixel may be located on at least one of a plurality of reference pixel lines adjacent to the target block.

In the image encoding/decoding method and apparatus according to the present invention, the intra prediction mode candidate group may include at least one priority assignment mode or a predetermined most probable mode (MPM).

In the image encoding/decoding method and apparatus according to the present invention, the priority assignment mode may include at least one of a planar mode, a DC mode, a vertical mode, or a horizontal mode.

In the image encoding/decoding method and apparatus according to the present invention, the intra prediction may be performed in units of sub-blocks constituting the target block.

Advantageous Effects

In the case of using the intra prediction method according to the present invention as described above, the intra prediction mode candidate group can be efficiently constructed to induce reduction of bits representing the prediction mode of the target block, thereby improving encoding performance.

According to the present invention, encoding performance may be improved through the configuration of filtered or interpolated reference pixels.

According to the present invention, encoding performance can be improved through intra prediction in units of sub-blocks.

DESCRIPTION OF DRAWINGS

FIG. 10 is an exemplary diagram of division obtained based on QT, BT, and TT.

FIG. 15 is a conceptual diagram illustrating a target block for intra-prediction and blocks neighboring to the target block.

BEST MODE

Figure 1:
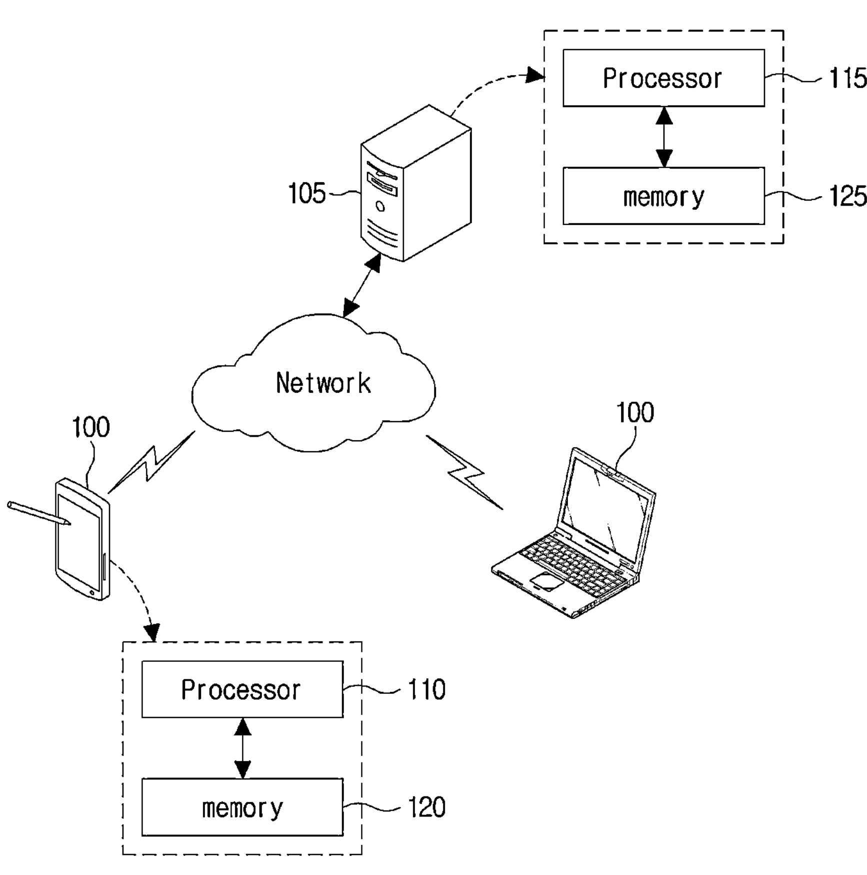
FIG. 1 is a conceptual diagram illustrating an image encoding and decoding system according to an embodiment of the present disclosure.

An image encoding/decoding method and apparatus according to the present invention configures an intra prediction mode candidate group of a target block, determines a reference pixel for the intra prediction mode of the target block, performs at least one of filtering or interpolation on the reference pixel, and performs intra prediction of the target block based on the intra prediction mode candidate group and the reference pixel.

In the image encoding/decoding method and apparatus according to the present invention, the filtering may be selectively performed based on at least one of a size, a shape, a position, a color component, a reference pixel line, whether to apply intra prediction in sub-block units, or an intra prediction mode of the target block.

In the image encoding/decoding method and apparatus according to the present invention, when the intra prediction mode of the target block is a diagonal mode, the filtering may be performed, otherwise, the filtering may not be performed.

In the image encoding/decoding method and apparatus according to the present invention, the diagonal mode may include at least one of a first mode referring only to pixels of an integer unit or a second mode referring to pixels of a fractional unit.

In the image encoding/decoding method and apparatus according to the present invention, when the intra prediction mode of the target block is a first mode that refers only to pixels of an integer unit, interpolation may not be performed on the reference pixel, and when the intra prediction mode of the target block is a second mode that refers to pixels of a fractional unit, interpolation may be performed on the reference pixel.

In the image encoding/decoding method and apparatus according to the present invention, the reference pixel may be located on at least one of a plurality of reference pixel lines adjacent to the target block.

In the image encoding/decoding method and apparatus according to the present invention, the intra prediction mode candidate group may include at least one priority assignment mode or a predetermined most probable mode (MPM).

In the image encoding/decoding method and apparatus according to the present invention, the priority assignment mode may include at least one of a planar mode, a DC mode, a vertical mode, or a horizontal mode.

In the image encoding/decoding method and apparatus according to the present invention, the intra prediction may be performed in units of sub-blocks constituting the target block.

MODE FOR INVENTION

The present disclosure may be subject to various modifications and have various embodiments. Specific embodiments of the present disclosure will be described with reference to the accompanying drawings. However, the embodiments are not intended to limit the technical scope of the present disclosure, and it is to be understood that the present disclosure covers various modifications, equivalents, and alternatives within the scope and idea of the present disclosure.

The terms as used in the disclosure, first, second, A, and B may be used to describe various components, not limiting the components. These expressions are used only to distinguish one component from another component. For example, a first component may be referred to as a second component and vice versa without departing from the scope of the present disclosure. The term and/or covers a combination of a plurality of related items or any one of the plurality of related items.

When it is said that a component is "connected to" or "coupled with/to" another component, it should be understood that the one component is connected to the other component directly or through any other component. On the other hand, when it is said that a component is "directly connected to" or "directly coupled to" another component, it should be understood that there is no other component between the components.

The terms as used in the present disclosure are provided to describe merely specific embodiments, not intended to limit the present disclosure. Singular forms include plural referents unless the context clearly dictates otherwise. In the present disclosure, the term "include" or "have" signifies the presence of a feature, a number, a step, an operation, a component, a part, or a combination thereof, not excluding the presence or addition of one or more other features, numbers, steps, operations, components, parts, or a combination thereof.

Unless otherwise defined, the terms including technical or scientific terms used in the disclosure may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings.

Typically, an image may include one or more color spaces according to its color format. The image may include one or more pictures of the same size or different sizes. For example, the YCbCr color configuration may support color formats such as 4:4:4, 4:2:2, 4:2:0, and monochrome (composed of only Y). For example, YCbCr 4:2:0 may be composed of one luminance component (Y in this example) and two chrominance components (Cb and Cr in this example). In this case, the configuration ratio of the chrominance component and the luminance component may have 1:2 width-height. For example, in case of 4:4:4, it may have the same configuration ratio in width and height. When a picture includes one or more color spaces as in the above example, the picture may be divided into the color spaces.

Images may be classified into I, P, and B according to their image types (e.g., picture, slice, tile, and so on). An I-picture may be an image which is encoded/decoded without a reference picture. A P-picture may be an image which is encoded/decoded using a reference picture, allowing only forward prediction. A B-picture may be an image which is encoded/decoded using a reference picture, allowing bi-directional prediction. However, some (P and B) of the types may be combined or an image type of a different composition may be supported, according to an encoding/decoding configuration.

Various pieces of encoding/decoding information generated in the present disclosure may be processed explicitly or implicitly. Explicit processing may be understood as a process of generating selection information indicating one candidate in a candidate group of a plurality of candidates related to coding information in a sequence, a slice, a tile, a block, or a subblock, and including the selection information in a bitstream by an encoder, and reconstructing related information as decoded information by parsing the related information at the same unit level as in the encoder by a decoder. Implicit processing may be understood as processing encoded/decoded information in the same process, rule, or the like at both the encoder and the decoder.

FIG. 1 is a conceptual diagram illustrating an image encoding and decoding system according to an embodiment of the present disclosure.

Referring to FIG. 1, each of an image encoding apparatus 105 and an image decoding apparatus 100 may be a user terminal such as a personal computer (PC), a laptop computer, a personal digital assistant (PDA), a portable multimedia player (PMP), a playstation portable (PSP), a wireless communication terminal, a smartphone, or a television (TV), or a server terminal such as an application server or a service server. Each of the image encoding apparatus 105 and the image decoding apparatus 100 may be any of various devices each including a communication device such as a communication modem, which communicates with various devices or a wired/wireless communication network, a memory 120 or 125 which stores various programs and data for inter-prediction or intra-prediction to encode or decode an image, or a processor 110 or 115 which performs computations and control operations by executing programs.

Further, the image encoding apparatus 105 may transmit an image encoded to a bitstream to the image decoding apparatus 100 in real time or non-real time through a wired/wireless communication network such as the Internet, a short-range wireless communication network, a wireless local area network (WLAN), a wireless broadband (Wi-Bro) network, or a mobile communication network or via various communication interfaces such as a cable or a universal serial bus (USB), and the image decoding apparatus 100 may reconstruct the received bitstream to an image by decoding the bitstream, and reproduce the image. Further, the image encoding apparatus 105 may transmit the image encoded to the bitstream to the image decoding apparatus 100 through a computer-readable recording medium.

While the above-described image encoding apparatus and image decoding apparatus may be separate apparatuses, they may be incorporated into a single image encoding/decoding apparatus depending on implementation. In this case, some components of the image encoding apparatus may be substantially identical to their counterparts of the image decoding apparatus. Therefore, these components may be configured to include the same structures or execute at least the same functions.

Therefore a redundant description of corresponding technical component will be avoided in the following detailed description of the technical component and their operational principles. Further, since the image decoding apparatus is a computing device that applies an image encoding method performed in the image encoding apparatus to decoding, the following description will focus on the image encoding apparatus.

The computing device may include a memory storing a program or software module that performs an image encoding method and/or an image decoding method, and a processor connected to the memory and executing the program. The image encoding apparatus may be referred to as an encoder, and the image decoding apparatus may be referred to as a decoder.

Figure 2:
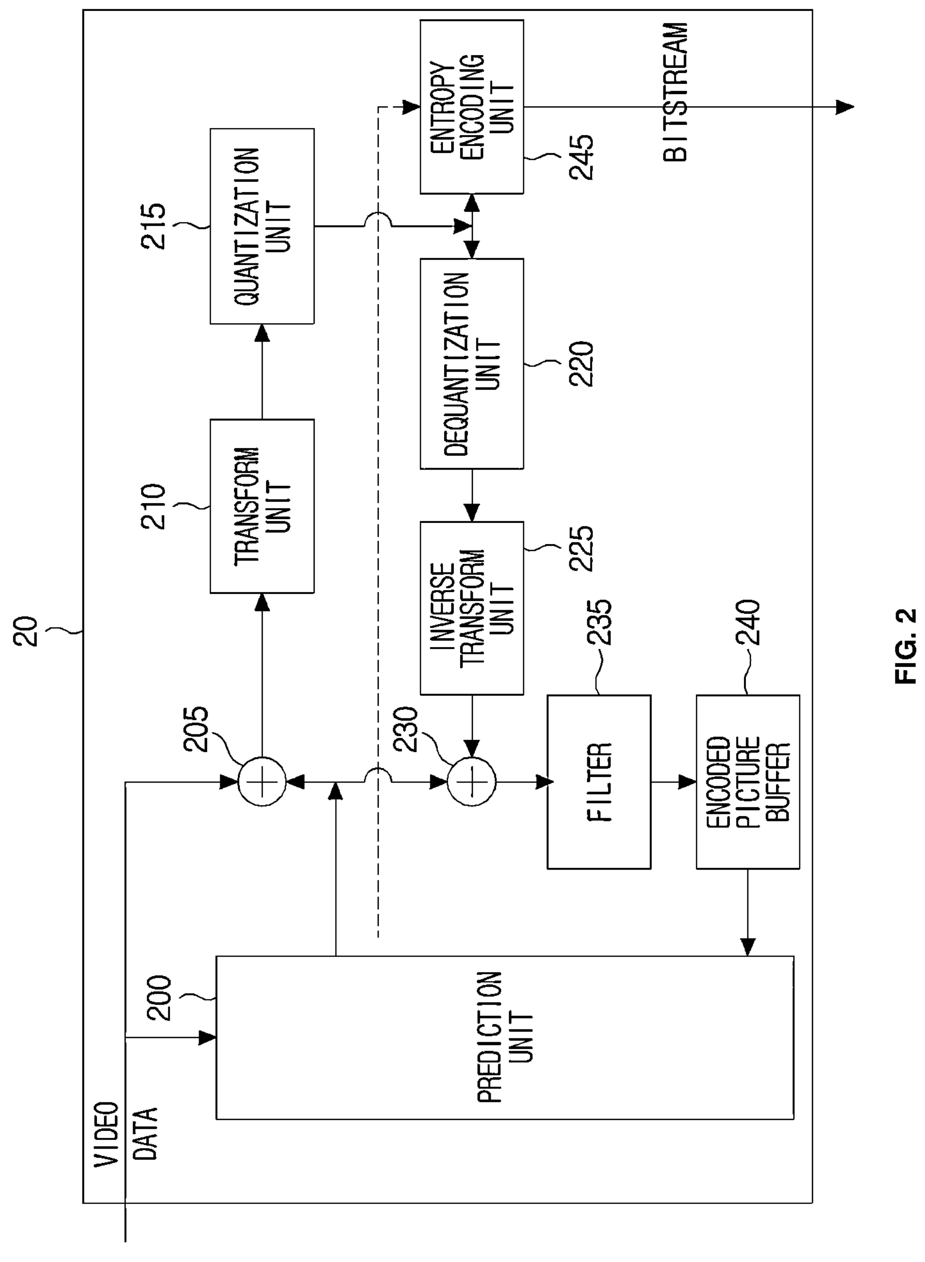
FIG. 2 is a block diagram illustrating an image encoding apparatus according to an embodiment of the present disclosure.

FIG. 2 is a block diagram illustrating an image encoding apparatus according to an embodiment of the present disclosure.

Referring to FIG. 2, an image encoding apparatus 20 may include a prediction unit 200, a subtraction unit 205, a transform unit 210, a quantization unit 215, a dequantization unit 220, an inverse transform unit 225, an add unit 230, a filter unit 235, an encoded picture buffer 240, and an entropy encoding unit 245.

The prediction unit 200 may be implemented using a prediction module which is a software module, and generate a prediction block for a block to be encoded by intra-prediction or inter-prediction. The prediction unit 200 may generate a prediction block by predicting a target block to be currently encoded in an image. In other words, the prediction unit 200 may generate a prediction block having a predicted pixel value of each pixel by predicting the pixel value of the pixel in the target block according to inter-prediction or intra-prediction. Further, the prediction unit 200 may provide information required for generating the prediction block, such as information about a prediction mode like an intra-prediction mode or an inter-prediction mode to an encoding unit so that the encoding unit may encode the information about the prediction mode. A processing unit subjected to prediction, a prediction method, and specific details about the processing unit may be configured according to an encoding/decoding configuration. For example, the prediction method and the prediction mode may be determined on a prediction unit basis, and prediction may be performed on a transform unit basis.

The inter prediction unit may divide into temporal prediction and spatial prediction based on a reference picture. In the case of temporal prediction, it may be a prediction method for finding motion in a picture temporally different from the current picture, and in the case of spatial prediction, it may be a prediction method for finding motion in the current picture (a region in which encoding has been completed. a preset region adjacent to the target block) that is temporally identical to the current picture. This can be integrated and managed through a reference picture list or can be managed by dividing into encoding modes. For example, it may be configured by mixing a picture that has been encoded before or after the current picture and a current picture in the reference picture list. The encoding modes are divided into Mode_Intra, Mode_InterD, and Mode_InterC. Among them, it may be supported by dividing into Mode_InterD (refer to previous and subsequent pictures).) and Mode_InterC (refer to current picture).

In addition, an inter-prediction unit may distinguish a translational motion model and a non-translational motion model from each other according to a motion prediction method. For the translational motion model, prediction is performed only in consideration of parallel translation, whereas for the non-translational motion model, prediction may be performed in consideration of a motion such as rotation, perspective, and zoom-in/zoom-out in additional to parallel translation. On the assumption of uni-directional prediction, the translational motion model may require one motion vector, whereas the non-translational motion model may require one or more motion information (for example, one motion vector+rotation angle/scale factor, more than one motion vector, etc. The following assumes the use of more than one motion vector). In the case of the non-translation motion model, each motion vector may be information applied to preset positions in a target block, such as a top-left vertex, a top-right vertex, a bottom-left vertex of the target block, and the position of a region to be predicted in the target block based on a corresponding motion vector may be obtained in a pixel unit or a subblock unit (an integer greater than or equal to 2, such as 4×4 or 8×8). The inter-prediction unit may apply a part of the following process commonly and another part of the following process individually according to the motion model.

The inter-prediction unit may include a reference picture construction unit, a motion estimation unit, a motion compensator, a motion information decision unit, and a motion information encoder. The reference picture construction unit may include an encoded picture previous to or next to a current picture in a reference picture list L0 or L1. A prediction block may be obtained from the reference picture included in the reference picture list, and a current image may also be configured as a reference picture and included in at least one reference picture list according to an encoding setting.

The reference picture construction unit of the inter-prediction unit may include a reference picture interpolator. The reference picture interpolator may perform interpolation for a fractional pixel according to an interpolation precision. For example, a 8-tap discrete cosine transform (DCT)-based interpolation filter may be applied to a luminance component, and a 4-tap DCT-based interpolation filter may be applied to a chrominance component.

The motion estimation unit of the inter-prediction unit may detect a block having a high correlation with the target block, using a reference picture. For this purpose, various methods such as full search-based block matching algorithm (FBMA), a three step search (TSS), and so on may be used. The motion compensator may obtain a prediction block in a motion estimation process.

The motion information decision unit of the inter-prediction unit may perform a process of selecting best motion information for the target block. The motion information may be encoded in a motion information encoding mode such as a skip mode, a merge mode, and a competition mode. The motion information encoding mode may be configured by combining supported modes according to a motion model. Such examples may include a (translational) skip mode, a (non-translational) skip mode, a (translational) merge mode, a (non-translational) merge mode, a (translational) competition mode, and a (non-translational) competition mode. Depending on an encoding setting, a part of the modes may be included in a candidate group.

In the motion information encoding mode, a prediction value of motion information (a motion vector, a reference picture, a prediction direction, and so on) of the target block may be obtained from at least one candidate block. When two or more candidate blocks are supported, best candidate selection information may be generated. The prediction value may be used as it is as the motion information about the target block in the skip mode (without a residual signal) and the merge mode (with a residual signal), whereas difference information between the motion information about the target block and the prediction value may be generated in the competition mode.

The candidate group for the motion information prediction value of the target block may be adaptive and may have various constructions according to the motion information encoding mode. Motion information of a block spatially adjacent to the target block (e.g., left, top, top-left, top-right, bottom-left, etc.) may be included in the candidate group, and motion information of a temporally adjacent block (e.g., left, right, top, bottom, top-left, top-right, bottom-left, bottom-right blocks, etc., including a block <center> in a different image corresponding to the target block) may be included in the candidate group. Mixed motion information of a spatial candidate and a temporal candidate (e.g., information obtained as an average, a median value, etc. of two or more candidates based on motion information of a spatially adjacent block and motion information of a temporally adjacent block. Motion information may be obtained in units of a target block or sub-block of the target block.) may be included in the candidate group.

Motion information may be prioritized to configure a motion information prediction value candidate group. The order of motion information to be included in the prediction value candidate group may be set according to the priorities. When as many pieces of motion information as the number of candidates in the candidate group (determined according to a motion information encoding mode) are filled in the candidate group according to the priorities, the candidate group may be completely constructed. The motion information may be prioritized in the order of motion information about a spatial neighbor block, motion information about a temporal neighbor block, and mixed motion information about spatial and temporal neighbor blocks. However, the prioritization may also be modified.

For example, motion information about spatial neighbor blocks may be included in the candidate group in the order of left, top, top-right, bottom-left, and top-left blocks, and motion information about temporal neighbor blocks may be included in the candidate group in the order of bottom-right, center, right, and bottom blocks.

The subtraction unit 205 may generate a residual block by subtracting the prediction block from the target block. In other words, the subtraction unit 205 may calculate the difference between the pixel value of each pixel in the target block to be encoded and the predicted pixel value of a corresponding pixel in the prediction block generated by the prediction unit to generate a residual signal in the form of a block, that is, the residual block. Further, the subtraction unit 205 may generate a residual block in a unit other than a block obtained through the later-described block division unit.

The transform unit 210 may transform a spatial signal to a frequency signal. The signal obtained by the transform process is referred to as transform coefficients. For example, the residual block with the residual signal received from the subtraction unit may be transformed to a transform block with transform coefficients, and the input signal is determined according to an encoding setting, not limited to the residual signal.

The transform unit may transform the residual block by, but not limited to, a transform scheme such as Hadamard transform, discrete sine transform (DST)-based transform, or DCT-based transform. These transform schemes may be changed and modified in various manners.

At least one of the transform schemes may be supported, and at least one sub-transform scheme of each transform scheme may be supported. The sub-transform scheme may be obtained by modifying a part of a base vector in the transform scheme.

For example, in the case of DCT, one or more of sub-transform schemes DCT-1 to DCT-8 may be supported, and in the case of DST, one or more of sub-transform schemes DST-1 to DST-8 may be supported. A transform scheme candidate group may be constructed with a part of the sub-transform schemes. For example, DCT-2, DCT-8, and DST-7 may be grouped into a candidate group, for transform.

Transform may be performed in a horizontal/vertical direction. For example, one-dimensional transform may be performed in the horizontal direction by DCT-2, and one-dimensional transform may be performed in the vertical direction by DST-7. With the two-dimensional transform, pixel values may be transformed from the spatial domain to the frequency domain.

One fixed transform scheme may be adopted or a transform scheme may be selected adaptively according to an encoding/decoding configuration. In the latter case, a transform scheme may be selected explicitly or implicitly. When a transform scheme is selected explicitly, information about a transform scheme or transform scheme set applied in each of the horizontal direction and the vertical direction may be generated, for example, at the block level. When a transform scheme is selected implicitly, an encoding setting may be defined according to an image type (I/P/B), a color component, a block size, a block shape, a block position, an intra-prediction mode, and so on, and a predetermined transform scheme may be selected according to the encoding setting.

Further, some transform may be skipped according to the encoding setting. That is, one or more of the horizontal and vertical units may be omitted explicitly or implicitly.

Further, the transform unit may transmit information required for generating a transform block to the encoding unit so that the encoding unit encodes the information, includes the encoded information in a bitstream, and transmits the bitstream to the decoder. Thus, a decoding unit of the decoder may parse the information from the bitstream, for use in inverse transform.

The quantization unit 215 may quantize an input signal. A signal obtained from the quantization are referred to as quantized coefficients. For example, the quantization unit 215 may obtain a quantized block with quantized coefficients by quantizing the residual block with residual transform coefficients received from the transform unit, and the input signal may be determined according to the encoding setting, not limited to the residual transform coefficients.

The quantization unit may quantize the transformed residual block by, not limited to, a quantization scheme such as dead zone uniform boundary value quantization, a quantization weighted matrix, or the like. The above quantization schemes may be changed and modified in various manners.

The quantization may be skipped according to the encoding setting. For example, the quantization (and dequantization) may be skipped according to the encoding setting (e.g., a quantization parameter of 0, that is, a lossless compression environment). In another example, when quantization-based compression performance is not exerted in view of the characteristics of an image, the quantization process may be omitted. The quantization may be skipped in the whole or partial region (M/2×N/2, M×N/2, or M/2×N) of the quantization block (M×N), and quantization skip selection information may be set explicitly or implicitly.

The quantization unit may transmit information required for generating a quantized block to the encoding unit so that the encoding unit encodes the information, includes the encoded information on a bitstream, and transmits the bitstream to the decoder. Thus, the decoding unit of the decoder may parse the information from the bitstream, for use in dequantization.

While the above example has been described on the assumption that a residual block is transformed and quantized by the transform unit and the quantization unit, a residual block with transform coefficients may be generated by transforming a residual signal and may not be quantized. The residual block may be subjected only to quantization without transform. Further, the residual block may be subjected to both transform and quantization. These operations may be determined depending on the encoding setting.

The dequantization unit 220 dequantizes the residual block quantized by the quantization unit 215. That is, the dequantization unit 220 generates a residual block with frequency coefficients by dequantizing a quantization frequency coefficient sequence.

The inverse transform unit 225 inversely transforms the residual block dequantized by the dequantization unit 220. That is, the inverse transform unit 225 inversely transforms the frequency coefficients of the dequantized residual block to generate a residual block with pixel values, that is, a reconstructed residual block. The inverse transform unit 225 may perform inverse transform by inversely performing the transform scheme used by the transform unit 210.

The add unit 230 reconstructs the target block by adding the prediction block predicted by the prediction unit 200 and the residual block recovered by the inverse transform unit 225. The reconstructed target block is stored as a reference picture (or reference block) in the coded picture buffer 240, for use as a reference picture when the next block to the target block, another block, or another picture is encoded later.

The filter unit 235 may include one or more post-processing filters such as a deblocking filter, a sample adaptive offset (SAO), and an adaptive loop filter (ALF). The deblocking filter may remove block distortion occurring at the boundary between blocks in a reconstructed picture. The ALF may perform filtering based on a value obtained by comparing the reconstructed image and the original image after the block is filtered through the deblocking filter. The SAO may reconstruct an offset difference at the pixel level between the original image and the residual block to which the deblocking filter is applied. These post-processing filters may be applied to a reconstructed picture or block.

The coded picture buffer 240 may store the block or picture reconstructed by the filter unit 235. The reconstructed block or picture stored in the coded picture buffer 240 may be provided to the prediction unit 200 that performs intra-prediction or inter-prediction.

The entropy encoding unit 245 scans the generated quantized frequency coefficient sequence in various scan methods to generate a quantized coefficient sequence, encodes the quantized coefficient sequence by entropy encoding, and outputs the entropy-encoded coefficient sequence. A scan pattern may be configured as one of various patterns such as zigzag, diagonal, and raster. Further, encoded data including encoding information received from each component may be generated and output in a bitstream.

Figure 3:
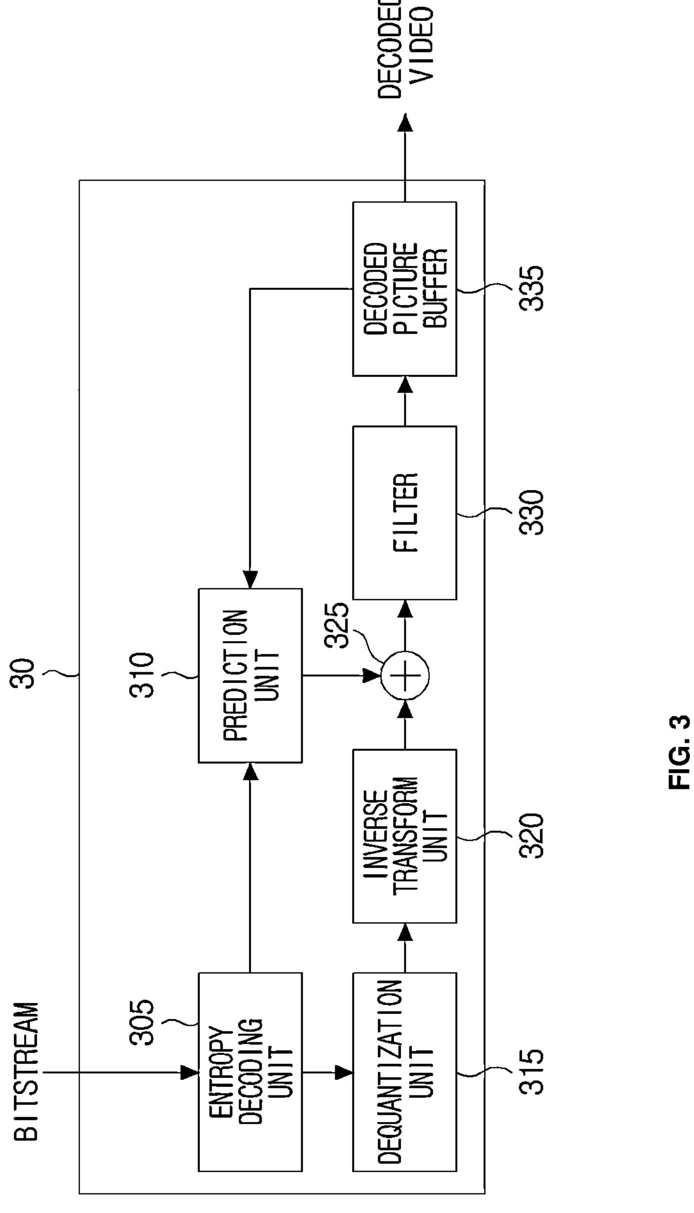
FIG. 3 is a block diagram illustrating an image decoding apparatus according to an embodiment of the present disclosure.

FIG. 3 is a block diagram illustrating an image decoding apparatus according to an embodiment of the present disclosure.

Referring to FIG. 3, an image decoding apparatus 30 may be configured to include an entropy decoder 305, a prediction unit 310, a dequantization unit 315, an inverse transform unit 320, an add unit/subtraction unit 325, a filter 330, and a decoded picture buffer 335.

Further, the prediction unit 310 may be configured to include an intra-prediction module and an inter-prediction module.

When an image bitstream is received from the image encoding apparatus 20, the image bitstream may be transmitted to the entropy decoder 305.

The entropy decoder 305 may decode the bitstream to decoded data including quantized coefficients and decoding information to be transmitted to each component.

The prediction unit 310 may generate a prediction block based on the data received from the entropy decoder 305. Based on a reference image stored in the decoded picture buffer 335, a reference picture list may be made using a default configuration scheme.

The inter-prediction unit may include a reference picture construction unit, a motion compensator, and a motion information decoder. Some of the components may perform the same processes as in the encoder, and others may inversely perform processes of the encoder.

The dequantization unit 315 may dequantize quantized transform coefficients that are provided in the bitstream and decoded by the entropy decoder 305.

The inverse transform unit 320 may generate a residual block by applying inverse DCT, inverse integer transform, or a similar inverse transform technique to the transform coefficients.

The dequantization unit 315 and the inverse transform unit 320 may reversely perform the processes of the transform unit 210 and the quantization unit 215 of the image encoding apparatus 20 described above, and may be implemented in various ways. For example, the dequantization unit 315 and the inverse transform unit 320 may use the same processes and inverse transform shared with the transform unit 210 and the quantization unit 215, and may reversely perform transform and quantization using information about the transform and quantization processes received from the image encoding apparatus 20 (e.g., a transform size, a transform shape, a quantization type, and so on).

The residual block that has been dequantized and inversely transformed may be added to the prediction block derived by the prediction unit 310, thus producing a reconstructed image block. This addition may be performed by the add unit/subtraction unit 325.

Regarding the filter 330, a deblocking filter may be applied to remove a blocking phenomenon from the reconstructed image block, when needed. To improve a video quality before and after the decoding process, other loop filters may be additionally used.

The reconstructed and filtered image block may be stored in the decoded picture buffer 335.

While not shown in the drawings, the image encoding/decoding apparatus may further include a block division unit.

The block division unit may divide into blocks of various units and sizes. The basic coding unit (or maximum coding unit. Coding Tree Unit. CTU) may refer to a basic (or starting) unit for prediction, transform, quantization, and so on in an image encoding/decoding process. In this case, the basic coding unit may be composed of one luminance basic coding block (maximum coding block or CTB) and two basic chrominance coding blocks according to a color format (YCbCr in this example), and the size of each block may be determined according to the color format. A coding block (CB) may be obtained according to the partitioning process. A CB may be understood as a unit which is not further sub-divided due to certain restrictions, and may be set as a starting unit for partitioning into sub-units. In the present disclosure, a block conceptually encompasses various shapes such as a triangle, a circle, and so on, not limited to a square.

While the following description is given in the context of one color component, it is also applicable to other color component with some modification, in proportion to a ratio according to the color format (for example, in case of YCbCr 4:2:0, the width-height length ratio of the luminance component and the chrominance component is 2:1). Further, although block partitioning dependent on other color component (e.g. depending on the block partitioning result of Y in Cb/Cr) is possible, it should be understood that block independent partitioning of each color component is also possible. Further, although one common block partitioning configuration (in consideration of being proportional to a length ratio) may be used, it is also necessary to consider and understand that an individual block partitioning configuration is used according to a color component.

In the block division unit, a block may be expressed as $M \times N$, and the maximum and minimum values of each block may be obtained within the range. For example, if the maximum and minimum values of a block are $256 \times 256$ and $4 \times 4$, respectively, a block of size $2m \times 2n$ (m and n are integers of 2 to 8 in this example), a block of size $2m \times 2n$ (m and n are integers of 2 to 128 in this example), or a block of size $m \times m$ (m and n are integers of 4 to 256 in this example) may be obtained. Herein, m and n may be equal or different, and one or more ranges in which blocks are supported, such as the maximum value and the minimum value, may be generated.

For example, information about the maximum size and minimum size of a block may be generated, and information about the maximum size and minimum size of a block may be generated in some partitioning configuration. In the former case, the information may be range information about maximum and minimum sizes that may be produced in an image, whereas in the latter case, the information may be information about maximum and minimum sizes that may be produced according to some partitioning configuration. The partitioning configuration may be defined by an image type (I/P/B), a color component (YCbCr or the like), a block type (coding/prediction/transform/quantization), a partitioning type (index or type), and a partitioning scheme (quad tree (QT), binary tree (BT), and ternary tree (TT) as tree methods, and SI2, SI3, and SI4 as type methods).

Further, there may be a constraint on a width-height ratio available to a block (a block shape), and in this regard, a boundary value may be set. Only blocks less than or equal to/less than a boundary value k may be supported, where k may be defined according to a width-height ratio, A/B (A is the longer or equal value between the width and height, and B is the other value). k may be a real number equal to or larger than 1, such as 1.5, 2, 3, 4, or the like. As in the above example, a constraint on the shape of one block in an image may be supported, or one or more constrains may be supported according to a partitioning configuration.

In summary, it may be determined whether block partitioning is supported based on the above-described range and constraint and a later-described partitioning configuration. For example, when a candidate (child block) divided from a block (parent block) is satisfying a supported block condition, the partitioning may be supported, and otherwise, the partitioning may not be supported.

The block division unit may be configured in relation to each component of the image encoding apparatus and the image decoding apparatus, and the size and shape of a block may be determined in this process. Different blocks may be configured according to components. The blocks may include a prediction block for the prediction unit, a transform block for the transform unit, and a quantization block for the quantization unit. However, the present disclosure is not limited thereto, and block units may be additionally defined for other components. While the shape of each of an input and an output is described as a rectangular in each component in the present disclosure, the input and the output of some component may have any other shape (e.g., a triangle).

The size and shape of an initial (or starting) block in the block division unit may be determined from a higher unit. The initial block may be divide into smaller blocks. Once an optimal size and shape are determined according to the block partitioning, the block may be determined as an initial block for a lower unit. The higher unit may be a coding block, and the lower unit may be a prediction block or a transform block, to which the present disclosure is not limited. Rather, various modification examples are possible. Once the initial block of the lower unit is determined as in the above example, a partitioning process may be performed to detect a block of an optimal size and shape like the higher unit.

In summary, the block division unit may divide a basic coding block (or maximum coding block) into at least one coding block, and the coding block may be divide into at least one prediction block/transform block/quantization block. Further, the prediction block may be divide into at least one transform block/quantization block, and the transform block may be divide into at least one quantization block. Some blocks may be in a dependent relationship with other blocks (i.e., defined by a higher unit and a lower unit) or may have an independent relationship with other blocks. For example, the prediction block may be a higher unit above the transform block or may be a unit independent of the transform block. Various relationships may be established according to the types of blocks.

Depending on an encoding/decoding configuration, whether to combine a higher unit and a lower unit may be determined. Combination between units means that a block of a higher unit is subjected to an encoding/decoding process of a lower unit (e.g., in the prediction unit, transform unit, inverse transform unit, and so on), without being divide into lower units. That is, it may mean that a partitioning process is shared between a plurality of units, and partitioning information is generated in one (e.g., a higher unit) of the units.

For example, (when a coding block is combined with a prediction block or a transform block), the coding block may be subjected to prediction, transform, and inverse transform.

For example, (when a coding block is combined with a prediction block), the coding block may be subjected to prediction, and a transform block equal to or smaller than the coding block in size may be subjected to transform and inverse transform.

For example, (when a coding block is combined with a transform block), a prediction block equal to or smaller than the coding block in size may be subjected to prediction, and the coding block may be subjected to transform and inverse transform.

For example, (when a prediction block is combined with a transform block), a prediction block equal to or smaller than the coding block in size may be subjected to prediction, transform, and inverse transform.

For example, (when there is no block combining), a prediction block equal to or smaller than a coding block in size may be subjected to prediction, and a transform block equal to or smaller than the coding block in size may be subjected to transform and inverse transform.

While various cases of a coding block, a prediction block, and a transform block have been described in the above examples, the present disclosure is not limited thereto.

For combination between units, a fixed configuration may be supported in an image, or an adaptive configuration may be supported in consideration of various encoding/decoding factors. The encoding/decoding factors include an image type, a color component, a coding mode (Intra/Inter), a partitioning configuration, a block size/shape/position, a width-height ratio, prediction-related information (e.g., intra-prediction mode, inter-prediction mode, or the like), transform-related information (e.g., transform scheme selection information or the like), quantization-related information (e.g., quantization region selection information and quantized transform coefficient coding information), and so on.

When a block of an optimal size and shape has been detected as described above, mode information (e.g., partitioning information) for the block may be generated. The mode information may be included in a bitstream along with information generated from a component to which the block belongs (e.g., prediction-related information and transform-related information) and transmitted to the decoder, and may be parsed at the same unit level by the decoder, for use in a video decoding process.

Now, a partitioning scheme will be described. While it is assumed that an initial block is shaped into a square, for the convenience of description, the present disclosure is not limited thereto, and the description is applicable in the same manner or a similar manner to a case in which the initial block is rectangular.

The block division unit may support various types of partitioning. For example, tree-based partitioning or index-based partitioning may be supported, and other methods may also be supported. In tree-based partitioning, a partition type may be determined based on various types of information (e.g., information indicating whether partitioning is performed, a tree type, a partitioning direction, and so on), whereas in index-based partitioning, a partitioning type may be determined using specific index information.

Figure 4:
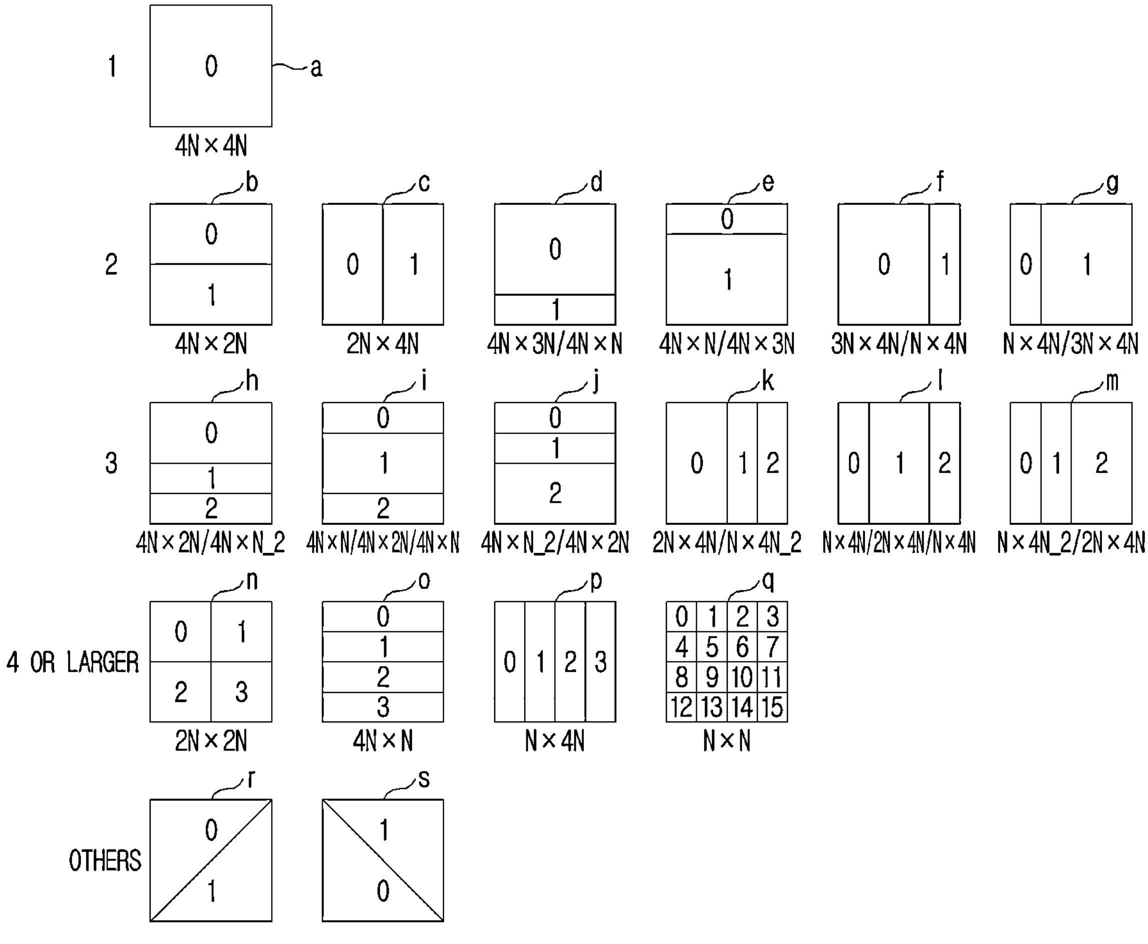
FIG. 4 is an exemplary diagram illustrating various partition types which may be obtained in a block division unit of the present disclosure.

FIG. 4 is an exemplary diagram illustrating various partition types which may be obtained in a block division unit of the present disclosure. In this example, it is assumed that the partitioning types illustrated in FIG. 4 are obtained by one partitioning operation (or process), which should not be construed as limiting the present disclosure. The partition types may also be obtained in a plurality of partitioning operations. Further, an additional partition type which is not illustrated in FIG. 4 may also be available.

(Tree-Based Partitioning)

In tree-based partitioning of the present disclosure, QT, BT, and TT may be supported. If one tree method is supported, this may be referred to as single-tree partitioning, and if two or more tree methods are supported, this may be referred to as multi-tree partitioning.

In QT, a block is split into two partitions in each of the horizontal and vertical directions (n), whereas in BT, a block is split into two partitions in either the horizontal direction or the vertical direction (b to g). In TT, a block is split into three partitions in either the horizontal direction or the vertical direction (h to m).

In QT, a block may be split into four partitions by limiting the partitioning direction to one of the horizontal and vertical directions (o and p). Further, in BT, only split of a block into equal-sized partitions (b and c), only split of a block into partitions of different sizes (d to g), or both of the partition types may be supported. Further, in TT, split of a block into partitions concentrated only in a specific direction (1:1:2 or 2:1:1 in the direction of left→right or top→bottom) (h, j, k, and m), split of a block into partitions concentrated at the center (1:2:1) (i and l), or both the partition types may be supported. Further, split of a block into four partitions in each of the horizontal and vertical directions (i.e., a total of 16 partitions) may be supported (q).

Among the tree methods, split of a block into z partitions only in the horizontal direction (b, d, e, h, i, j, o), split of a block into z partitions only in the vertical direction (c, f, g, k, l, m, p), or both the partition types may be supported. Herein, z may be an integer equal to or greater than 2, such as 2, 3, or 4.

In the present disclosure, it is assumed that the partition type n is supported as QT, the partition types b and c are supported as BT, and partition types i and l are supported as TT.

One or more of the tree partitioning schemes may be supported according to an encoding/decoding setting. For example, QT, QT/BT, or QT/BT/TT may be supported.

In the above example, the basic tree partitioning scheme is QT, and BT and TT are included as additional partitioning schemes depending on whether other trees are supported. However, various modifications may be made. Information indicating whether other trees are supported (bt_enabled_flag, tt_enabled_flag, and bt_tt_enabled_flag, with 0 indicating not support and 1 indicating support) may be implicitly determined according to an encoding/decoding setting or explicitly determined in units such as sequence, picture, slice, or tile.

Partitioning information may include information indicating whether partitioning is performed (tree_part_flag or qt_part_flag, bt_part_flag, tt_part_flag, and bt_tt_part_flag, which may have a value of 0 or 1 with 0 indicating not partition and 1 indicating partition). Further, depending on partitioning schemes (BT and TT), information about a partitioning direction (dir_part_flag, or bt_dir_part_flag, tt_dir_part_flag, and bt_tt_dir_part_flag, which have a value of 0 or 1 with 0 indicating <width/horizontal> and 1 indicating <height/vertical>) may be added. This may be information that may be generated when partitioning is performed.

When multi-tree partitioning is supported, various pieces of partitioning information may be configured. The following description is given of an example of how partitioning information is configured at one depth level (that is, although recursive partitioning is possible by setting one or more supported partitioning depths), for the convenience of description.

In Example 1, information indicating whether partitioning is performed is checked. If partitioning is not performed, the partitioning ends.

If partitioning is performed, selection information about a partition type (e.g., tree_idx. 0 for QT, 1 for BT, and 2 for TT) is checked. Partitioning direction information is additionally checked according to the selected partition type, and the procedure proceeds to the next step (if additional partitioning is possible for reasons such as when a partitioning depth has not reached a maximum value, the procedure starts again from the beginning, and if the additional partitioning is not possible, the partitioning procedure ends).

In Example 2, information indicating whether partitioning is performed in a certain tree scheme (QT) is checked and the procedure proceeds to the next step. If partitioning is not performed in the tree scheme (QT), information indicating whether partitioning is performed in another tree scheme (BT) is checked. In this case, if partitioning is not performed in the tree scheme, information indicating whether partitioning is performed in a third tree scheme (TT) is checked. If partitioning is not performed in the third tree scheme (TT), the partitioning procedure ends.

If partitioning is performed in the tree scheme (QT), the procedure proceeds to the next step. Further, partitioning is performed in the second tree scheme (BT), partitioning direction information is checked and the procedure proceeds to the next step. If partitioning is performed in the third tree scheme (TT), partitioning direction information is checked and the procedure proceeds to the next step.

In Example 3, information indicating whether partitioning is performed in a tree scheme (QT) is checked. If partitioning is not performed in the tree scheme (QT), information indicating whether partitioning is performed in other tree schemes (BT and TT) is checked. If partitioning is not performed, the partitioning procedure ends.

If partitioning is performed in the tree scheme (QT), the procedure proceeds to the next step. Further, partitioning is performed in the other tree schemes (BT and TT), partitioning direction information is checked and the procedure proceeds to the next step.

While tree partitioning schemes are prioritized (Example 2 and Example 3) or no priorities are assigned to the tree partitioning schemes (Example 1) in the above examples, various modification examples may also be available. Further, partitioning in a current step is not related to the partitioning result of the previous step in the above example. However, partitioning in the current step may be dependent on the partitioning result of the previous step.

In Example 1 to Example 3, if some tree partitioning scheme (QT) is performed in the previous step and thus the procedure proceeds to the current step, the same tree partitioning scheme (QT) may be supported in the current step, as well.

On the other hand, if the certain tree partitioning scheme (QT) was not performed and another tree partitioning scheme (BT or TT) was performed in the previous step, other tree partitioning schemes (BT and TT) except for the certain tree partitioning scheme (QT) may be supported in the current step and the following steps.

In the above case, a tree configuration supported for block partitioning may be adaptive, and thus the afore-mentioned partitioning information may also be configured differently. (The example to be described later is assumed to be Example 3). That is, if partitioning is not performed in the certain tree scheme (QT) in the previous step, the partitioning procedure may be performed with no regard to the tree scheme (QT) in the current step. In addition, partitioning information related to the certain tree scheme (e.g., information indicating whether partitioning is performed, information about a partitioning direction, and so on. In this example <QT>, information indicating whether partitioning is performed) may be removed.

The above example relates to an adaptive partitioning information configuration for the case where block partitioning is allowed (e.g., a block size is within a range between maximum and minimum values, the partitioning depth of each tree scheme has not reached a maximum depth (allowed depth), or the like). Even when block partitioning is restricted (e.g., the block size does not exist in the range between the maximum and minimum values, the partitioning depth of each tree scheme has reached the maximum depth, or the like), partitioning information may be configured adaptively.

As already mentioned, tree-based partitioning may be performed in a recursive manner in the present disclosure. For example, if a partition flag of a coding block with a partitioning depth of k is set to 0, coding block encoding is performed in the coding block with the partitioning depth of k. If the partition flag of the coding block with the partitioning depth of k is set to 1, coding block encoding is performed in N sub-coding blocks with a partitioning depth of k+1 according to a partitioning scheme (where N is an integer equal to or greater than 2, such as 2, 3, and 4).

The sub-coding block may be set as a coding block (k+1) and partitioned into sub-coding blocks (k+2) in the above procedure. This hierarchical partitioning scheme may be determined according to a partitioning setting such as a partitioning range and an allowed partitioning depth.

In this case, a bitstream structure representing partitioning information may be selected from among one or more scan methods. For example, the bitstream of the partitioning information may be configured based on an order of partitioning depths, or based on whether partitioning is performed.

For example, in the partitioning depth order-based case, partitioning information is obtained at a current depth level based on an initial block, and then partitioning information is obtained at the next depth level. In the case based on whether partitioning is performed, additional partitioning information is first obtained in a block split from an initial block, and other additional scan methods may be considered.

The maximum block size and minimum block size may have a common setting regardless of the tree type (or all trees), or may have individual settings for each tree, or may have a common setting for two or more trees. In this case, the maximum block size may be set equal to or less than the maximum coding block. If the maximum block size according to the predetermined first tree is not the same as the maximum coding block, partitioning is implicitly performed using a predetermined second tree method until the maximum block size of the first tree is reached.

In addition, regardless of the tree type, a common division depth may be supported, an individual division depth may be supported according to each tree, or a common division depth for two or more trees may be supported. Alternatively, a division depth may be supported for some trees, and a division depth may not be supported for the others trees.

An explicit syntax element for the setting information may be supported, and some setting information may be determined implicitly.

(Index-Based Division)

In index-based division of the present disclosure, a constant split index (CSI) scheme and a variable split index (VSI) scheme may be supported.

In the CSI scheme, k subblocks may be obtained through partitioning in a predetermined direction, and k may be an integer equal to or greater than 2, such as 2, 3, or 4. Specifically, the size and shape of a subblock may be determined based on k irrespective of the size and shape of a block. The predetermined direction may be one of or a combination of two or more of horizontal, vertical, and diagonal directions (top-left→bottom-right direction or bottom-left→top-right direction).

In the index-based CSI division scheme of the present disclosure, z candidates may be obtained through partitioning in either the horizontal direction or the vertical direction. In this case, z may be an integer equal to or greater than 2, such as 2, 3, or 4, and the subblocks may be equal in one of width and height and may be equal or different in the other one of width and height. The width or height length ratio of the subblocks are A1:A2: . . . :AZ, and each of A1 to AZ may be an integer equal to or greater than 1, such as 1, 2, or 3.

Further, a candidate may be obtained by partitioning into x partitions and y partitions along the horizontal and vertical directions, respectively. Each of x and y may be an integer equal to or greater than 1, such as 1, 2, 3, or 4. However, a candidate with both x and y being 1s may be restricted (because a already exists). Although FIG. 4 illustrates cases where subblocks have the same width or height ratio, candidates having the different width ratio or height ratio may also be included.

Further, a candidate may be split into w partitions in one of diagonal directions, top-left→bottom-right and bottom-left→top-right. Herein, w may be an integer equal to or greater than 2, such as 2 or 3.

Referring to FIG. 4, partition types may be classified into a symmetrical partition type (b) and an asymmetric partition type (d and e) according to a length ratio of each subblock. Further, partition types may be classified into a partition type concentrated in a specific direction (k and m) and a centered partitioning type (k). Partition types may be defined by various encoding/decoding factors including a subblock shape as well as a subblock length ratio, and a supported partition type may be implicitly or explicitly determined according to an encoding/decoding setting. Thus, a candidate group may be determined based on the supported partition type in the index-based partitioning scheme.

In the VSI scheme, with the width w or height h of each subblock fixed, one or more subblocks may be obtained through partitioning in a predetermined direction. Herein, each of w and h may be an integer equal to or greater than 1, such as 1, 2, 4, or 8. Specifically, the number of subblocks may be determined based on the size and shape of a block, and the w or h value.

In the index-based VSI partitioning scheme of the present disclosure, a candidate may be partitioned into subblocks, each being fixed in one of the width and length. Alternatively, a candidate may be partitioned into subblocks, each being fixed in both the width and length. Since the width or height of a subblock is fixed, equal partitioning in the horizontal or vertical direction may be allowed. However, the present disclosure is not limited thereto.

In the case where a block is of size M×N prior to partitioning, if the width w of each subblock is fixed, the height h of each subblock is fixed, or both of the width w and height h of each subblock are fixed, the number of obtained subblocks may be (M*N)/w, (M*N)/h, or (M*N)/w/h.

Depending on an encoding/decoding setting, only one or both of the CSI scheme and the VSI scheme may be supported, and information about a supported scheme may be implicitly or explicitly determined.

The present disclosure will be described in the context of the CSI scheme being supported.

A candidate group may be constructed to include two or more candidates in the index-based partitioning scheme according to an encoding/decoding setting.

For example, a candidate group such as {a, b, c}, {a, b, c, n}, or {a to g and n} may be formed. The candidate group may be an example of including block types predicted to occur many times based on general statistical characteristics, such as a block divided into two partitions in the horizontal or vertical direction or in each of the horizontal and vertical directions.

Alternatively, a candidate group such as {a, b}, {a, o}, or {a, b, o}, or a candidate group such as {a, c}, {a, p}, or {a, c, p} may be constructed. The candidate group may be an example of including candidates each being partitioned into partitions and four partitions in the horizontal and vertical directions, respectively. This may be an example of configuring block types predicted to be partitioned mainly in a specific direction as a candidate group.

Alternatively, a candidate group such as {a, o, p} or {a, n, q} may be constructed. This may be an example of constructing a candidate group to include block types predicted to be partitioned into many partitions smaller than a block prior to partitioning.

Alternatively, a candidate group such as {a, r, s} may be constructed, and it may be an example of determining that the optimal partitions result that can be obtained in a rectangular shape through other method (tree method) from the block before being split, and constructing the non-rectangular shape as a candidate group.

As noted from the above examples, various candidate group constructions may be available, and one or more candidate group constructions may be supported in consideration of various encoding/decoding factors.

Once a candidate group is completely constructed, various partitioning information configurations may be available.

For example, regarding a candidate group including the candidate a which is not partitioned and the candidates b to s which are partitioned, index selection information may be generated.

Alternatively, information indicating whether partitioning is performed (information indicating whether the partitioning type is a) may be generated. If partitioning is performed (if the partitioning type is not a), index selection information may be generated regarding a candidate group including the candidates b to s that are partitioned.

The partitioning information may be configured in many other ways than described above. Except for the information indicating whether partitioning is performed, binary bits may be assigned to the index of each candidate in the candidate group in various manners such as fixed length binarization, variable length binarization, and so on. If the number of the candidate is 2, 1 bit may be assigned to the index selection information, and if the number of the candidates is 3, one or more bits may be assigned to the index selection information.

Compared to the tree-based partitioning scheme, partition types predicted to occur many times may be included in a candidate group in the index-based partitioning scheme.

Since the number of bits used to represent index information may increase according to the number of supported candidate groups, this scheme may be suitable for single-layer partitioning (e.g., the partitioning depth is limited to 0), instead of tree-based hierarchical partitioning (recursive partitioning). That is, a single partitioning operation may be supported, and a subblock obtained through index-based partitioning may not be further split.

This may mean that further partitioning into smaller blocks of the same type is impossible (e.g., a coding block obtained through index-based partitioning may not be further split into coding blocks), and also mean that further partitioning into different types of blocks may also be impossible (e.g., partitioning of a coding block into prediction blocks as well as coding blocks is not possible). Obviously, the present disclosure is not limited to the above example, and other modification examples may also be available.

Now, a description will be given of determination of a block partitioning setting mainly based on a block type among encoding/decoding factors.

First, a coding block may be obtained in a partitioning process. A tree-based partitioning scheme may be adopted for the partitioning process, and a partition type such as a (no split), n(QT), b, c(BT), i, or l(TT) of FIG. 4 may result according to a tree type. Various combinations of tree types, such as QT/QT+BT/QT+BT+TT may be available according to an encoding/decoding setting.

The following examples are processes of finally dividing a coding block obtained in the above procedure into prediction blocks and transform blocks. It is assumed that prediction, transform, and inverse transform are performed based on the size of each partition.

In Example 1, prediction may be performed by setting the size of a prediction block equal to that of a coding block, and transform and inverse transform may be performed by setting the size of a transform block equal to that of the coding block (or prediction block).

In Example 2, prediction may be performed by setting the size of a prediction block equal to that of a coding block. A transform block may be obtained by partitioning the coding block (or prediction block) and transform and inverse transform may be performed based on the size of the obtained transform block.

Here, a tree-based partitioning scheme may be adopted for the partitioning process, and a partition type such as a (no split), n(QT), b, c(BT), i, or l(TT) of FIG. 4 may result according to a tree type. Various combinations of tree types, such as QT/QT+BT/QT+BT+TT may be available according to an encoding/decoding setting.

Here, the partitioning process may be an index-based partitioning scheme. A partition type such as a (no split), b, c, or d of FIG. 4 may be obtained according to an index type. Depending on an encoding/decoding setting, various candidate groups such as {a, b, c} and {a, b, c, d} may be constructed.

In Example 3, a prediction block may be obtained by partitioning a coding block, and subjected to prediction based on the size of the obtained prediction block. For a transform block, its size is set to the size of the coding block, and transform and inverse transform may be performed on the transform block. In this example, the prediction block and the transform block may be in an independent relationship.

An index-based partitioning scheme may be used for the partitioning process, and a partitioning type such as a (no split), b to g, n, r, or s of FIG. 4 may be obtained according to an index type. Various candidate groups such as {a, b, c, n}, {a to g, n}, and {a, r, s}, may be constructed according to an encoding/decoding setting.

In Example 4, a prediction block may be obtained by partitioning a coding block, and subjected to prediction based on the size of the obtained prediction block. For a transform block, its size is set to the size of the prediction block, and transform and inverse transform may be performed on the transform block. In this example, the transform block may have a size equal to the size of the obtained prediction block or vice versa (the size of the transform block is set as the size of the prediction block).

A tree-based partitioning scheme may be used for the partitioning process, and a partition type such as a (no split), b, c(BT), i, l(TT), or n(QT) of FIG. 4 may be generated according to a tree type. Depending on an encoding/decoding setting, various combinations of tree types such as QT/BT/QT+BT may be available.

Here, an index-based partitioning scheme may be used for the partitioning process, and a partition type such as a (no split), b, c, n, o, or p of FIG. 4 may result according to an index type. Various candidate groups such as {a, b}, {a, c}, {a, n}, {a, o}, {a, p}, {a, b, c}, {a, o, p}, {a, b, c, n}, and {a, b, c, n, p} may be constructed depending on an encoding/decoding setting. Further, a candidate group may be constructed in the VSI scheme alone or the CSI scheme and the VSI scheme in combination, as the index-based partitioning scheme(s).

In Example 5, a prediction block may be obtained by partitioning a coding block, and subjected to prediction based on the size of the obtained prediction block. A transform block may also be obtained by partitioning the coding block and subjected to transform and inverse transform based on the size of the obtained transform block. In this example, each of a prediction block and a transform block may result from partitioning a coding block.

Here, a tree-based partitioning scheme and an index-based partitioning scheme may be used for the partitioning process, and a candidate group may be constructed in the same manner as or in a similar manner to in Example 4.

In this case, the above examples are cases that may occur depending on whether a process of partitioning each block type is shared, which should not be construed as limiting the present disclosure. Various modification examples may also be available. Further, a block partitioning setting may be determined in consideration of various encoding/decoding factors as well as a block type.

The encoding/decoding factors may include an image type (I/P/B), a color component (YCbCr), a block size/shape/position, a block width-height ratio, a block type (coding block, prediction block, transform block, or quantization block), a partition state, a coding mode (Intra/Inter), prediction-related information (intra-prediction mode or inter-prediction mode), transform-related information (transform scheme selection information), quantization-related information (quantization region selection information and quantized transform coefficient coding information).

(Explanation of the Relationship Between Blocks)

Figure 5:
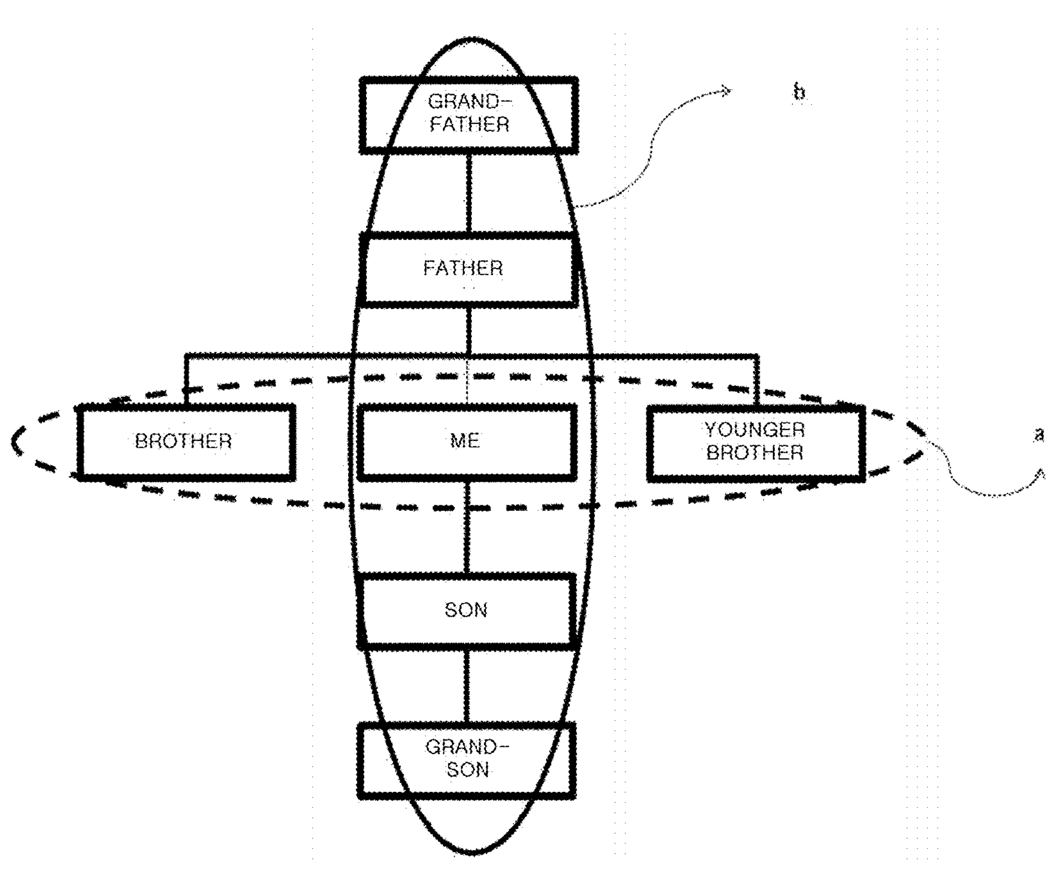
FIG. 5 shows an example of a family tree for explaining the genetic characteristics of members of a family and people related to the family.

FIG. 5 shows an example of a family tree for explaining the genetic characteristics of members of a family and people related to the family. For convenience of explanation, horizontal and vertical relationships according to specific gender (male) will be shown.

Referring to FIG. 5, a target person (self) can have a horizontal relationship (a) with an older brother and a younger brother, and a grandfather (grandfather), father (father, ideal ancestor), child (son), and grandson. You can have a vertical relationship (b) with (ideal descendants). At this time, there may be cases in which the figures placed in a horizontal relationship have similar genetic factors such as appearance, physique, and personality. Alternatively, some elements may be similar and some elements may not be similar. Whether all or part of the above genetic factors are similar may be determined by various environmental factors (including mothers).

The above description may be applicable to the same or similar vertical relationship. For example, there may be cases in which the subject person's genetic factors (appearance, physique, personality) are similar to that of the father. Alternatively, some genetic factors (appearance, physique) of the subject person may be similar to the father, but some genetic factors (personality) may be (similar to mother) and not similar to the father.

As another example, a target person may be genetically similar to a grandfather (or grandson) and a grandfather may be genetically similar to a grandson, but the degree of similarity between each person may be determined based on a relationship between each person. In other words, the similarity between the grandfather and the target person (two major differences) may be high, and the similarity between the grandfather and grandchild (four major differences) may be low.

In general, direct analysis may be the top priority to grasp the characteristics of a target person, but direct analysis is not possible when the absence of the target person occurs. In this case, it may be possible to roughly grasp the characteristics of the target person through indirect analysis of people placed in various relationships as in the above example. Of course, analysis of people with high similarity to the target person may be required.

The relationship between people based on various blood relations has been described through the above example, but the same or similar application may be applied to encoding for image compression. Here, block-based coding will be taken as an example. In order to encode a predetermined block (target block), information of a block (relative block) placed in various relationships with the target block may be used/referenced.

Here, information of the relative block may be data based on a pixel value, data based on mode information used in an encoding process, or data based on setting information used in an encoding process. For example, it may be a pixel value in a spatial domain of the relative block or a coefficient value (or a quantized coefficient) in a frequency domain. Alternatively, it may be mode information generated in a process of encoding the relative block. Alternatively, it may be information (such as a reference candidate group) on a reference setting used in the encoding process of the relative block. Here, data based on a pixel value or data based on mode information may be information configuring the reference setting.

In the present invention, the relationship between blocks (a target block and a relative block. described with reference to the target block) may be defined as follows.

Horizontal relationship: in case that the target block does not have an overlapping area with the relative block (independent relationship between blocks)

Vertical relationship: in case that the target block is larger than the relative block and contains the relative block. Or, in case that it is smaller than the relative block and included in the relative block (dependent relationship between blocks)

Here, in case of having a horizontal relationship, the relative block may be located regardless of the space to which the target block belongs. That is, the relative block may belong to the same space temporally as the target block, or may belong to a different space temporally from the target block.

Here, in the case of having a vertical relationship, the relative block may be located in a space to which the target block belongs. That is, the relative block does not belong to a space that is temporally different from the target block, but the relative block may have a vertical relationship based on a region corresponding to the target block in a temporally different space according to the encoding setting.

Figure 6:
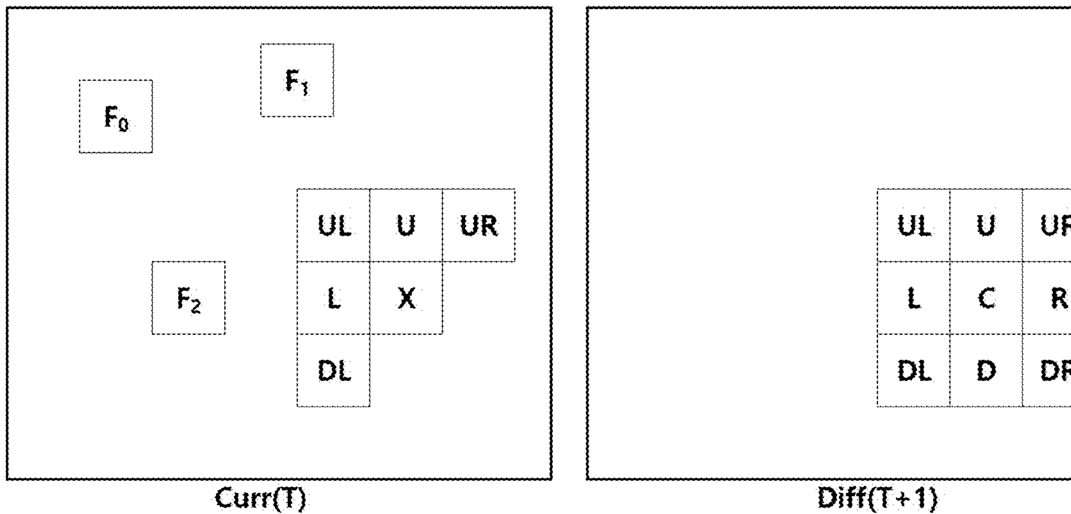
FIG. 6 shows examples of various arrangements of relative blocks having a horizontal relationship with a target block.

FIG. 6 shows examples of various arrangements of a relative block having a horizontal relationship with a target block. Referring to FIG. 6, a block placed in a horizontal relationship with a target block may be classified into a block belonging to a temporally same space (Curr) and a block belonging to a temporally different space (Diff).

Here, even if the relative block belongs to a color component different from that of the target block (X), it is regarded as belonging to the temporally same space, but some definition of the horizontal relationship is changed (a relative block having the same size and position as the target block exists). Here, blocks belonging to the same space may be classified into blocks (UL, U, UR, L, DL) adjacent (or closest) to the target block and blocks (F0, F1, F2) that are not adjacent (or distantly).

Among the blocks belonging to the same space, the block adjacent to the target block may be the block closest to the left, top, top-left, top-right, bottom-left, etc. This is the block that have already been encoded by considering a raster scan order (or Z-scan. In case of 2×2, top-left→top-right→bottom-left→bottom-right). That is, positions of adjacent blocks may be determined according to a predetermined scan order, and changes such as the removal of the block at the above position or the addition of the block at a new position (right, bottom, bottom-right, etc.) may occur according to the type of scan order (inverse Z scan <bottom-right→bottom-left→top-right→top-left>, clock-wise scan <top-left→top-right→bottom-right→bottom-left>, counter clock-wise scan<top-left→bottom-left→bottom-right→top-right>, etc.).

In addition, blocks that are not adjacent to the target block may be blocks that have already been encoded. In this case, it may belong to the same block unit (such as the maximum coding block) as the target block, or may belong to the same division unit (slice, tile, etc.). That is, limited settings such as placing a range (existing within the range of x_offset and y_offset in the horizontal and vertical directions based on the target block) for a region that is not adjacent but may be included as a relative block may be supported. In the present invention, it is assumed that the block having a horizontal relationship with the target block has already been encoded, but is not limited thereto.

For encoding of the target block, encoding information/reference setting of the relative block having a horizontal relationship may be used (referenced).

For example, a pixel value of a relative block may be used to generate a prediction value of the target block. In detail, in intra prediction, a prediction value of a target block may be obtained by applying a method such as extrapolation, interpolation, averaging, or a method such as block matching or template matching to a pixel value of the relative block. In addition, in inter prediction, the prediction value of the target block may be obtained by using a method such as block matching or template matching with the pixel value of the relative block. In this case, block matching or template matching may be defined as intra prediction (Mode_Intra) in terms of finding a prediction value in the same space, or may be defined as inter prediction (Mode_Inter) according to a prediction method, or it may be classified as other encoding mode that are additionally defined Here, only the pixel values in the spatial domain are targeted, but all or some of the coefficient values in the frequency domain of the relative block may be used as the prediction value of the target block (that is, used for prediction of the frequency component).

For example, mode information of a relative block may be used to encode mode information of a target block. Specifically, in intra prediction, prediction information (directional mode, non-directional mode, motion vector, etc.) of a relative block may be used for encoding (MPM, non-MPM, etc.) prediction information of a target block. In addition, in inter prediction, prediction information (motion vector, reference picture, etc.) of a relative block may be used for encoding prediction information of a target block.

Here, according to the prediction method of intra prediction, not only a relative block belonging to the temporally same space and the same color component as the target block may be targeted (prediction mode using extrapolation, interpolation, average, etc.), but also a relative block belonging to the temporally same space and the different color component as the target block may be targeted (prediction mode in which data of the different color component is copied).

Here, in the case of inter prediction, a motion vector and a reference picture are targeted as examples of prediction information, but various information such as a motion information encoding mode, a motion prediction direction, and a motion model may be included.

For example, for reference setting of a target block, reference setting of a relative block may be used. In detail, in intra prediction, the MPM candidate group of the relative block may be used as the MPM candidate group of the target block. In addition, in inter prediction, a motion prediction candidate group of a relative block may be used as a motion prediction candidate group of a target block. That is, even if the candidate group is constructed based on the relative block, it means that the candidate group of the relative block may be used as it is without going through a separate candidate group construction in the target block.

In the above example, the description has been made on the assumption that the relative block is one block having a horizontal relationship with the target block. However, numerous relative blocks may exist in an image, and at least one relative block to be used for encoding the target block must be specified. The following case classification is only an example, and it is necessary to understand that various case configurations and definitions are possible without being limited thereto.

Here, a block belonging to the same space and adjacent to the target block may be specified as a relative block (case 1). Alternatively, a block belonging to the same space and not adjacent to the target block may be specified as a relative block (case 2). Alternatively, a block belonging to a different space may be specified as a relative block (case 3). Alternatively, blocks belonging to all or some of (case 1) to (case 3) may be specified as relative blocks.

Here, in the case of (case 1), all or some of the top-left, top, top-left, top-right and bottom-left blocks (L, U, UL, UR, DL) adjacent to the target block may be specified as a relative block. In the case of (case 2), one or more of the blocks that are not adjacent to the target block may be specified as a relative block. In case of (case 3), all or some of the center, left, right, top, bottom, top-left, top-right, bottom-left, and bottom-right blocks (C, L, R, U, D, UL, UR, DL, DR) adjacent to the target block and one or more of blocks not adjacent to the target block may be specified as the relative blocks.

Various verification methods exist in order to specify a relative block. First, a block including coordinates of a predetermined position based on the target block may be specified as the relative block. First, it is assumed that the target block (m×n) has a range of (a+m−1, b+n−1) based on the top-left coordinates of (a, b).

(case 1 or case 3) The C block is described on the assumption that the target block and the position in each picture are the same. Therefore, descriptions of blocks having the same alphabet in the same image Curr and the different image Diff may be common. However, (in case of case 3), the position of the C block may not be the same as that of the target block in a picture, and in the example described later (i.e., a block belonging to Diff), the pixel position may be changed according to the position of the C block.

C block refers to a block including a pixel at a predetermined position among internal pixels of the target block such as (a, b), (a, b+n−1), (a+m−1, b), (a+m−1, b+n−1), (a+m/2−1, b+n/2−1), (a+m/2+1, b+n/2−1), (a+m/2−1, b+n/2+1), (a+m/2+1, b+n/2+1). And, L block refers to a block including a pixel at a predetermined position among pixels beyond the left boundary of the target block such as (a−1, b), (a−1, b+n−1), and U block refers to a block including a pixel at a predetermined position among pixels beyond the top boundary of the target block such as (a, b−1), (a+m−1, b−1). In addition, UL block refers to a block including a pixel at a predetermined position among pixels beyond the top left boundary of the target block, such as (a−1, b−1), UR block refers to a block including a pixel at a predetermined position among pixels beyond the top right boundary of the target block, such as (a+m, b−1), (a−1, b+n), and DL block refers to a block including a pixel at a predetermined position among pixels beyond the bottom left boundary of the target block such as (a−1, b+n). In the case of the right, bottom, and bottom-right directions, they are omitted because they may be derived from the above description.

In the above description, an example was given of specifying a block including a pixel at one position among pixels existing in a block of each direction as a relative block, but two or more relative blocks may be specified in all or some directions, and two or more pixel positions may be defined for this.

(case 2) $F_k$ block (k is 0~2) may mean a block including a pixel separated by a predetermined length (off_x, off_y, etc.) in a predetermined direction of horizontal/vertical/diagonal line such as (a−off_x, b), (a, b−off_y), (a−off_x, b−off_y). Here, the predetermined length may be an integer of 1 or more, such as 4, 8, 16, etc., and may be set based on the horizontal and vertical lengths of the target block. Alternatively, it may be set based on the horizontal and vertical lengths of the maximum coding block, and various examples of modifications thereof may be possible. The predetermined length may be set implicitly as in the above example, or a related syntax element may be generated as an explicit value.

As another method of specifying the relative block, a block having mode information having the same/similarity as the encoding information of the target block may be specified as the relative block. In this case, the mode information refers not to information to be encoded (or use/prediction, candidate group construction, etc.) at the current stage, but information that has already been encoded or has a different property/meaning that has already been determined. The determined information may be information determined in a previous step in a mode determination process or information restored in a previous step in a decoding process.

For example, when a target block performs inter prediction using a non-translational motion model, a block encoded using the non-translational motion model among previously coded blocks may be specified as a relative block. In this case, motion vector information according to a non-translational motion model of the specified relative block may be used to construct a candidate group for motion vector prediction according to the non-translational motion model of the target block.

In the above example, the motion model information refers to information having different properties/meanings used to check the sameness/similarity with the target block, and the motion vector according to the motion model (non-translational motion model) of the relative block may be information used to construct a motion vector prediction candidate group according to the motion model of the target block. In this case, the relative block may or may not be adjacent to the target block. It can be useful when a block in a region not adjacent to the target block is also specified as a relative block and used/referenced, if there are few modes having the sameness/similarity with the target block.

A relative block used/referenced for encoding of the target block may be determined in consideration of the following.

A relative block may be determined based on information to be used/referenced for encoding of the target block. Here, the information to be used/referenced for encoding of the target block is pixel value information for prediction, mode information related to prediction/transform/quantization/in-loop filter/entropy encoding or the like, and reference candidate group information related to prediction/transform/quantization/in-loop filter/entropy encoding or the like.

In addition, the relative block may be determined based on state information of the target block and image information to which the target block belongs. Here, the state information of the target block may be defined based on a block size, a block shape, a horizontal/vertical length ratio of a block, a position in a unit such as picture/division unit (slice, tile, etc.)/maximum coding block. Here, image information to which the target block belongs may be defined based on an image type (I/P/B), a color component (Y/Cb/Cr), and the like.

Also, a relative block may be determined based on encoding information of the target block. In detail, the relative block may be determined based on whether or not it has information on which sameness/similarity with the target block exists. Here, the information referenced for sameness/similarity may be mode information related to prediction/transform/quantization/in-loop filter/entropy encoding, and the like.

In consideration of all or some of the factors mentioned in the above example, the category (the aforementioned case), the number, and the position of the relative block may be determined. In detail, which category is selected may be determined, and the number and position of relative blocks supported in the selected category may be determined. In this case, the number of blocks supported in each category may be m, n, o, and these may be integers of 0 or more, such as 0, 1, 2, 3, 5, etc.

Relative block (block position) may be determined in the direction such as left, right, top, bottom, top-left, top-right, bottom-left, bottom-right, center, etc. with the center of the target block (or a block corresponding to the target block in an image temporally different from the image to which the target block belongs). For example, a relative block may be determined from the block closest to the direction. Alternatively, a relative block may be determined among blocks additionally satisfying the direction and a certain range/condition. It may belong to a maximum coding block different from the maximum coding block to which the target block belongs, or may be a block at a position having a difference based on a horizontal or vertical length of the target block (e.g., left, top, top-left directions).

Further, the relative block may be determined based on a coding order, and in this case, the coding order may be defined by various scan methods such as raster scan and z-scan. As an example, a predetermined number of blocks may be included as relative blocks (based on the coding order being close), and the predetermined number may be an integer greater than or equal to 0, such as 0, 1, 2, 3, etc. That is, the relative block may be managed in a memory management method such as FIFO (First-in, First-out) according to the coding order, and it may be the example of determining (decision to be included in the candidate group) the relative block that can occur in (case 2).

When one relative block is supported, it may mean that only information of the corresponding block may be used/referenced. In addition, even if a plurality of relative blocks are supported, one piece of information may be derived based on the plurality of relative blocks according to an encoding setting. For example, in inter prediction, three relative blocks, such as left, top, and top-right blocks, are specified for motion vector prediction to support three motion vectors, but one motion vector may be derived through a method such as a median value (or average) of motion vectors of the three blocks according to the encoding setting to use as a motion vector prediction value of the target block.

In the case of the above example, it may be an encoding setting that can reduce occurrence of optimal candidate selection information generated by supporting two or more candidates. However, it can be difficult to expect that one candidate having high correlation with the encoding information of the target block is derived. Therefore, a method of constructing a candidate group with a plurality of candidates may be more efficient. Of course, as the number of candidates included in the candidate group increases, the amount of information for expressing this may increase, so it is important to construct an efficient candidate group.

Therefore, a relative block such as the above-described various examples may be supported, but it may be necessary to specify an optimal relative block in consideration of general image characteristics and the like, and to construct a candidate group based thereon. In the present invention, it is assumed that a candidate is constructed through two or more pieces of information from one or more relative blocks.

The following shows a candidate group construction based on a block having a horizontal relationship with the target block and encoding/decoding process.

A block referred to for encoding information of a target block is specified (1). The candidate group is constructed based on the encoding information of the specified block in a predetermined order (2). One candidate of the candidate group is selected based on the encoding information of the target block (3). An image encoding/decoding process is performed based on the selected candidate (4).

In (1), a relative block used for constructing a candidate group for encoding information of the target block is specified. In this case, the relative block may be a block having a horizontal relationship with the target block. It has already been described that the relative blocks of various categories as described above may be included, and that the relative block may be specified in consideration of various information such as state information of the target block in addition to encoding information of the target block.

In (2), a candidate group is constructed, according to a predetermined order, based on encoding information of the relative block specified through the above process. Here, information obtained based on encoding information of one relative block may be included in the candidate group, or information obtained based on encoding information of a plurality of relative blocks may be included in the candidate group. In this case, a fixed order may be supported for the candidate group construction order, or an adaptive order based on various coding elements (elements to be considered when specifying a relative block, etc.) may be supported.

In (3), one candidate of the candidate group is selected based on the encoding information of the target block, and in (4), an image encoding/decoding process may be performed based on this.

The flow chart may be a process that is checked and performed in block units. Here, in the case of some steps (1, 2), it may be a process that is checked and performed in an initial stage of encoding. Even if the content is not mentioned in the above (1) to (4), since it is possible to derive through the above-described various embodiments, a detailed description thereof will be omitted. In general, it is difficult to confirm in advance which block has a high correlation with the target block among blocks having a horizontal relationship. A method of confirming in advance what correlation it has with a target block among blocks having a horizontal relationship will be described later. In addition, although (3) describes a case where one candidate of the candidate group is selected, two or more pieces of information may be also selected according to the type of encoding information, encoding setting, etc., and this may be a description that is commonly applicable to the present invention.

The target block and the relative block may be one of units of encoding/prediction/transform/quantization/in-loop filter, and the like, and the target block and the relative block may be set in the same unit. For example, when the target block is a coding block, a relative block may also be a coding block, and the modification set in a different unit according to the encoding setting may also be possible.

Figure 7:
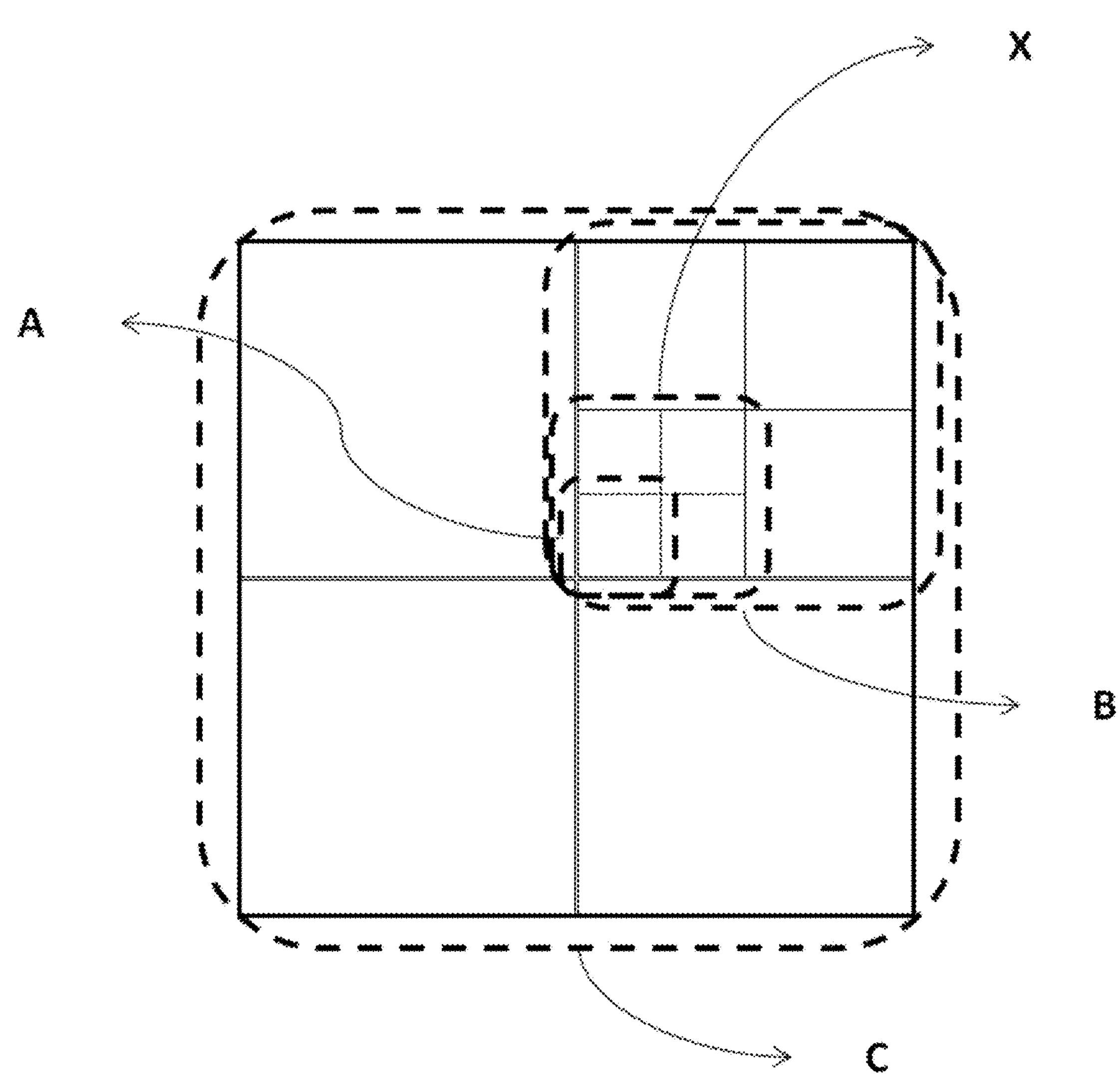
FIG. 7 shows examples of various arrangements of relative blocks having a vertical relationship with a target block.

FIG. 7 shows examples of various arrangements of a relative block in a vertical relationship with a target block.

FIG. 7 is a case in which recursive tree-based partitioning (QT) is performed, and a description will be given centering on X and A to C blocks. Blocks B(1), X(2), and A(3) may be obtained as the division depth increases starting from a basic coding block (CTU. C block) having a division depth of 0. Here, a block placed in a vertical relationship with the target block may be classified into an upper block (or ancestor block) and a lower block (or descendant block). In this case, the upper block of the target block X may be a B or C block, and the lower block may be an A block. Here, the target block and the relative block may be set as an upper block and a lower block, respectively, or may be set as a lower block and an upper block, respectively.

For example, in this example, if it has a larger value than the division depth (k) of the target block, the relative block may be a child (k+1) or grandchild (k+2) block, and if it has a smaller value, the relative block may be a father (k−1) or grandfather (k−2) block. That is, in addition to defining a vertical relationship between existing blocks, detailed relationships between blocks may be confirmed through the division depth.

Here, as in the above example, one tree method is supported and comparison through a common division depth may be possible. When multiple tree methods are supported and more than one division depth according to each tree method is supported, the detailed relationship may be checked by considering the number of divisions and each division depth, not simple classification as in the example above.

For example, if QT is performed 1 time in a 4M×4N block, a 2M×2N block may be obtained at (QT) division depth 1, but when BT is performed 2 times, a 2M×2N block may be obtained. However, the (BT) division depth is the same as what can be obtained at 2. In this case, 4M×4N block may be a father (QT) or grandfather (BT) block for a 2M×2N block, and conversely, may be a child (QT) or grandchild (BT) block, and detailed relationships may be determined based on the block division result.

In the above example, the starting unit of the division is the maximum coding unit (the highest ancestor block, the maximum size that a block can have. Here, it is assumed that it is a coding unit or block. When a block is a unit of prediction or transform, it can be understood as a maximum prediction block or a maximum transform block). It is impossible to have a vertical relationship that exceeds the maximum coding unit, but a block area having a vertical relationship can be freely designated according to the encoding setting separately from the block division setting such as the maximum coding unit. In the present invention, it is assumed that a vertical relationship does not deviate from the maximum coding unit. In addition, the relationship between blocks will be described later centering on the tree-based partitioning method, but it will be mentioned in advance that the same or similar application may be possible to the index-based partitioning method.

For encoding of the target block, encoding information/reference setting of the relative block having a vertical relationship may be used. For convenience of explanation, it is assumed that the target block is a lower block of the relative block. In this case, the upper block is not an independent unit that performs encoding, prediction, transform, and the like, and may be a temporary unit composed of a plurality of lower blocks. That is, it is necessary to understand that it is a starting unit or an intermediate unit of a block partitioning process for obtaining an independent unit (i.e., an encoding/prediction/transform block, etc. in which partitioning is no longer performed) that performs encoding.

For example, a reference pixel of a relative block may be used to generate a prediction value of the target block. In detail, in intra prediction, a prediction value of the target block may be obtained by applying a method such as extrapolation, interpolation, averaging, or template matching to the reference pixel of the relative block. In addition, in inter prediction, a prediction value of the target block may be obtained by using a method such as template matching with a reference pixel of a relative block.

Here, the reference pixel of the relative block is not a pixel located in the relative block, but refers to a pixel obtained by assuming that the relative block is a unit for performing intra prediction/inter prediction. That is, it means that the pixels of the block (e.g., closest to the left, top, top-left, top-right, bottom-left direction) having a horizontal relationship to the relative block (upper block) are used for intra prediction/inter prediction of the target block (lower block).

For example, for reference setting of a target block, reference setting of a relative block may be used. In detail, in intra prediction, the MPM candidate group of the relative block may be used as the MPM candidate group of the target block. In addition, in inter prediction, a motion prediction candidate group of a relative block may be used as a motion prediction candidate group of a target block. That is, even if the candidate group is constructed based on the relative block, it means that the candidate group of the relative block may be used as it is without going through a separate candidate group construction for the target block.

In the above example, a prediction value and a reference setting are determined based on a relative block rather than a target block, and thus a problem of performing encoding using information having poor correlation with the target block may occur. However, since related information is not obtained from completely spaced apart areas, it is likely that some degree of correlation exists. Since the process to be performed in each lower block unit is integrated into one common process in the upper block, complexity can be reduced. In addition, parallel processing of lower blocks belonging to an upper block may be possible.

In the above example, the description has been made on the assumption that the relative block is one block having a vertical relationship with the target block, but there may be numerous relative blocks in the image, and at least one relative block to be used for encoding the target block must be specified.

The following shows a description of a support condition/range that a block having a vertical relationship may have, and it may be determined based on all or some of the factors mentioned in the examples to be described later.

(case 1) The upper block may be smaller than or equal to a predetermined first threshold size. Here, the first threshold size may mean a maximum size that an upper block can have. Here, the first threshold size may be expressed in terms of width (W), height (H), W×H, W*H, and the like, and W and H may be integers of 8, 16, 32, 64 or more. Here, the block having the first threshold size may be set based on the size of the maximum coding block, the maximum prediction block, and the maximum transform block.

(case 2) The lower block may be greater than or equal to a predetermined second threshold size. Here, the second threshold size may mean a minimum size that a lower block can have. Here, the second threshold size may be expressed in terms of width (W), height (H), W×H, W*H, and the like, and W and H may be integers of 4, 8, 16, 32 or more. However, the second threshold size may be set to be smaller than or equal to the first threshold size. Here, the block having the second threshold size may be set based on the size of the minimum coding block, the minimum prediction block, and the minimum transform block.

(case 3) The minimum size of the lower block may be determined based on the size of the upper block. Here, the minimum size (e.g., W % p or H>>q, etc.) of the lower block may be determined by applying a predetermined division value (p) or a shift operation value (q. right shift operation) to at least one of the width (W) or the height (H) of the upper block. Here, the division value may be an integer of 2, 4, 8 or more, and the shift operation value q may be an integer of 1, 2, 3 or more.

(case 4) The maximum size of the upper block may be determined based on the size of the lower block. Here, the maximum size (e.g., W*r or H<<s, etc.) of the upper block may be determined by applying a predetermined multiplication value (r) or a shift operation value (s. left shift operation) to at least one of the width (W) or the height (H) of the lower block. Here, the multiplication value may be an integer of 2, 4, 8 or more, and the shift operation value s may be an integer of 1, 2, 3 or more.

(case 5) The minimum size of the lower block may be determined in consideration of the size and the partition setting of the upper block. Here, the division setting may be determined by a division type (tree type), division depth (common depth, individual depth for each tree), and the like. For example, if QT is supported in the upper block, the size of the block in which partitioning is performed m times may be determined as the minimum size of the lower block, and if BT (or TT) is supported, the size of the block in which partitioning is performed n times may be determined as the minimum size of the lower block, and if QT and BT (or TT) are supported, the size of the block in which partitioning is performed l time may be determined as the minimum size of the lower block. Here, m to l may be an integer of 1, 2, 3 or more. The division depth (m) of the tree divided into smaller blocks (or divided into a larger number) (due to one dividing operation) may be set to be less than or equal to the division depth (n) of the tree that is not. In addition, the division depth (l) when the tree division is mixed may be set to be greater than or equal to the division depth (m) of a tree divided into smaller blocks, and may be set to be less than or equal to the division depth (n) of a tree that is not.

Alternatively, the maximum size of the upper block may be determined in consideration of the size and division setting of the lower block. In this description, it may be derived from the above example in reverse, and a detailed description will be omitted.

A relative block used/referenced for encoding of the target block may be determined in consideration of the following.

A relative block may be determined based on information to be used/referenced for encoding of the target block. Here, information to be used/referenced for encoding of the target block may be pixel value information for prediction and reference candidate group information related to prediction/transform/quantization/in-loop filter/entropy encoding, and the like.

In addition, the relative block may be determined based on state information of the target block and image information to which the target block belongs. Here, the state information of the target block may be defined based on a block size, a block shape, a horizontal/vertical length ratio of a block, a position in a unit such as picture/division unit (slice, tile, etc.)/maximum coding block. Here, image information to which the target block belongs may be defined based on an image type (I/P/B), a color component (Y/Cb/Cr), and the like.

The number, size, position, etc. of the relative blocks may be determined in consideration of all or some of the factors mentioned in the above example. In detail, it is possible to determine whether to use/reference information of a block having a vertical relationship for encoding of a target block, and (when used/referenced) the position and size of the relative block may be determined. Here, the position of the relative block may be expressed in a predetermined coordinate within the block (e.g., top-left coordinate), and the size of the relative block may be expressed in terms of width (W) and height (H). The relative block may be specified by combining these.

For example, if there is no special range limitation for the lower block, all lower blocks (target blocks) belonging to the relative block may use/reference encoding information of the relative block. Alternatively, if the range for the lower block is limited, if it belongs to the relative block and is larger than the size for the lower block, encoding information of the relative block may be used/referenced. In addition, when two or more relative blocks are supported, selection information of the relative block may be additionally generated.

The following shows a candidate group construction based on a block having a vertical relationship with the target block and encoding/decoding processes.

A base block for specifying a block to be referenced is determined (1). A block to be referenced for encoding information of a target block is specified based on the determined base block (2). The candidate group is constructed, in a predetermined order, using the encoding information of the specified block (3). One candidate of the candidate group is selected based on the encoding information of the target block (4). An image encoding/decoding process is performed based on the selected candidate (5).

In (1), a block (base block) serving as a criterion for constructing a candidate group relating to encoding information of the target block is determined from among the target block or a first relative block. Here, the first relative block may be a block (here, an upper block) having a vertical relationship with the target block.

In (2), when a base block is determined through the above process, a second relative block used to construct a candidate group relating to encoding information of the target block is specified. Here, the second relative block may be a block having a horizontal relationship with the base block. In (3), the candidate group is constructed, in a predetermined order, using encoding information of the second relative block specified through the above process. A description of a block having a horizontal relationship will be omitted since it can be derived not only through a candidate group construction based on a block having a horizontal relationship and encoding/decoding processes, but also through various embodiments described above.

In (4), one candidate of the candidate group is selected based on the encoding information of the target block, and in (5), an image encoding/decoding process may be performed based on this.

In this case, when the upper block and the lower block are determined based on the vertical relationship setting between the blocks, since the process of constructing a candidate group based on the upper block is performed only once, the lower block may use/borrow them. That is, the flow chart may be a configuration that can be generated in a block in which encoding/decoding is performed first. If the construction of the candidate group based on the upper block has already been completed and the base block is determined as the relative block in some orders (2, 3), the already constructed candidate group may be simply used/borrowed.

In the above example, if a candidate group is constructed based on an upper block, the lower block is described as a simple use/borrowing configuration, but is not limited thereto.

For example, even if a candidate group is constructed based on the upper block, some candidates may be fixed regardless of the lower block, and the other candidates may be adaptive based on the lower block. That is, it means that some candidates can be deleted/added/changed based on the lower block. In this case, the deletion/addition/change may be performed based on the position and size of the lower block within the upper block.

That is, even if the base block is determined as a relative block in some steps (2, 3), a candidate group in which all or some of the modifications to the already constructed candidate group are reflected may be constructed.

The target block and the relative block may be one of units of encoding/prediction/transform/quantization/in-loop filter, and the like, and the target block may be the same unit as the relative block or an upper unit. For example, when the target block is a coding block, the relative block may be a coding block, and when the target block is a coding block, the relative block may be a prediction block or a transform block.

Figure 8:
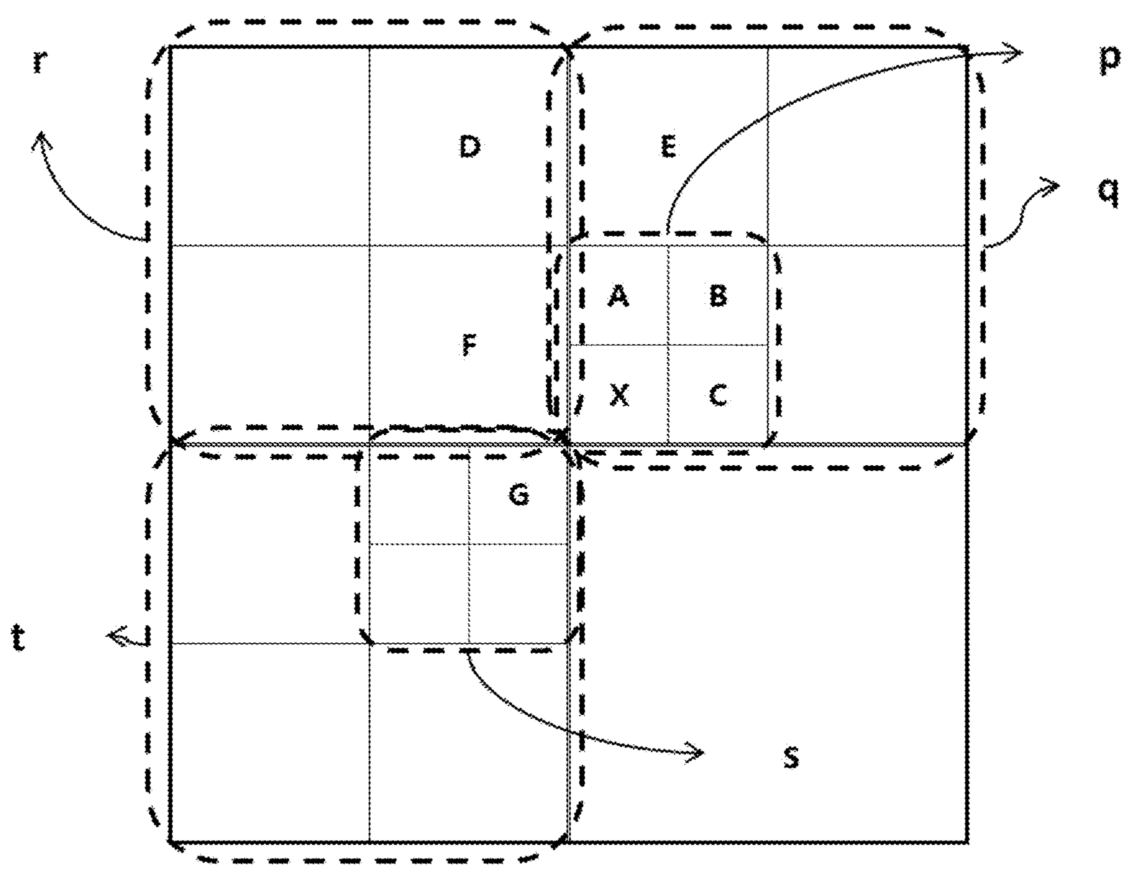
FIG. 8 shows various arrangement examples of relative blocks having a vertical relationship and a horizontal relationship with a target block.

FIG. 8 shows various arrangement examples of a relative block having a vertical relationship and a horizontal relationship with a target block.

FIG. 8 shows a case in which recursive tree-based partitioning (quad tree) is performed, and will be described centering on X, A to G, and p to t blocks. Starting from a basic coding block (CTU) with a division depth of 0, as the division depth increases, q/r/t (1), p/D/E/F/s (2), A/B/C/G/X (3) blocks may be obtained. Here, it may be classified into a block having a vertical relationship with the target block and a block having a horizontal relationship with the target block. In this case, the relative blocks (upper block) having a vertical relationship with the target block X may be p and q blocks (excluding CTU), and the relative blocks having a horizontal relationship may be A to G blocks.

Here, in the case of some relative blocks, not only blocks having a smaller value but also blocks having a larger value than the division depth (k) of the target block exist. It is assumed that the present embodiment targets the block mentioned above and the target block has the largest division depth (that is, no more divisions).

In the block division, the division result is determined according to the characteristics of the image. The block division may be minimized in a flat portion such as a background or an area with little temporal change. The block division may be performed a lot in a portion with a complex pattern or an area with rapid temporal change.

Through the above-described example of the present invention, it has been mentioned that blocks having many horizontal relationships or vertical relationships may be used/referenced for encoding of a target block. Through an example to be described later, various examples of a method of more efficiently using them by considering a block having a horizontal relationship and a block having a vertical relationship around the target block will be presented. Therefore, it is premised that the description of the above-described horizontal and vertical relationships may be applied in the same or similar manner to the content to be described later.

Next, various cases of correlation between blocks placed in a horizontal relationship according to the type (method) of block division will be described. In this case, it is assumed that QT, BT, and TT are supported as the division scheme, BT is symmetrical division (SBT), and TT is divided in a 1:2:1 ratio. In addition, it is premised that blocks placed in a general horizontal relationship may have high or low correlations (general relationship). In each case, it is assumed that only one described tree method is supported.

Figure 9:
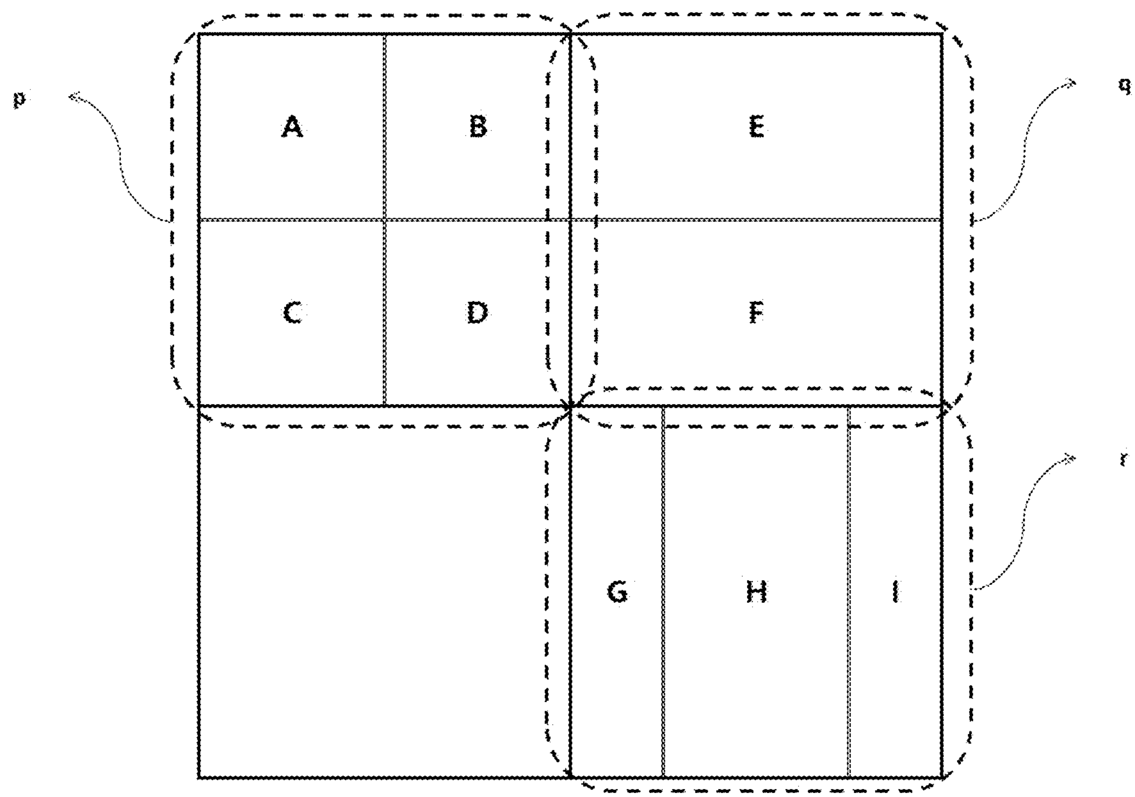
FIG. 9 is an exemplary diagram of block division obtained according to a tree type.

FIG. 9 is an exemplary diagram of block division obtained according to a tree type. Here, p to r represent examples of block division of QT, BT, and TT. It is assumed that block division is performed when the encoding of the block itself is not efficient because the characteristics of some regions in the block are different.

In the case of QT(p), it is divided into two horizontally and vertically, respectively, and it can be seen that at least one of the four sub-blocks has different characteristics. However, since 4 sub-blocks are acquired, it is not possible to know which specific sub-block has different characteristics.

For example, blocks A to D may all have different characteristics, only one of the blocks A to D may have different characteristics and the rest may have the same characteristics. Blocks A and B have the same characteristics, and blocks C and D may have the same characteristics. Blocks A and C may have the same characteristics, and blocks B and D may have the same characteristics.

If blocks A and B, blocks C and D each have the same characteristics and BT is supported, horizontal division among BT may be performed. However, if it is divided by QT like p, it can be seen that blocks A and B, blocks C and D have different characteristics from each other. However, in this example, since it is assumed that only QT is supported, the correlation between the blocks cannot be accurately figured out.

If only QT is supported and performed for an upper block with a division depth of 1 difference around the target block (one of the sub-blocks), the correlation between the target block and the relative block (a block other than the target block among the sub-blocks) may be high or low.

BT(q) is divided into two in either a horizontal or vertical direction, and it can be seen that the two sub-blocks (E and F blocks) have different characteristics. It can be derived as the above definition under the assumption that it would not have been divided if the characteristics between sub-blocks were the same or similar. If only BT is supported and performed for an upper block having a division depth of 1 difference around the target block, the correlation between the target block and the relative block may be low.

In the case of TT(r), it is divided into three in either a horizontal or vertical direction, and it can be seen that at least one of the three sub-blocks has different characteristics. However, since 3 sub-blocks are obtained, it is not possible to know which specific sub-block has different characteristics.

For example, blocks G to I may all have different characteristics. Blocks G and H have the same characteristics while block I may have different characteristics. Blocks H and I have the same characteristics while block G may have different characteristics.

If blocks G and H have the same characteristics, block I has different characteristics, and BT (asymmetric) is also supported, vertical division (3:1) among BT may be performed, but if it is divided by TT like r, it can be seen that blocks G and H and block I have different characteristics. However, since it is assumed that only TT is supported in this example, the correlation between the blocks cannot be accurately figured out. If only TT is supported and performed for an upper block with a division depth of 1 difference around the target block, the correlation between the target block and the relative block may be high or low.

It has been described above that the correlation between blocks may be high or low in the case of QT and TT among the partitioning schemes. Assume that only the partitioning scheme (e.g., QT) is supported and encoding information of the remaining subblocks except for one is known (e.g., D block). If the encoding information of the remaining sub-blocks A to C except the D block is the same or similar, the D block may have different characteristics and thus may be divided by QT. In this way, it is also possible to identify the correlation information by checking the encoding information of the lower block belonging to the upper block. However, since the probability of occurrence is low and it may be a complex case, a description of this will only mention the possibility and a detailed description thereof will be omitted. For reference, in the above case, since the D block has a low correlation with a block having a horizontal relationship, the encoding information of the block having a vertical relationship, which refers to the candidate group construction information of the upper block of the D block (a block including A and D), may be used/referenced.

In the above example, correlation between sub-blocks has been described when one tree division is supported for the upper block. That is, when using/referencing the encoding information of a block having a horizontal relationship for encoding of the target block, the encoding information of the relative block is more efficiently used/referenced by checking the division state (path) between the target block and the relative block. For example, when constructing a candidate group, information on a block determined to have low correlation may be excluded or a low priority may be assigned to it. Alternatively, information and reference settings of a block having a vertical relationship may be used.

In this case, the case where one tree division is supported may include a case where only one tree method is supported for block division, and even if multiple tree divisions are supported, may also include a case where only one tree division is supported by the maximum value, the minimum value, the maximum division depth of a block according to each tree method, and a block division setting in which a tree not allowed at a previous division depth is not supported at a later division depth. That is, only QT is supported and may be divided using QT, and QT/BT/TT is supported, but only BT is possible at this stage, so it may be divided using BT.

The following will be described for the case of checking the correlation between each block when multiple tree divisions are supported.

Figure 10:
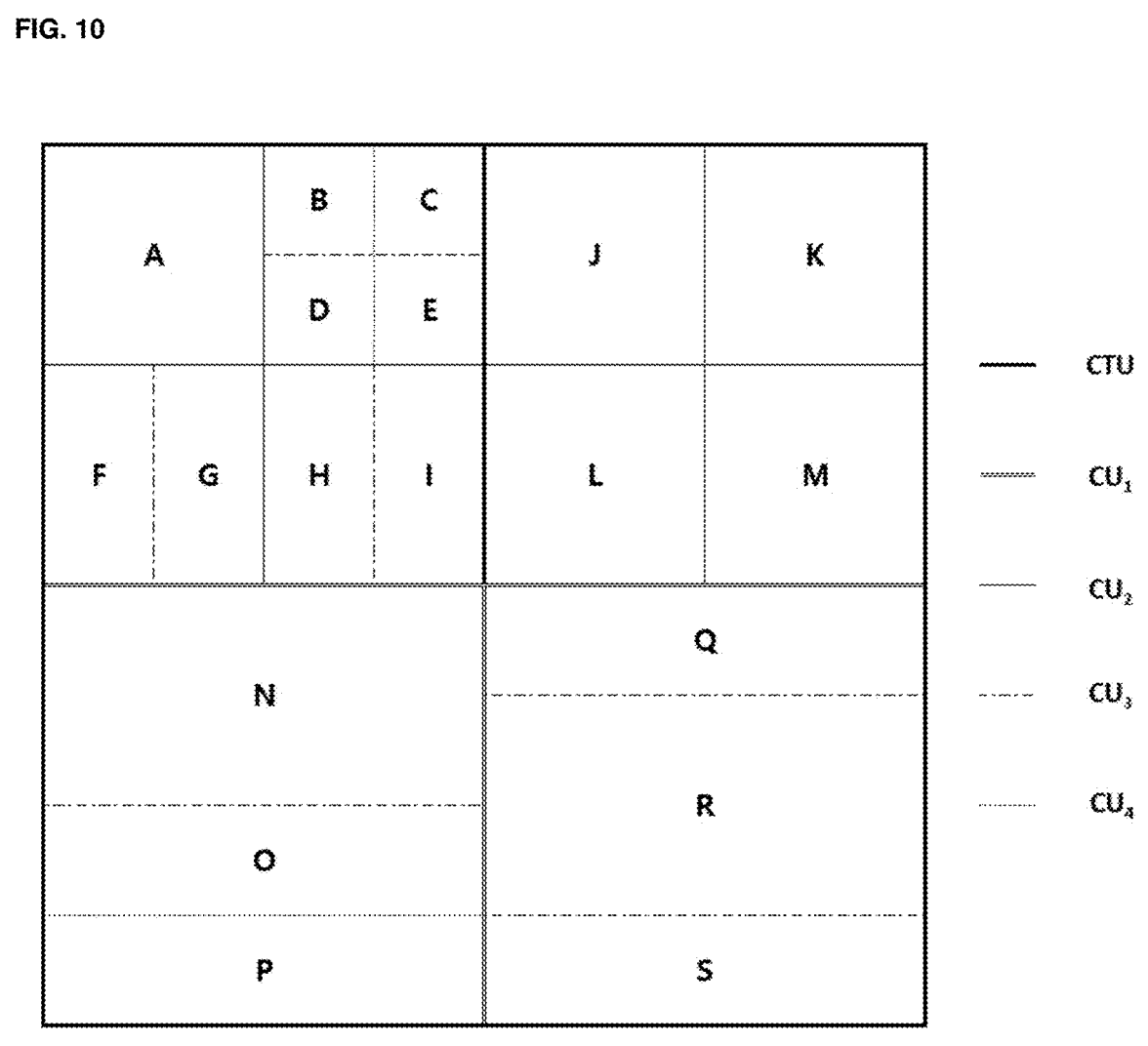

FIG. 10 is an exemplary diagram of division obtained due to QT, BT, TT. In this example, it is assumed that the maximum coding block is 64×64 and the minimum coding block is 8×8. In addition, it is assumed that the maximum value of the block that supports QT is 64×64, the minimum value is 16×16, the maximum value of the block that supports BT is 32×32, the minimum value is 4 being one of the horizontal/vertical lengths of the block, and maximum division depth is 3. In this case, it is assumed that the division setting for TT is determined together with BT (they are used in a bundle). It is assumed that QT and BT (QT, BT) are supported for the upper blocks (A to M), asymmetric BT (ABT) is additionally supported for the bottom-left blocks (N to P) (QT, BT<or, SBT>, ABT), TT is additionally supported for the bottom-right blocks (Q to S) (QT, SBT, ABT, TT).

(Base Block: Block Including B, C, D, E)

Blocks B to E may be sub-blocks that may be obtained through QT (divide once), and may be sub-blocks that may be obtained through BT (once vertical division+twice horizontal division. Or once horizontal division+twice vertical division. Number of divisions 3 times).

Since the maximum block size that supports QT is 16×16, blocks B to E cannot be obtained through QT and may be sub-blocks divided through BT. In this example, horizontal division among BT is performed (B+C/D+E), and vertical division is performed in each area (B/C/D/E). Therefore, as described above, blocks B and C, blocks D and E obtained as BT from the same upper block (parent block, division depth difference of 1) may have low correlation.

In addition, since blocks B and D or blocks C and E are divided, the correlation between blocks B and D or blocks C and E may be low. This is because if the correlation is high, only vertical division among BT is performed, and division may not be performed in each region.

In the above example, it was mentioned that the correlation between sub-blocks acquired by BT is low, but this is limited to sub-blocks belonging to the same upper block (parent block, division depth difference of 1), but in this example, the correlation between blocks may be checked by expanding to the same upper block (grandparent block, division depth difference of 2).

(Base Block: Block Including J, K, L, M)

Blocks J to M may be sub-blocks that may be obtained through QT or sub-blocks that may be obtained through BT.

Since it is a range that both QT and BT can be supported, the tree method may be selected as the optimal division type. This is the example where QT is performed. It was mentioned that the correlation between sub-blocks obtained through QT may be high or low through the above example. However, in this example, the correlation between sub-blocks may be determined differently, because a plurality of tree divisions are supported.

Each of blocks J and K or blocks L and M may have low correlation, and each of blocks J and L or blocks K and M may have low correlation. This is because if the correlation between blocks adjacent to the horizontal and vertical directions among blocks J to M is high, even if QT is not performed and BT is performed, a region with high correlation may not be divided.

In the above example, it was mentioned that the correlation between sub-blocks acquired by QT may be high or low, but this was a case where a single tree method was supported, and in this example, when a plurality of tree methods are supported, the correlation between blocks may be checked based on the number of various cases of block division.

(Base Block: Block Including N, O, P)

Blocks N to P may be sub-blocks (2:1:1 ratio) obtained through BT (once horizontal division+once horizontal division).

(when only symmetrical BT<SBT> is supported) N and O blocks may have high or low correlation. In the case of the N block, since it is acquired from the upper block through BT, the correlation with the region where the O and P blocks are bound may be low. However, it cannot be said that the N block has a low correlation with the O and P blocks. Of course, N block may have a low correlation with O and P blocks. Alternatively, the N block may have a high correlation with the O block, and may have a low correlation with the P block, and vice versa.

In this example, the asymmetric BT<ABT> may be supported. If the N and O blocks have a high correlation, the region of the N and O blocks are grouped, and the horizontal division of the asymmetric BT in a 3:1 ratio may be performed. However, since BT (SBT) is performed twice, the correlation between the N and O blocks may be low.

(Base Block: Block Including Q, R, S)

The Q to S blocks may be sub-blocks obtained through TT (once horizontal division).

(when only TT is supported) The Q and S blocks may have a high or low correlation. In this example, asymmetric BT may be supported. If the correlation between the Q and R blocks is high, the region of the Q and R blocks are grouped, and the horizontal division of the asymmetric BT in a 3:1 ratio may be performed. However, since TT is performed, the correlation between Q and R blocks may be low.

As in the above example, a correlation between a target block and a relative block having a horizontal relationship with the target block may be estimated based on the supported division method and division setting. Let's look at various cases regarding the correlation between blocks through the following.

FIGS. 11A to 11H are exemplary diagrams for checking the correlation between blocks based on a division method and division setting.

Figures 11A, 11B, 11C, 11D, 11E, 11F, 11G, 11H:
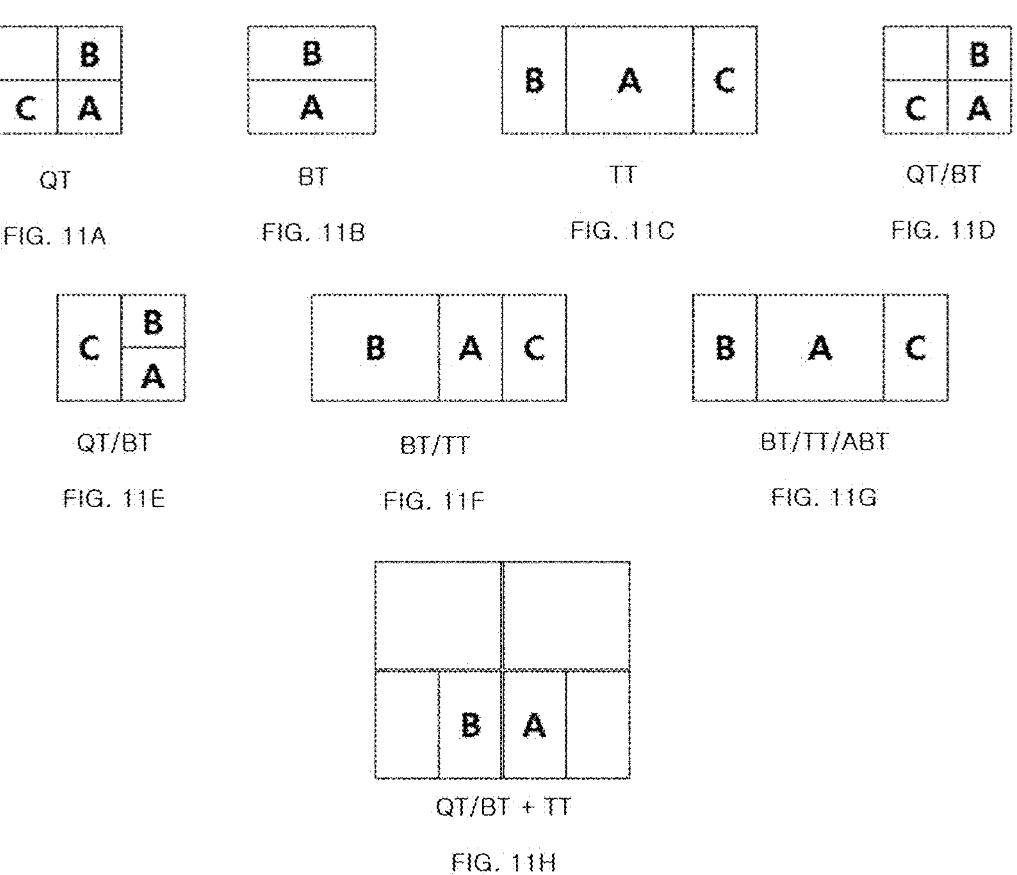
FIGS. 11A to 11H are exemplary diagrams for checking the correlation between blocks based on a division method and a division setting.

FIGS. 11A to 11C are cases in which QT, BT, and TT are respectively performed, and only QT, BT, and TT may be supported for the upper block. As described above, in the case of QT and TT, the correlation between adjacent blocks (A and B or A and C) in a horizontal or vertical direction may be high or low. This is called as a general relationship. Meanwhile, in the case of BT, the correlation between blocks A and B adjacent in a horizontal or vertical direction may be low. This is called as a special relationship.

FIG. 11D is a case where QT is performed and may be a case where QT and BT can be supported. In this example, the correlation between blocks (A and B or A and C) adjacent in the horizontal or vertical direction may be a low special relationship. If the correlation is high, BT may have been applied instead of QT.

FIG. 11E is a case where BT is performed (once vertical division+once horizontal division), and may be a case where QT and BT can be supported. In the case of A and B, since they are divided from the same upper block through BT, it may be a special relationship with low correlation. In the case of A and C, if the regions below A and C are highly correlated, they may be grouped together and division may be performed. However, it may be the case divided into c because of the encoding cost. Of course, because it may be other cases, A and C may be a general relationship with high or low correlation.

FIG. 11F is a case in which BT is performed (once vertical division+once vertical division), and may be a case where BT and TT can be supported. In the case of A and C, since they are divided from the same upper block through BT, it may be a special relationship with low correlation. In the case of A and B, there is a case where A and B are grouped together and division is performed (a part corresponding to 2 of the 1:2:1 area of TT), but additional division of the left area occurs due to TT. In this case, since it is difficult to accurately determine the correlation, A and B may have a general relationship with a high or low correlation.

FIG. 11G is a case in which TT is performed (once vertical division) and may be a case in which BT (or SBT), ABT, and TT can be supported. In this example, the correlation between blocks (A and B or A and C) adjacent in the horizontal or vertical direction may be a low special relationship. If the correlation is high, ABT may have been applied instead of TT.

FIG. 11H is a case where QT and BT are performed (twice vertical division based on BT), and QT and BT can be supported<1>, and may be a case where additional TT can be supported<2>. In the case of A and B, in the situation of <1>, there is no case where the base block is divided in a state where A and B are tied, so the correlation may be a high or low general relationship. However, in the situation of <2>, there is a case where the base block is divided in a state where A and B are tied (after BT horizontal division, BT vertical division on the top side, TT vertical division on the bottom side), but nonetheless, it was divided using QT and BT. Therefore, it may be a special relationship with a low correlation. In this example, in order to check the relationship between blocks, the number of cases regarding block division that can be obtained from the same upper block (difference of 2 in this example) having a difference of 1 or more may be checked.

Through the various examples described above, it has been confirmed that the correlation between blocks is measured in order to use/reference a relative block having a horizontal relationship with the target block. In this case, a relative block belonging to the same space as the target block and adjacent to the target block may be targeted. In particular, the target block and the relative block may be blocks adjacent to each other in a horizontal or vertical direction.

The correlation between blocks may be grasped/estimated based on various information. For example, it is possible to check the correlation between blocks based on state information (size, shape, position, etc.) of the target block and the relative block.

Here, as an example of determining the correlation based on the size of the block, if a predetermined length (horizontal length or vertical length) of a relative block adjacent to a boundary (horizontal or vertical) in contact with the target block is greater than or equal to the predetermined length of the target block, the correlation between blocks may be very high or somewhat low, and this is referred to as a general relation A. If the predetermined length of the relative block is less than the predetermined length of the target block, the correlation between blocks may be somewhat higher or very lower, and this is referred to as a general relation B. In this case, the horizontal length of each block may be compared when touching the horizontal boundary (block on the top side) and the vertical length of each block may be compared when touching the vertical boundary (block on the left side).

Here, as an example of determining the correlation based on the shape of the block, when the target block has a rectangular shape, the correlation with the relative block adjacent to the longer boundary of the horizontal and vertical lengths is the general relation A, and the correlation with the relative block adjacent to the shorter boundary may be a general relationship B.

The above description may be some examples of determining a correlation between blocks based on state information of the block, and various examples of modifications may be possible. It may be possible to grasp the correlation between blocks based on not only the state information of the block but also various information.

The following describes the process of checking the correlation with the relative block having a horizontal relationship with the target block.

(Check Block Division Setting within Image)

<1> Various setting information about block division within an image may be checked. Supported range information, such as a maximum block size, a minimum block size, etc. of a unit such as encoding/prediction/transform (assuming that the target block is a coding unit in this example) is checked. As an example, it may be checked that the maximum coding block is 128×128 and the minimum coding block is 8×8.

<2> The supported division schemes is checked, and conditions such as the maximum block size, the minimum block size, and the maximum division depth supported by each division scheme is checked. For example, the maximum size of a block supporting QT may be 128×128, the minimum size may be 16×16, the maximum size of a block supporting BT and TT may be 128×128 and 64×64, respectively, the minimum size may be 4×4 in common, and the maximum division depth may be 4.

<3> The setting to be assigned to the division scheme, such as the priority, is checked. For example, if divided by QT, QT may be supported for a lower block (subblock) thereof, and if not divided by QT and divided by a different scheme, QT may not be supported for the lower block.

<4> When multiple division schemes are supported, conditions in which some division are prohibited may be checked in order to avoid overlapping results according to the division schemes. For example, after TT is performed, vertical division of BT may be prohibited for the center region. That is, in order to prevent overlapping division results that may occur according to each division scheme, setting information for the prohibited division in advance is checked.

By checking all or some of <1> to <4> and additional other setting information, it is possible to check block candidates that may be obtained in the image. This may be referred to identify block candidates that may be obtained according to the target block and the relative block to be described later.

(Check Information of Block)

The status information, such as the size, shape, position, etc. of the target block and the relative block, may be checked. Here, it is checked whether the position of the block is located at the boundary of a unit, such as a picture, slice, tile group, tile, brick, or block, or is located inside.

The block among the units may be set as the maximum coding block, and the maximum coding block may be an upper block (highest ancestor block) of the target block, but is a unit that is collectively partitioned in a picture unit rather than a form obtained according to characteristics of an image. Therefore, if it belongs to the maximum coding block different from the maximum coding block to which the target block belongs, the correlation between the blocks cannot be checked, so a process of checking whether it belongs to the boundary is required.

In addition, since other units such as a picture and a slice are composed of an integer multiple of the maximum coding block or have a setting that cannot be referenced, a process of checking the correlation may be performed only when it is not a boundary. In other words, the correlation may be checked only when it is not a boundary.

The size, shape, and position of the target block and the relative block may be used to check the division state of each block or the division path from which each block is obtained. A detailed description of this will be described later.

(Check Partition Status and Check Common Upper Block)

The division status of the target block and the relative block may be checked. Here, the division state may mean a division path from which each block is obtained. A process of checking an upper block of each block may be performed by checking the division status, wherein the upper block may mean a block having a vertical relationship with each block. A process of checking the upper block obtained based on state information such as size, shape, and position of each block and a division path is performed.

For example, the state information, such as (32, 32) for a target block position (on the top-left), 8×8 for width and height, p for division depth, and (QT/1-BT/h/0-BT/v/1) for division path, may be obtained. The state information, such as (24, 32) for a relative block position, 8×8 for width and height, q for division depth, and (QT/1-BT/h/0-BT/v/0) for division path, may be checked. Here, the division path may be expressed as a division scheme/division direction (h is horizontal, v is vertical, omitted if not present)/division position (0 to 3 for QT, 0 to 1 for BT, etc.).

In this example, the state information, such as (24, 32) for a position of the upper block (parent block, division depth difference of 1) of the target block, 16×8 for width and height, p−1 for division depth, and (QT/1-BT/h/0) for division path, may be obtained. In this example, the upper block (division depth of q−1) of the relative block may be the same as the upper block of the target block.

For example, the status information, such as (128, 64) for the target block position, 16×32 for width and height, p for division depth, and (QT/3-QT/2-BT/v/1) for division path, may be obtained. The state information, such as (120, 64) for the relative block position, 8×32 for width and height, q for division depth, (QT/3-QT/2-BT/v/0-BT/v/1) for division path, may be obtained.

In this example, the state information, such as (112, 64) for a position of the upper block of the target block (parent block, division depth difference of 1), 32×32 for width and height, p−1 for dividing depth, and (QT/3-QT/2) for dividing path, may be obtained.

On the other hand, the state information, such as a position (112, 64) of the upper block of the relative block (parent block, division depth difference of 1), a width and a height of 16×32, a division depth of q−1, and a division path of (QT/3-QT/2-BT/v/0), may be obtained. The state information, such as (112, 64) for a position of the upper block of the relative block (grandparent block, division depth difference of 2), 32×32 for width and height, q−2 for dividing depth, and (QT/3-QT/2) for dividing path, may be obtained, it can be seen that this is the same upper block as the upper block (parent block) of the target block.

As in the above example, a process of checking an upper block of each block may be performed based on the division state, and a process of checking a common upper block may be performed.

In summary, it is possible to check an upper block having a division depth difference of 1 or more from the target block and the relative block. As an example, an upper block having a division depth difference of c from the target block may be the same as an upper block having a division depth difference of d from the relative block. In this case, c and d may be integers of 1, 2 or more, and c and d may or may not be the same.

Here, it may be unnecessary to check the upper block having a large division depth difference because it is difficult to grasp the complexity or correlation. For example, when an upper block is common in the maximum coding block, it may be difficult to check the correlation between blocks.

To this end, a predetermined first threshold value (maximum value) for c and d may exist, and the first threshold value may be an integer of 1, 2 or more. Alternatively, a predetermined second threshold value relating to the sum of c and d may exist, and the second threshold value may be an integer of 2, 3 or more. That is, when the threshold value condition is not satisfied, the correlation between blocks is not checked.

There may be various methods for checking whether the target block and the relative block have the same upper block. For example, it may be checked by information about a predetermined position of the upper block or information on the width and the height of the block. In detail, it is possible to check whether the upper block is the same based on the top-left coordinate of the upper block and information on the width and the height of the block.

(Check Candidate that can be Obtained)

When a common upper block for the target block and the relative block is obtained, the number of cases of various block divisions that can be obtained from the corresponding upper block may be checked. This may be checked based on the block division setting and the division state of the upper block. Since this has been mentioned through various examples described above, a detailed description will be omitted.

(Check Correlation)

To check the correlation between blocks, the following may be checked in this example. In this example, it is assumed that the maximum value of the division depth difference is 2 for each block.

<1> If the upper block has a division depth difference of 1 from the target block and the relative block, the division schemes that can be supported is checked.

When only one division scheme is available, the correlation may be determined according to the division scheme. If it is QT or TT, it may be set as a general relationship (the correlation may be high or low), and if it is BT, it may be set as a special relationship.

If multiple division schemes are available, it is checked whether it is divided in a form in which the target block and the relative block are combined. If it is, it is set as a special relationship, and if it is not, it is set as a general relationship.

<2> In the case where the upper block has the division depth difference of 2 from at least one of the target block and the relative block, the division schemes that can be supported is checked.

If only one division scheme is available, it may be set as a general relationship regardless of the division scheme.

If multiple division schemes are available, it is checked whether it is divided in a form in which the target block and the relative block are combined. If it is, it is set as a special relationship, and if it is not, it is set as a general relationship.

The above examples are some cases for checking the correlation between blocks, and are not limited thereto, and various modifications and additions may be possible. It may be used/referenced for encoding of the target block by referring to the correlation between blocks checked through the above process.

In summary, in order to determine the correlation between the target block and the relative block, all or some of processes, such as (Check block division within image), (Check information of block), (Check division status and check common upper block), (Check candidate that can be obtained), (Check correlation), etc. may be used, and a process of determining the correlation may be performed in various orders instead of the order listed above. In addition, it is not limited to the above-mentioned ones, and the correlation may be determined by changing some components or combining additional components. Alternatively, a process of determining correlations of other configurations may be performed, and information of the relative block may be used/referenced for encoding of the target block based on the correlation between blocks determined through the above process.

The correlation determined through the above process may not be an absolute fact about the characteristics between blocks, and may be predictive information that estimates the correlation between blocks in consideration of block division and the like. Therefore, since it may be information that is referenced for the constructing of a candidate group for encoding information of the target block, the relative block having the low correlation may be not included in the candidate group. In consideration of the possibility that the determined correlation is not accurate, it may be to set the priority on the candidate group construction as a lower priority or the candidate group information of the upper block having a vertical relationship may be borrowed. Further, in the above example, although it is assumed that the correlation between blocks is classified into two types, two, three or more classification categories may be supported.

Whether to use/reference the correlation between blocks for encoding (construction of the candidate group, etc.) of the target block may be explicitly determined in units such as sequence, picture, slice, tile group, tile, brick, block, etc., or may be implicitly determined based on the encoding setting. Next, examples of various pieces of information constituting the encoding setting will be described.

Here, whether to refer to a correlation between blocks may be determined according to information to be used/referenced for encoding the target block. For example, the correlation between blocks may be considered for constructing an intra prediction mode candidate group, and the correlation between blocks may not be considered for constructing a candidate group for a motion vector prediction representing a non-translational motion model among inter predictions.

Here, whether to refer to a correlation between blocks may be determined based on state information of the target block and image information to which the target block belongs. Here, the state information of the target block may be defined based on a block size, a block shape, a horizontal/vertical length ratio of a block, a position in a unit such as a picture/division unit (slice, tile, etc.)/a maximum coding block. Here, image information to which the target block belongs may be defined based on an image type (I/P/B), a color component (Y/Cb/Cr), and the like. For example, a correlation between blocks may be referenced only when it has the size of a block belonging to a predetermined range, and a correlation between blocks may not be referenced when the size of a block is out of the predetermined range. In this case, the predetermined range may be defined by the first threshold size (minimum value) and the second threshold size (maximum value), and each threshold size may be expressed as W, H, W×H, W*H, based on width (W) and height (H). W and H may be integers of 1 or more, such as 4, 8, 16.

Here, whether to refer to the correlation between blocks may be determined according to the category of the relative block (which can be derived from a description of the position of the relative block having a horizontal relationship). For example, the relative block may belong to the same space as the target block and may be an adjacent block. Even if it belongs to the same space as the target block, in the case of a non-adjacent relative block, the correlation may not be referred.

The encoding setting may be defined in consideration of all or some of the factors mentioned in the above example, and accordingly, whether to refer to the correlation between blocks may be implicitly determined.

The following shows a candidate group construction based on a block having a horizontal relationship with the target block and the encoding/decoding process.

The correlation between the target block and the block in which the reference possibility exists is checked (1). A block referenced for encoding information of a target block is specified based on the correlation (2). A candidate group is constructed, in a predetermined order, using the specified encoding information (3). One candidate of the candidate group is selected based on the encoding information of the target block (4). An image encoding/decoding process is performed based on the selected candidate (5).

In (1), the correlation between the target block and the block that can be considered as a relative block is checked. In (2), a block to be used for constructing a candidate group for the encoding information of the target block is specified based on the correlation checked through (1). That is, it may mean determining whether to include as a relative block based on the checked correlation result. Of course, the contents describing the specification of the relative block having a horizontal relationship as described above may be considered together in this example.

In (3), a candidate group is constructed, according to a predetermined order, using encoding information of a relative block specified through the above process. In this case, an adaptive order that considers a relative block included or not included through (2) may be supported. In (4), one candidate of the candidate group is selected based on the encoding information of the target block, and in (5), an image encoding/decoding process may be performed based on this.

In the flowchart, a block determined to have low correlation based on a correlation may not be included as a relative block.

The following shows another example of a candidate group construction based on a block having a horizontal relationship with the target block and the encoding/decoding process.

A block to be referred to for encoding information of a target block is specified (1). The correlation between the target block and the specified block is checked (2). A predetermined order is determined based on the encoding information of the target block and the correlation checked through (2), and a candidate group is constructed accordingly (3). One candidate of the candidate group is selected based on the encoding information of the target block (4). An image encoding/decoding process is performed based on the selected candidate (5).

In (1), a relative block to be used for constructing a candidate group for encoding information of the target block is specified. In (2), the correlation between the target block and the relative block is checked. In (3), the order of inclusion of candidates may be determined based on the correlation checked through (2).

For example, if the correlation is high or low, the predefined order may be applied. If the correlation is high, the order in which the relative block has a high priority may be applied, and if the correlation is low, the order in which the relative block has a low priority may be applied.

Subsequently, in (3), after the order of constructing the candidate group is determined through the above process, the candidate group may be constructed according to the order. In (4), one candidate of the candidate group is selected based on the encoding information of the target block, and in (5), an image encoding/decoding process may be performed based on this.

In the flowchart, the order of including candidates may be adaptively set based on the correlation.

The following shows an example of a candidate group construction based on a block having a horizontal or vertical relationship with the target block and the encoding/decoding process. Here, it is assumed that the base block for specifying the referenced block is set as the target block.

The correlation between the target block and the block in which the reference possibility exists is checked (1).

(The number of blocks judged to have the low correlation with the target block is less than/the predetermined number or less)

A block referenced for encoding information of a target block is specified based on the correlation (2A). A candidate group is constructed, in a predetermined order, using the specified encoding information (3A).

(The number of blocks judged to have the low correlation with the target block exceeds/the predetermined number or greater)

The base block for specifying the referenced block is changed to a predetermined upper block (2B). A block referenced for encoding information of the target block is specified based on the changed base block (3B). A candidate group is constructed, in a predetermined order, using the encoding information of the specified block (4B).

One of the candidate groups is selected based on the encoding information of the target block (5). An image encoding/decoding process is performed based on the selected candidate group (6).

In the flowchart, one of the order (P) of 1-2A-3A-5-6 or the order (Q) of 1-2B-3B-4-5-6 may be determined according to the correlation determination result. Specifically, when there are few blocks determined to have the low correlation with the target block, the remaining block except for the corresponding block are specified as the relative block, and when there are many blocks determined to have the low correlation with the target block, a block having a horizontal relationship of the upper block is specified as a relative block by changing the base block of the candidate group construction to an upper block than the target block.

In the case of the P-order, a detailed description is omitted since some of the above-described flowchart in which the block determined to have the low correlation is not included in the relative block is the same. The Q-order may be a configuration combined with a candidate group construction based on a block having a vertical relationship. It may be an example of constructing the candidate group by changing a block unit that is the basis for the candidate group construction when the block adjacent to the target block is composed of a block with the low correlation. In the following description, redundant descriptions from the previous ones are omitted and it is focused on the differences.

In (2B), the block serving as the candidate group criterion is changed to the first relative block. Here, the first relative block may be a block (here, an upper block) having a vertical relationship with the target block.

In (3B), a second relative block used for constructing a candidate group for encoding information of the target block is specified. Here, the second relative block may be a block having a horizontal relationship with the base block, and the base block is an upper block. In (4B), the candidate group is constructed, in a predetermined order, using the encoding information of the second relative block specified through the above process Here, the criterion for determining that the correlation with the target block is low is a case of dividing by the number of blocks in the flowchart, but various criteria to be determined may be set.

Various relationships between blocks were described through the above various examples, and a case in which encoding/decoding is performed using this was described. When describing the algorithm based on the relationship between the above-described blocks in various encoding/decoding processes to be described later, it should be understood that even if a detailed description is not added, the settings suggested through the various embodiments described above may be applied in the same or similar manner.

(Intra Prediction)

In an image encoding method according to an embodiment of the present invention, intra prediction may be configured as follows. Intra prediction of the prediction unit may include a reference pixel construction step, a prediction block generation step, a prediction mode determination step, and a prediction mode encoding step. In addition, the image encoding apparatus may be configured to include a reference pixel construction unit, a prediction block generation unit, and a prediction mode encoding unit implementing a reference pixel construction step, a prediction block generation step, a prediction mode determination step, and the prediction mode encoding step. Some of the above-described processes may be omitted or other processes may be added, and may be changed in an order other than the order described above.

In the video decoding method according to an embodiment of the present invention, intra prediction may be configured as follows. Intra prediction of the prediction unit may include a prediction mode decoding step, a reference pixel construction step, and a prediction block generation step. In addition, the image decoding apparatus may be configured to include a prediction mode decoding unit, a reference pixel construction unit, and a prediction block generation unit implementing the prediction mode decoding step, the reference pixel construction step, and the prediction block generation step. Some of the above-described processes may be omitted or other processes may be added, and may be changed in an order other than the order described above.

Since the reference pixel construction unit and the prediction block generation unit of the image decoding apparatus perform the same role as the corresponding configuration of the image encoding apparatus, detailed descriptions are omitted, and the prediction mode decoding unit is performed by inversely using the method used by the prediction mode encoding unit.

(Subblock-Based Intra Prediction)

Intra prediction may be performed by setting a coding block as a prediction block, or may be performed by dividing a coding block into one or more prediction blocks. Here, the coding block refers to a unit obtained through an individual division process based on a tree or an index, and refers to a process separate from the division into a prediction block. Here, performing intra prediction by dividing into one or more prediction blocks is referred to as intra prediction in units of sub-blocks. Here, it is assumed that one prediction mode occurring in the coding block is shared with all prediction blocks in the coding block, but is not limited thereto.

In the intra prediction of a sub-block unit, information indicating whether to divide may be generated. For example, if the information is 1, it means that division is performed, and if the information is 0, it means that division is not performed. When the division is performed, information indicating the direction of division, such as horizontal or vertical, may be generated. For example, if the information is 0, it means horizontal division, if it is 1, it means vertical division, and the opposite configuration may be possible. Alternatively, it may be determined according to state information such as the size, shape, and position of the target block.

For example, when the width of the target block is greater than a predetermined threshold size, it may be divided horizontally, and when the height of the target block is greater than a predetermined threshold size, it may be divided vertically. Here, the threshold size may be an integer of 2 or more, such as 2, 4, 8, 16, 32.

Information on the number of divided blocks may be additionally generated, and may be an integer of 2, 4, 8 or more. Alternatively, it may be implicitly determined according to the encoding setting. Here, the encoding setting may be defined according to one or more factors such as state information of the target block, such as size, shape, position, intra prediction mode, etc., an image type (I/P/B), a color component (Y/Cb/Cr).

For example, when the size of the target block is greater than a predetermined threshold size, the division number may be 4, otherwise, it may be 2. Here, the predetermined threshold size may be expressed as W, H, W×H, W*H by width (W) and height (H), and W and H may be an integer of 4, 8, 16 or more.

With an example to be described later, a case of performing intra prediction in units of coding blocks will be described.

(Construction of Intra Prediction Mode Candidate Group)

Figure 12:
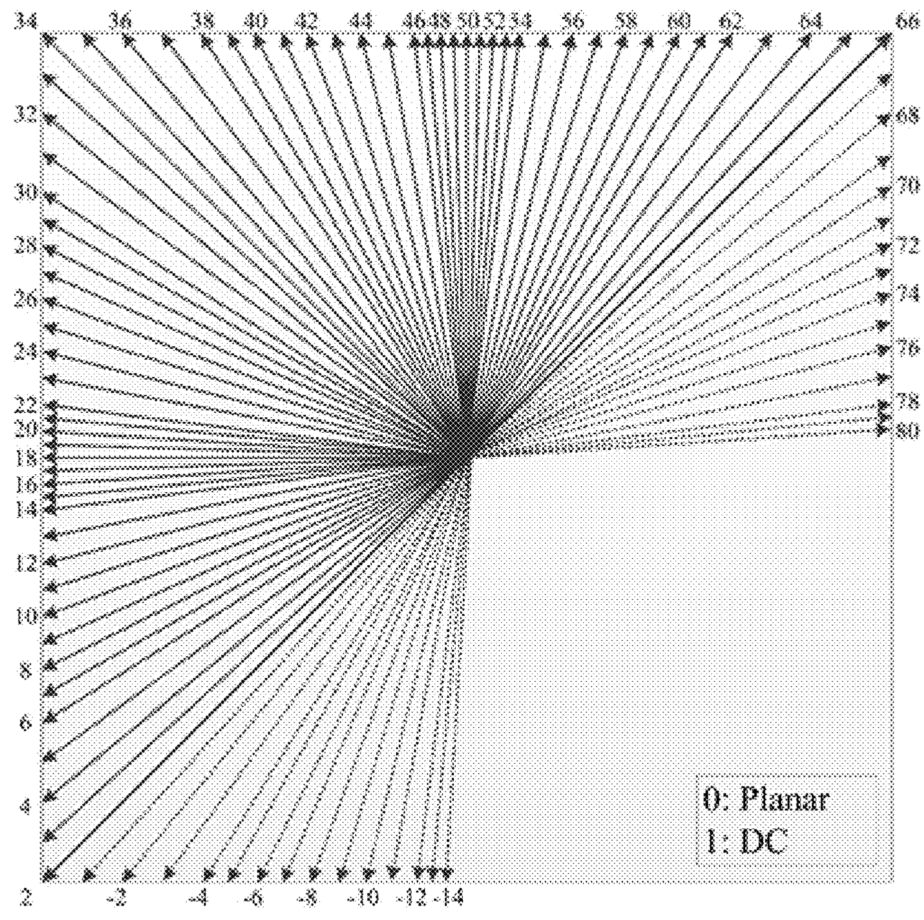
FIG. 12 is an exemplary diagram showing an intra prediction mode supported by an image encoding/decoding apparatus.

FIG. 12 is an exemplary diagram showing an intra prediction mode supported by an image encoding/decoding apparatus.

Referring to FIG. 12, a prediction mode candidate group for intra prediction is composed of 67 prediction modes including 65 directional modes (2 to 66) and 2 non-directional modes (DC, Planar). In this case, the directional mode may be identified based on a slope (e.g., dy/dx) or angle information (Degree). All or some of the prediction modes described in the above example may be included in the prediction mode candidate group of the luminance component or the chrominance component, and other additional modes may be included in the prediction mode candidate group.

In addition, a reconstructed block of another color space that has been encoded/decoded may be used for prediction of a target block using the correlation between color spaces, and prediction modes supporting this may be included. For example, in the case of a chrominance component, a prediction block of the target block may be generated by using a reconstructed block of a luminance component corresponding to the target block. That is, a prediction block may be generated based on a reconstructed block in consideration of the correlation between color spaces, and it may be included as an intra prediction mode for a chrominance component.

The chrominance component may have the same prediction mode candidate group as the prediction mode candidate group of the luminance component, or some modes of the prediction mode candidate group of the luminance component and additional prediction modes (color copy mode, color mode) related to the chrominance component may be included in the prediction mode candidate group. Here, the color copy mode may be a prediction mode related to a method of obtaining data for generating a prediction block from an area located in another color space, and a color mode may be a prediction mode related to a method of obtaining a prediction mode from an area located in another color space.

The prediction mode candidate group may be adaptively determined according to the encoding/decoding setting. The number of candidate groups may be increased for the purpose of improving the accuracy of prediction, and the number of candidate groups may be decreased for the purpose of reducing the amount of bits according to the prediction mode.

For example, one of candidate A (67, 65 directional modes and 2 non-directional modes), candidate B (35, 33 directional modes and 2 non-directional modes) or candidate C (18, 17 directional modes and one non-directional mode) may be selected, and the candidate group may be adaptively selected or determined according to the size and shape of the block.

In addition, it is possible to have various configurations of the prediction mode candidate group according to the encoding/decoding setting. For example, as shown in FIG. 12, a prediction mode candidate group may be configured evenly between modes, or in FIG. 12, the number of modes between modes 18 and 34 may be greater than the number of modes between modes 2 and 18. Alternatively, the opposite case may be possible, and a candidate group may be adaptively configured according to the shape of the block (i.e., a square, a non-square with a width greater than a height, a non-square with a height greater than a width, etc.). For example, when the width of the target block is greater than the height, the intra prediction modes belonging to 2 to 15 are not used, and may be replaced with the intra prediction modes belonging to 67 to 80. On the other hand, when the width of the target block is less than the height, the intra prediction modes belonging to 53 to 66 are not used, and may be replaced with the intra prediction modes belonging to −14 to −1.

In the present invention, unless otherwise specified, it is assumed that intra prediction is performed with one preset prediction mode candidate group (candidate A) having an equal mode interval, but the main elements of the present invention may be changed and applied to the adaptive intra prediction setting as described above.

FIG. 12 may be a prediction mode supported when the shape of a block is square or non-square. In addition, when the block shape is non-square, the supported prediction mode may be a different prediction mode from the above example. For example, the number of prediction mode candidates may be different, or the number of prediction mode candidates is the same, but the prediction modes on the longer side of the block may be dense, and the prediction modes on the opposite side may be distributed, or vice versa. In the present invention, as shown in FIG. 12, it is described under the setting that a prediction mode is supported regardless of the block shape (equal interval between directional modes), but other cases may also be applied.

The index assigned to the prediction mode may be assigned in a specific direction order based on a preset prediction mode. For example, as shown in FIG. 12, an index may be assigned in a clockwise direction from some diagonal mode (mode 2). In addition, in the non-directional prediction mode, index information may be assigned in preference to the directional mode, may be assigned between directional modes, or may be assigned at the end, which may be determined according to an encoding/decoding setting. It is not limited to the above example, and an index may be assigned under different settings, or various examples of modifications may be possible.

In the above description, it has been mentioned that the prediction mode candidate group may be adaptively set, but a block (base block) that is a criterion for constructing the prediction mode candidate group may be a coding block or a prediction block (or a transform block). It has been described that when a coding block is determined through the block division unit, it may be set as a prediction block as it is, and when a coding block is determined, it may be divided into two or more prediction blocks.

That is, it may be possible to construct a prediction mode candidate group by setting a coding block or a prediction block as a base block. In addition, a base block for setting a prediction mode candidate group may be supported in addition to the units mentioned above. For example, it may be a block (upper block) placed in a vertical relationship with the base block.

For the following description, it may be assumed that a coding block is a target block and an upper block having a vertical relationship with the coding block is a relative block. Alternatively, it may be assumed that a prediction block is a target block and a coding block is a relative block.

A base block may be determined, and a prediction mode candidate group may be constructed based on state information of the determined base block such as size, shape, and position.

In a method of constructing a prediction mode candidate group based on one of a plurality of base block candidates, whether or not to be explicitly supported may be determined in units such as a sequence, a picture, a slice, a tile group, a tile, a brick, and a block. Alternatively, whether or not to be supported may be implicitly determined according to the encoding setting. In this case, the encoding setting may be defined based on one or more factors among state information of the block (target block), such as size, shape, and position, an image type (I/P/B), a color component, whether to apply intra prediction in units of sub-blocks.

For example, when the size of the target block is greater than or equal to a predetermined first threshold size, the above method (setting the upper block as a base block) may be supported. Alternatively, the method may be supported when the size of the target block is less than or equal to the predetermined second threshold size. Here, the threshold size may be expressed as W, H, W×H, W*H through the width (W) and the height (H), and is a pre-promised value in the encoding/decoding device, where W and H may be an integer of 1 or more, such as 4, 8 and 16. When expressed as the sum of the width and the height, W*H may be an integer of 16, 32, 64 or more. The first threshold size is less than or equal to the second threshold size.

If a plurality of base blocks are supported, various definitions of the relative blocks may be possible. (When the coding block is the target block) The relative block (upper block) may be a block having a division depth difference of 1 or more from the division depth of the coding block. Alternatively, it may be a block having a predetermined width (C) and height (D) at a predetermined top-left coordinate. Here, C and D may be an integer of 8, 16, 32 or more, and may be greater than or equal to the width and height of the target block. Also, C and D may be determined based on information on the block size (e.g., the size of the maximum transform block, the size of the maximum coding block, etc.).

If a method of constructing a prediction mode candidate group by supporting a plurality of base blocks is not supported, a prediction mode candidate group may be constructed based on a predefined base block (one of a coding block or a prediction block).

(Reference Pixel Construction 1)

Figure 13:
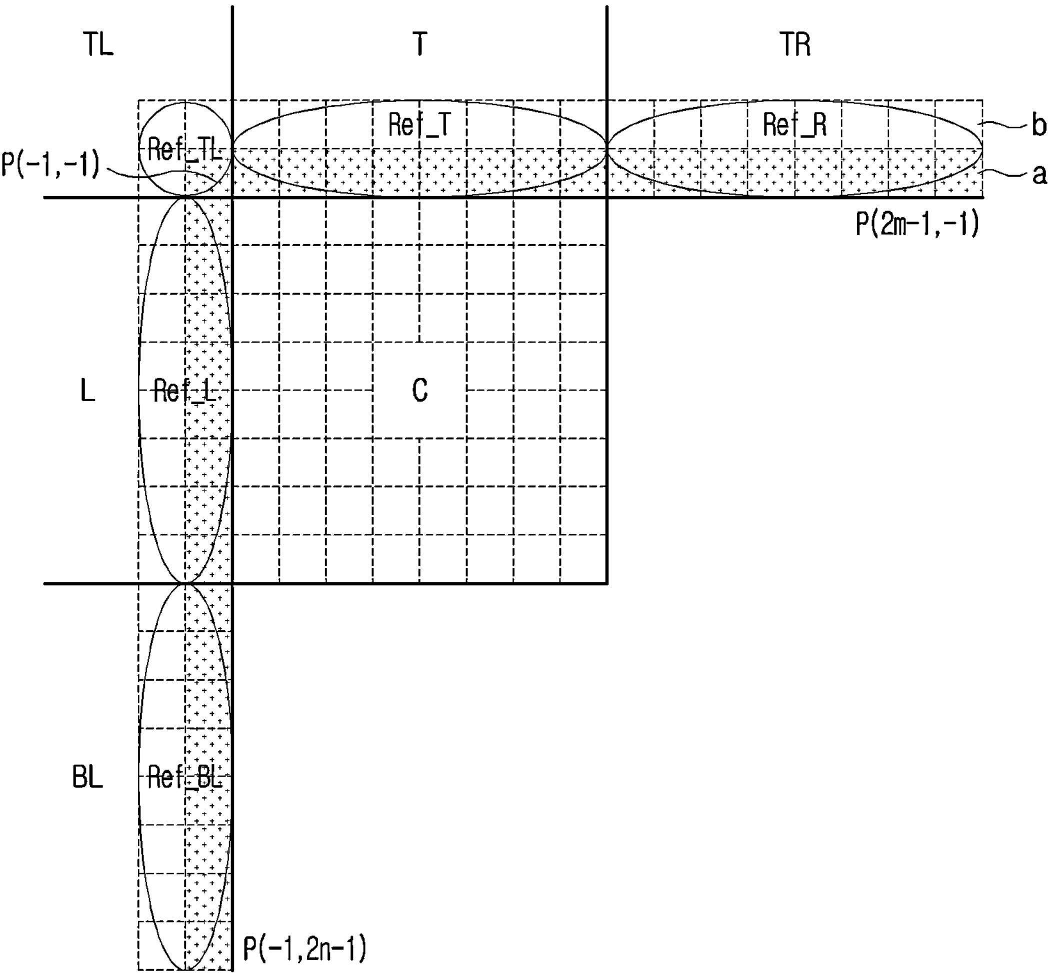
FIG. 13 is an exemplary diagram illustrating a configuration of reference pixels used for intra-prediction according to an embodiment of the present disclosure.

FIG. 13 is an exemplary diagram illustrating a construction of a reference pixel used for intra prediction according to an embodiment of the present invention. In detail, it is assumed that the base block for the reference pixel construction is M×N.

The reference pixel construction unit may construct a reference pixel used for intra prediction. In this case, the reference pixel may be managed through temporary memory (e.g., array <Array>, primary, secondary array, etc.), may be generated and removed for each intra prediction process, and the size of the temporary memory may be determined according to the construction of a reference pixel.

In this example, it is assumed that left, top, top-left, top-right, and bottom-left blocks adjacent to a base block are used for intra prediction, but the present invention is not limited thereto, and a block candidate group having other configurations may be used for intra prediction.

For example, the candidate group of the neighboring blocks for the reference pixel may be an example of following a raster or Z scan, and some of the candidates may be removed according to the scan order, or another block candidate (e.g., right, bottom, bottom-right blocks, etc. is additionally configured) may be included.

As illustrated in FIG. 13, neighboring pixels in the left, top, top-left, top-right, bottom-left blocks (Ref_L, Ref_T, Ref_TL, Ref_TR, and Ref_BL in FIG. 13) may be configured as reference pixels used for intra prediction. The reference pixels are generally configured as pixels in the neighboring blocks closest to the base block (a of FIG. 13. This is referred to as a reference pixel line), other pixels (b of FIG. 13 and pixels in other outer lines) may also be configured as reference pixels.

Pixels neighboring to the base block may be classified into at least one reference pixel line. The pixels closest to the base block may be denoted by ref_0 (e.g., pixels spaced from the boundary pixels of the base block by a distance of 1, p(−1,−1) to p(2m−1,−1) and p(−1,0) to p(−1,2n−1)), the second closest pixels may be denoted by ref_1 (e.g., pixels spaced from the boundary pixels of the base block by a distance of 2, p(−2,−2) to p(2m,−2) and p(−2,−1) to p(−2, 2n)), and the third closest pixels are denoted by ref_2 (e.g., pixels spaced from the boundary pixels of the base block by a distance of 3, p(−3,−3) to p(2m+1,−3) and p(−3,−2) to p(−3, 2n+1)). That is, reference pixel lines may be defined according to distances between the boundary pixels of the base block and neighbor pixels.

N or more reference pixel lines may be supported, and N may be an integer of 1, 2, 3, 4, or more. Generally, the reference pixel lines are sequentially included in a reference pixel line candidate group in an ascending order of distances from the base block. However, the present disclosure is not limited thereto. For example, when N is 3, the candidate group may include reference pixel lines sequentially, such as <ref_0, ref_1, ref_2>. It is also possible to configure the candidate group non-sequentially such as <ref_0, ref_1, ref_3> or <ref_0, ref_2, ref_3>, or to configure the candidate group without the closest reference pixel line.

Prediction may be performed using all or some (one or more) of the reference pixel lines in the candidate group.

For example, one of a plurality of reference pixel lines may be selected according to an encoding/decoding configuration, and intra-prediction may be performed using the reference pixel line. Alternatively, two or more of the plurality of reference pixel lines may be selected and intra-prediction may be performed using the selected reference pixel lines (e.g., by weighted-averaging data of the reference pixel lines).

A reference pixel line may be selected implicitly or explicitly. For example, the implicit selection implies that that a reference pixel line is selected according to an encoding/decoding configuration defined by one or more factors in combination, such as an image type, a color component, and a block size/shape/position. The explicit selection implies that that reference pixel line selection information may be generated at the block level.

While the present disclosure is described in the context of performing intra-prediction using the closest reference pixel line, it is to be understood that the later-described various embodiments may be implemented in the same manner or in a similar manner, when a plurality of reference pixel lines are used.

Assuming that the width and the height of the base block are W and H, respectively, and the selected reference pixel line is refidx (if 0, the closest pixel line), the following reference pixels (reference pixel range) may be obtained.

<Left of base block> p(−1−refidx,−1−refidx)~p(−1−refidx, 2H−1)

<Top of base block> p(−refidx,−1−refidx)~p(2W−1,−1−refidx)

The reference pixel may have a position whose a relative coordinate is calculated based on a predetermined coordinate of the base block (the top-left is set to <0, 0>), and the position of the reference pixel in the image may be checked by adding the top-left coordinate (a, b) of the base block to x and y components, respectively.

In the above description, a block (base block) used as a criterion for constructing a reference pixel may be a coding block or a prediction block (or transform block). Further, a block (upper block) having a vertical relationship with the block may be used as a base block to construct reference pixels.

For the following description, it may be assumed that a coding is a target block and an upper block having a vertical relationship of the coding block is a relative block. Alternatively, it may be assumed that a prediction block is a target block and a coding block is a relative block.

A base block may be determined, and a reference pixel (reference pixel candidate group) may be constructed based on state information of the determined base block, such as size, shape, and position.

Whether to support a method of constructing a reference pixel based on one of a plurality of base block candidates may be explicitly determined in units such as sequence, picture, slice, tile group, tile, brick, block, and the like. Alternatively, whether to support may be implicitly determined according to the encoding setting. In this case, the encoding setting may be defined based on one or more factors among state information of the block (target block), such as size, shape, and position, an image type (I/P/B), a color component, whether to apply intra prediction in units of sub-blocks.

For example, when the size of the target block is greater than or equal to a predetermined first threshold size, the method may be supported. Alternatively, the method may be supported when the size of the target block is less than or equal to the predetermined second threshold size. Here, the threshold size may be expressed as W, H, W×H, W*H through the width (W) and the height (H), and is a pre-promised value in the encoding/decoding apparatus, where W and H are 4 may be an integer of 1 or more, such as 4, 8 and 16. When expressed as the sum of the width and the height, W*H may be an integer of 16, 32, 64 or more. The first threshold size is less than or equal to the second threshold size.

In addition, the above method may be supported when it is divided into two or more blocks as the subblock-based intra prediction is applied. In this case, when the prediction block (subblock) is a target block and the coding block is a relative block, the base block may be determined as the target block or may be determined as the relative block. Here, when a method of constructing a reference pixel based on one of a plurality of base candidate blocks is not used, the base block may be set as a prediction block, or may be set to the opposite case.

If a plurality of base blocks are supported, various definitions of the relative block may be possible. (When the coding block is the target block) The relative block (upper block) may be a block having a division depth less than the division depth of the coding block. The division depth difference between the relative block and the coding block is 1 or more. Alternatively, it may be a block having a predetermined width (C) and height (D) at a predetermined top-left coordinate. Here, C and D may be an integer of 4, 8, 16 or more, and may be greater than or equal to the width and height of the target block. Also, C and D may be determined based on information on the block size (e.g., the size of the maximum transform block, the size of the maximum coding block, etc.).

If a method of constructing a reference pixel by supporting a plurality of base blocks is not supported, a reference pixel may be constructed based on a predefined base block (one of a coding block or a prediction block).

FIGS. 14A to 14D are exemplary diagrams of a construction of a reference pixel obtainable according to a base block.

Figures 14A, 14B, 14C, 14D:
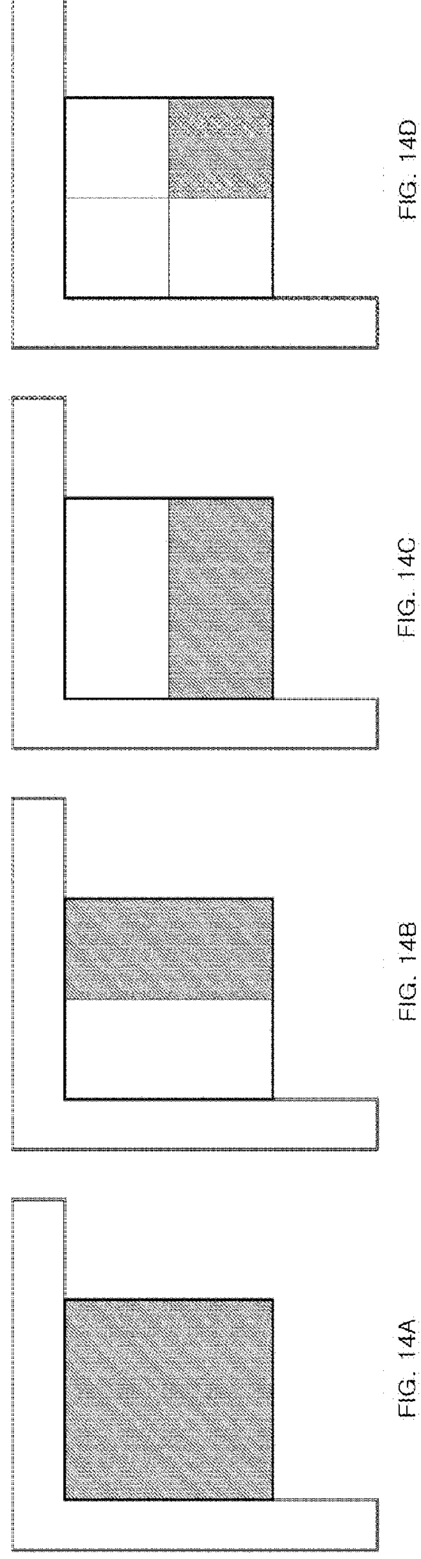
FIGS. 14A to 14D are exemplary diagrams of a configuration of a reference pixel obtainable according to a base block.

FIG. 14A represents a case where a reference pixel is configured adjacent to a block where intra prediction is performed (a shaded area), FIGS. 14B and 14C represent a case where a reference pixel is adjacent to some boundaries among blocks on which intra prediction is performed, but is not adjacent to some boundaries, and FIG. 14D represents a case where a reference pixel is configured not adjacent to a block on which intra prediction is performed. This may be various cases that can occur according to the setting of the base block.

FIG. 15 is a conceptual diagram illustrating a block adjacent to a target block for intra prediction. In detail, the left side of FIG. 15 shows a block adjacent to the target block in the current color space, and the right side shows a corresponding block in another color space.

In particular, if some prediction modes (color copy mode) are supported, since some areas of different color spaces can be used for intra prediction, these may also be considered as reference pixels.

Although the above drawing shows blocks adjacent to the target block, the target block may be set as a base block in some examples to be described later.

(Intra Prediction Preprocessing/Reference Pixel Configuration 2)

According to the present disclosure, the reference pixel construction unit for intra-prediction may include a reference pixel generator, a reference pixel interpolator, and a reference pixel filter unit. The reference pixel construction unit may include all or a part of the above components.

The reference pixel construction unit may distinguish available pixels from unavailable pixels by checking their reference pixel availability. When a reference pixel satisfies at least one of the following conditions, the reference pixel is determined to be unavailable.

For example, if at least one of the following conditions is satisfied: the reference pixel is located outside a picture boundary; the reference pixel does not belong to the same partition unit as the current block (e.g., a unit that does not allow mutual referencing, such as a slice or tile. However, a unit allowing mutual referencing is an exception, despite a slice or tile); and the reference pixel has not been completely encoded/decoded, the reference pixel may be determined to be unavailable. That is, if none of the above conditions are satisfied, the reference pixel may be determined to be available.

The use of a reference pixel may be restricted by an encoding/decoding configuration. For example, even though a reference pixel is determined as available according to the above conditions, the use of the reference pixel may be restricted depending on whether constrained intra-prediction is performed (e.g., indicated by constrained_intra_pred_flag). Constrained intra-prediction may be performed when the use of a block reconstructed by referencing another image is banned for the purpose of robust encoding/decoding against errors due to an external factor such as a communication environment.

When constrained intra-prediction is deactivated (e.g., constrained_intra_pred_flag=0 for the I picture type or the P or B picture type), all reference pixel candidate blocks may be available.

On the contrary, when constrained intra-prediction is activated (for example, constrained_intra_pred_flag=1 for the P or B picture type), it may be determined whether to use a reference pixel candidate block according to an encoding mode (Mode_Intra, Mode_InterD, Mode_InterC). However, the condition may be determined according to various other encoding/decoding factors.

Since reference pixels are in one or more blocks, the reference pixels may be classified into three types according to their reference pixel availability: fully available, partially available, and all unavailable. In the other cases except for fully available, reference pixels may be filled or generated at the position of an unavailable candidate block.

When a reference pixel candidate block is available, pixels at corresponding positions may be included in a reference pixel memory for the target block. The pixel data of the pixels may be copied as they are or may be included in the reference pixel memory after processes such as reference pixel filtering and reference pixel interpolation. On the contrary, when the reference pixel candidate block is unavailable, pixels obtained by the reference pixel generation process may be included in the reference pixel memory of the target block.

Examples of generating reference pixels at the position of an unavailable block in various methods will be described below.

For example, a reference pixel may be generated using an arbitrary pixel value. The arbitrary pixel value may be one of pixel values within a pixel value range (e.g., a pixel value range based on a bit depth or a pixel value range based on the pixel distribution of the corresponding image) (e.g., the minimum, maximum, or median value of the pixel value range). Specifically, this example may be applicable when a whole reference pixel candidate block is not available.

Alternatively, a reference pixel may be generated from a region in which image encoding/decoding has been completed. Specifically, the reference pixel may be generated from at least one available block neighboring to the unavailable block. At least one of extrapolation, interpolation, or copy may be used in generating the reference pixel.

After completing the reference pixel construction, reference pixel filtering or reference pixel interpolation may be performed. For example, only reference pixel filtering may be performed, only reference pixel interpolation may be performed, or both reference pixel filtering and reference pixel interpolation may be performed. Reference pixel filtering may precede or follow reference pixel interpolation, or both of them may be combined and performed at the same time.

Reference pixel interpolation and reference pixel filtering will be described below.

Reference pixel filtering may be performed for the purpose of reducing deterioration remaining in the reference pixel. In the reference pixel filtering, one of a plurality of filters that can be distinguished by setting lengths and coefficients of various filter taps, such as [1,2,1]/4, [2, 3, 6, 3, 2]/16, may be used. Also, a plurality of filtering may be performed by different types of filters.

Whether to perform reference pixel filtering may be explicitly determined or may be implicitly determined according to an encoding setting. Here, the encoding setting may be defined based on the state information (size, shape, position, etc.) of the base block (target block or relative block <upper block>), an image type (I/P/B), a color component (Y/Cb/Cr), reference pixel line selection information, whether to apply intra prediction in sub-block units, and an intra prediction mode.

As an example, when the size of the base block is greater than or equal to a predetermined first threshold size, filtering may be performed, otherwise, filtering may not be performed. Alternatively, when the size of the base block is less than or equal to the predetermined second threshold size, filtering may be performed, otherwise, filtering may not be performed. Here, the threshold size may be expressed as W, H, W×H, W*H, etc. based on a width (W) and a height (H), and W and H may be an integer of 4, 8, 16, 32 or more. In particular, when expressed as the product of width and height, such as W*H, it may be an integer of 16, 32, 64 or more. The first threshold size is less than or equal to the second threshold size.

For example, if the shape of the base block is a square shape, filtering may be performed, otherwise, filtering may not be performed. Alternatively, if the base block has a non-square shape and has a width longer than a height (or a width shorter than a height), filtering may be performed, otherwise, filtering may not be performed. When the ratio of the width and the height of the base block is greater than or equal to the predetermined threshold value, filtering may be performed, otherwise, filtering may not be performed. Here, the threshold ratio may be set to 1:2, 1:3, 1:4, 2:3, or the like. Here, it may be desirable that the block shape is combined with the prediction mode to determine the setting.

For example, filtering may be performed regardless of a color component of the base block, or filtering may be performed only when it belongs to a predetermined color component (luminance or chrominance).

For example, when the prediction mode of the base block is a non-directional mode, filtering may be performed, otherwise, filtering may not be performed. Here, the non-directional mode may include both DC and Planar modes, or may include only one of them. That is, filtering may be performed in the planar mode and filtering may not be performed in the DC mode, or vice versa. Alternatively, filtering may be performed in predetermined modes among the directional modes, and filtering may not be performed in modes other than the predetermined modes. Here, when the predetermined mode is a diagonal mode (a directional mode other than horizontal and vertical) among the directional modes, filtering may be performed, and otherwise, filtering may not be performed. Here, among the diagonal modes, a mode referring only to a pixel of an integer unit and a mode referring to pixels of an integer unit and a fractional unit may be included, or only one of them may be included. That is, filtering may be performed in a mode referring only pixels of an integer unit, and filtering may not be performed in a mode referring pixels of an integer unit and a fractional unit, or vice versa. Here, the mode of referring only pixels in integer units may include at least one of modes corresponding to −14, −12, −10, −6, 2, 34, 66, 72, 78, and 80 in FIG. 12. That is, it may be a mode in which reference pixel interpolation is not performed, and the prediction mode number may also be changed according to a construction change of a prediction mode candidate group. Here, an exceptional situation in which filtering is performed for the horizontal mode or the vertical mode may be applied.

Whether to perform filtering may be determined by considering (combining) all or some of the factors mentioned in the above example. The above example is only some of examples, and various examples of modifications may be possible.

When filtering is performed, filter selection information may be explicitly or implicitly determined, and this may be based on the encoding setting. In this case, the encoding setting may be defined by the above-described various elements, and a detailed description thereof will be omitted since it is possible to derive a description thereof through the above example.

In the reference pixel interpolation, as described above, reference pixel interpolation may not be performed in a prediction mode that refers only to pixels of an integer unit, and reference pixel interpolation may be performed in a prediction mode that refers to pixels of a fractional unit.

Depending on a prediction mode (e.g., the directionality of the prediction mode, dy/dx, and so on) and the positions of a reference pixel and a prediction pixel, the position of a pixel to be interpolated (i.e., a factional unit to be interpolated, ranging from $\frac{1}{2}$ to $\frac{1}{64}$) may be determined. In this case, one filter (e.g., the same filter is assumed in an equation used to determine a filter coefficient or the length of a filter tap, but a filter for which only a coefficient is adjusted according to a fractional precision such as $\frac{1}{32}$, $\frac{7}{32}$, or $\frac{19}{32}$ is assumed) may be applied, or one of a plurality of filters (e.g., filters for which different equations are used to determine a filter coefficient or the length of a filter tap is assumed) may be selected and applied according to the fractional unit.

In the former case, integer pixels may be used as inputs for interpolation of fractional pixels, while in the latter case, an input pixel is different in each step (e.g., an integer pixel is used for a $\frac{1}{2}$ unit, and an integer pixel and a $\frac{1}{2}$-unit pixel are used for a $\frac{1}{4}$ unit). However, the present disclosure is not limited thereto and will be described in the context of the former case.

Fixed filtering or adaptive filtering may be performed for reference pixel interpolation, which may be determined according to the encoding setting. Here, the encoding setting may be defined based on state information of the base block, an image type, a color component, reference pixel line selection information, whether to apply intra prediction in sub-block units, an intra prediction mode, and the like.

In fixed filtering, reference pixel interpolation may be performed using one filter, whereas in adaptive filtering, reference pixel interpolation may be used using one of a plurality of filters.

In adaptive filtering, one of the plurality of filters may be implicitly or explicitly determined according to an encoding/decoding configuration. The filters may be configured by selecting one or more from a 4-tap DCT-IF filter, a 4-tap cubic filter, a 4-tap Gaussian filter, a 6-tap Wiener filter, and an 8-tap Kalman filter. A supported filter candidate group may be defined differently (e.g., the types of filters are partially the same or different, and the lengths of filter taps are short or long) according to a color component.

Distortion of some pixels may occur due to overlapping of filtering performed in the reference pixel interpolation process and filtering performed in the reference pixel filtering process. To this end, the reference pixel interpolation filter setting may be determined in consideration with the reference pixel filtering setting. For reference, in case of a prediction mode in which reference pixel interpolation is performed, it may be an example that reference pixel filtering is not performed.

In the above description, the base block may be determined as one of a coding block, a prediction block, or an upper block, and a description thereof can be derived through the above-described example.

(Reference Pixel Construction 3)

A reference pixel construction when intra-prediction is performed in units of sub-blocks will be described. Some settings, such as the above-described plurality of reference pixel lines and reference pixel filtering, may be configured or set in units of coding blocks. Intra prediction may be performed by selecting one of a plurality of reference pixel lines, and reference pixel filtering may be performed to reduce deterioration of the reference pixel.

However, since it is not possible to know exactly what correlations the characteristics of the target block and the adjacent block have, some explicit settings (reference pixel line selection information) may be required for the reference pixel construction, and some limited settings (reference pixel filtering is prohibited for some prediction modes) may be required.

For example, if a block adjacent to a target block has a high correlation with the target block, performing prediction using two or more reference pixel lines than a method of selecting one of a plurality of reference pixel lines may reduce quantization errors and further improve prediction accuracy.

Alternatively, reference pixel filtering may be performed even in a predetermined prediction mode, and thus it may be effective to reduce deterioration of the reference pixel.

Intra prediction in units of sub-blocks may be a case in which it is known that a correlation between a target block (prediction block) and an adjacent block is high. In particular, since there is a characteristic in which an edge of an upper block (coding block) is shared as one information (prediction mode), it can be known in advance that all adjacent prediction blocks have the same prediction direction.

When intra prediction in units of sub-blocks is performed, the following reference pixel construction and setting may be possible. First, it is assumed that one of a plurality of reference pixel lines around a target block (coding block) may be selected, and reference pixel filtering and reference pixel interpolation may be performed according to encoding settings defined by various coding elements.

For example, one reference pixel line (nearest line) defined for the target block (prediction block) is supported, and reference pixel filtering and reference pixel interpolation may be performed by the fixed setting (e.g., no filtering or only one interpolation filter is used, etc.).

Alternatively, a plurality of reference pixel lines predefined for the target block are supported (implicitly). In detail, the first prediction block (adjacent to the top or left boundary of the coding block) in the coding block performs intra prediction using one reference pixel line. The second prediction block may perform intra prediction by setting a plurality reference pixel lines based on the reference pixel line adjacent to the coding block and the coded first prediction block. The third block and others may perform intra prediction by setting a plurality reference pixel lines based on the previous prediction blocks (the first and second target blocks in this example) for which encoding has been completed.

Further, reference pixel filtering may be performed by considering not only reference pixels placed on one reference pixel line of the prediction block, but also reference pixels placed on another reference pixel line. In detail, when the division direction for a subblock is a horizontal direction and a prediction mode is a vertical mode, reference pixel filtering may be applied to reference pixels placed in a vertical direction on a plurality of reference pixel lines. Reference pixel interpolation may also be performed by applying the adaptive setting.

The above example is some of cases of setting for intra prediction in units of sub-blocks, and are not limited thereto and various modifications may be made. That is, a reference pixel construction setting may be supported in consideration of a case in which the setting for intra prediction in a sub-block unit has a characteristic different from the general intra prediction (the prediction direction within the block is shared).

(Perform Prediction and Determine Mode)

The prediction block generator may generate a prediction block in at least one prediction mode, and reference pixels may be used based on the prediction mode. The reference pixels may be used in a method (directional modes) such as extrapolation or a method (non-directional modes) such as interpolation, averaging (DC), or copy.

The prediction mode decision unit performs a process of selecting a best mode from a group of a plurality of prediction mode candidates. In general, the best mode may be determined in terms of coding cost, using a rate-distortion scheme in which block distortion (e.g., the distortion, sum of absolute difference (SAD), and sum of square difference (SSD) of the target block and a reconstructed block) and the number of generated bits according to the mode are considered. A prediction block generated based on the prediction mode determined in the above process may be transmitted to the subtraction unit and the add unit.

All prediction modes of the prediction mode candidate group may be searched in order to determine the best prediction mode, or the best prediction mode may be selected in a different decision process to reduce a computation volume/complexity. For example, some modes having good performance in terms of image quality deterioration are selected from among all intra-prediction mode candidates in a first step, and the best prediction mode may be selected, taking into account the numbers of generated bits as well as image quality deterioration of the modes selected in the first step, in a second step. Aside from this method, various other methods of determining a best prediction mode with a reduced computation volume/complexity may be applied.

Further, although the prediction mode decision unit may generally be included only in the encoder, it may also be included in the decoder according to an encoding/decoding configuration, for example, when template matching is included as a prediction method or an intra-prediction mode is derived from a region neighboring to the target block. In the latter case, it may be understood that a method of implicitly obtaining a prediction mode in the decoder is used.

It is assumed that the above process is performed in units of target blocks rather than base blocks. That is, the prediction mode candidate group construction and the reference pixel construction may not be set based on the target block, but the process of obtaining and determining the prediction block may be based on the target block.

(Prediction Mode Candidate Group Configuration and Encoding)

The prediction mode encoder may encode the prediction mode selected by the prediction mode decision unit. Information about the index of the prediction mode in the prediction mode candidate group may be encoded, or the prediction mode may be predicted and information about the prediction mode may be encoded. The former method may be applied to, but not limited to, a luminance component, and the latter method may be applied to, but not limited to, a chrominance component.

As an example, priority may be assigned to a predetermined prediction mode of the prediction mode candidate group to set as a prediction value of the prediction mode. Priority may be assigned to a prediction mode that generally and frequently occurs, herein a directional mode may include at least one of vertical, horizontal, or a predetermined diagonal mode, and a non-directional mode may include at least one of a planar mode or a DC mode. Here, the predetermined diagonal mode may a prediction mode having predetermined inclination information, for example, at least one of modes 2, 34, and 66 of FIG. 12 having an angle of 45 degree or −45 degree from a horizontal or vertical mode. Priority may be assigned to other additional diagonal modes.

At least one of the prediction modes to which the priority is assigned may be set as a prediction value of the priority assignment mode. In this case, the prediction mode selected as the prediction value of the priority assignment mode may be prioritized according to a predetermined order, and for example, may be assigned in the order of a Planar mode, a DC mode, a vertical mode, and a horizontal mode.

If one priority assignment mode is supported, a Planar mode may be set as a prediction value, and if two are supported, a Planar mode and a DC mode may be set as a prediction value.

The priority assignment mode may be determined according to one or more elements among state information of a base block (assumed as a target block in this example), an image type, and a color component.

As an example, a candidate group may be constructed through a method for selecting a predetermined prediction mode from the prediction mode candidate group to set as a prediction value of the prediction mode. Here, the method of selecting a predetermined prediction mode may include obtaining a prediction mode of a block adjacent to the base block, obtaining a preset prediction mode, obtaining based on a prediction mode already included in the candidate group, and the like.

In the present invention, a prediction mode included in the candidate group is referred to as a Most Probable Mode (MPM). MPM may be composed of one prediction mode or multiple prediction modes. The number of MPMs may be determined depending on the number of prediction mode candidate groups (k. k is an integer greater than or equal to 1, such as 1, 2, 3, 6, etc.). When the MPM is composed of a plurality of prediction modes, it may be referred to as an MPM candidate group.

The MPM candidate group may be supported under a fixed setting, or an adaptive setting according to various encoding/decoding elements. As an example for an adaptive setting, a candidate group construction may be determined according to which reference pixel layer is used among a plurality of reference pixel layers, and a candidate group construction may be determined depending on whether intra prediction is performed in units of subblocks. have. The fixed setting may mean following a predefined candidate group construction rule regardless of the information.

For convenience of explanation, it is assumed that the MPM candidate group is constructed under one setting, and it should be understood that not only the MPM candidate group but also the candidate group construction for other intra prediction modes may be adaptive.

MPM is a concept supported to efficiently encode a prediction mode, and a candidate group may be constructed with prediction modes with a high probability of occurrence as a prediction mode of the target block.

For example, the MPM candidate group may be constructed with a preset prediction mode (or including at least one of a prediction mode that occurs statistically frequently, DC mode, Planar mode, vertical mode, horizontal mode, or some diagonal modes) or a prediction mode of a neighboring block (at least one position among left, top, top-left, top-right, or bottom-left blocks. For example, left, top blocks). The prediction modes of the neighbor blocks may be obtained from L0 to L3 (left block), T0 to T3 (top block), TL (top-left block), R0 to R3 (top-right block), and B0 to B3 (bottom-left block) in FIG. 15.

If the MPM candidate group may be constructed from two or more subblock positions (e.g., L0 and L2) in a neighbor block (e.g., the left block), the prediction modes of the corresponding block may be constructed in the candidate group according to predefined priorities (e.g., L0-L1-L2). Alternatively, when the MPM candidate group may not be configured from two or more subblock positions, the prediction mode of a subblock at a predefined position (e.g., L0) may be configured in the candidate group. Specifically, prediction modes at positions L3, T3, TL, R0, and B0 in neighbor blocks may be selected as prediction modes of the neighbor blocks and included in the MPM candidate group. The above description is for a case in which the prediction modes of neighbor blocks are configured in a candidate group, which should not be construed as limiting the present disclosure. It is assumed that a prediction mode at a predefined position is configured in a candidate group in the following example.

When one or more prediction modes are included in the MPM candidate group, a mode derived from the previously included one or more prediction modes may be additionally configured in the MPM candidate group. Specifically, when a kth mode (directional mode) is included in the MPM candidate group, a mode derivable from the mode (a mode spaced from the kth mode by a distance of +a or −b where each of a and b is an integer equal to or greater than 1 such as 1, 2, or 3) may be additionally included in the MPM candidate group.

Modes may be prioritized for constructing the MPM candidate group. The MPM candidate group may be constructed to include prediction modes in the order of the prediction mode of a neighbor block, a preset prediction mode, and a derived prediction mode. The process of constructing the MPM candidate group may be completed by filling a maximum number of MPM candidates according to priorities. In the above process, if a prediction mode is identical to a previously included prediction mode, the prediction mode may not be included in the MPM candidate group and the next-priority candidate may be taken and subjected to redundancy check.

The prediction mode may be derived by selectively using either the priority assignment mode or the MPM candidate.

A flag related to the selection information may be generated, and the flag may indicate whether the prediction mode of the target block is set as a priority assignment mode. When the flag is 1, the prediction mode of the target block is set as a priority assignment mode. If not, information on whether the prediction mode of the target block is derived from an MPM candidate, MPM index, and the like may be generated. Here, when the prediction mode of the target block is not derived among the priority assignment mode or the MPM candidate, non-MPM index information, etc., may be generated to derive the prediction mode of the target block among other prediction modes excluding the priority assignment mode and the MPM candidate.

The following will focus on the description of the MPM candidate construction (MPM candidate/non-MPM candidate) for convenience of explanation, and the priority assignment mode is assumed to be a some candidate of the MPM candidate group construction. However, in the case of a configuration in which the priority assignment mode is explicitly supported, it is necessary to understand in consideration that the priority assignment mode is removed in an embodiment to be described later.

The following description is given on the assumption that the MPM candidate group includes 6 prediction modes.

For example, the MPM candidate group may be formed in the order of L-T-TL-TR-BL-Planar-DC-Vertical-Horizontal-Diagonal. The prediction mode of a neighbor block may be included with priority in the MPM candidate group, and then a preset prediction mode may be additionally configured in this case.

Alternatively, the MPM candidate group may be formed in the order of L-T-Planar-DC-<L+1>-<L−1>-<T+1>-<T−1>-Vertical-Horizontal-Diagonal. In this case, the prediction modes of some neighbor blocks and some of preset prediction modes may be included with priority, and a mode derived on the assumption that a prediction mode in a direction similar to that of a neighbor block will be generated and some of preset predictions modes may be additionally included.

The above examples are merely a part of MPM candidate group configurations. The present disclosure is not limited thereto and various modification examples may be available.

The MPM candidate group may be represented by binarization such as unary binarization or truncated Rice binarization based on indexes within the candidate group. That is, short bits may be assigned to a candidate having a small index, and long bits may be assigned to a candidate having a large index, to represent mode bits.

Modes which are not included in the MPM candidate group may be classified as a non-MPM candidate group. Two or more non-MPM candidate groups may be defined according to an encoding/decoding configuration.

The following description is given on the assumption that 67 modes including directional modes and non-directional modes are included in a prediction mode candidate group, 6 MPM candidates are supported, and thus a non-MPM candidate group includes 61 prediction modes.

If one non-MPM candidate group is constructed, this implies that there are remaining prediction modes which are not included in the MPM candidate group, and thus an additional candidate group construction process is not required. Therefore, binarization such as fixed length binarization and truncated unary binarization may be used based on indexes within the non-MPM candidate group.

On the assumption that two or more non-MPM candidate groups are constructed, the non-MPM candidate groups are classified into non-MPM_A (candidate group A) and non-MPM_B (candidate group B). It is assumed that candidate group A (p candidates, where p is equal to or greater than the number of MPM candidates) includes prediction modes with a higher probability of occurrence as the prediction mode of the target block than candidate group B (q candidates, where q is equal to or greater than the number of candidates in candidate group A). Herein, a process of constructing candidate group A may be added.

For example, some equi-distant prediction modes (e.g., modes 2, 4, and 6) among the directional modes may be included in candidate group A or a preset prediction mode (e.g., a mode derived from a prediction mode included in the MPM candidate group) may be included in candidate group A. The remaining prediction modes after the MPM candidate group construction and the candidate group A construction may form candidate group B, and an additional candidate group construction process is not required. Binarization such as fixed length binarization and truncated unary binarization may be used based on indexes in candidate group A and candidate group B.

The above examples are a part of cases in which two or more non-MPM candidate groups are constructed. The present disclosure is not limited thereto, and various modification examples are available.

A process of predicting and encoding a prediction mode will be described below.

Information (mpm_flag) indicating whether the prediction mode of the target block coincides with an MPM (or a mode in the MPM candidate group) may be checked.

When the prediction mode of the target block matches an MPM, MPM index information (mpm_idx) may be additionally checked according to an MPM configuration (one or more configurations). Then, the encoding process of the target block is completed.

When the prediction mode of the target block does not match any MPM, if there is one configured non-MPM candidate group, non-MPM index information (remaining_idx) may be checked. Then, the encoding process of the target block is completed.

If a plurality of non-MPM candidate groups (two in this example) are constructed, information (non_mpm_flag) indicating whether the prediction mode of the target block coincides with any prediction mode in candidate group A may be checked.

If the prediction mode of the target block matches any candidate in candidate group A, index information about candidate group A (non_mpm_A_idx) may be checked, and if the prediction mode of the target block does not match any candidate in candidate group A, candidate B index information (remaining_idx) may be checked. Then, the encoding process of the target block is completed.

When the prediction mode candidate group construction is fixed, a prediction mode supported by the target block, a prediction mode supported by a neighbor block, and a preset prediction mode may use the same prediction number index.

When the prediction mode candidate group construction is adaptive, the prediction mode supported by the target block, the prediction mode supported by the neighbor block, and the preset prediction mode may use the same prediction number index or different prediction number indexes. With reference to FIG. 12, the following description is given.

In the prediction mode encoding process, a process of unifying (or adjusting) prediction mode candidate groups to configure an MPM candidate group or the like may be performed. For example, the prediction mode of the target block may be one prediction mode of a prediction mode candidate group with mode-5 to mode 61, and the prediction mode of a neighbor block may be one prediction mode in a candidate group with mode 2 to mode 66. In this case, since a part (mode 66) of the prediction modes of the neighbor block may not be supported as a prediction mode for the target block, a process of unifying prediction modes in the prediction mode encoding process may be performed. That is, this process may not be required when a fixed intra-prediction mode candidate group construction is supported, and this process may be required when an adaptive intra-prediction mode candidate group construction is supported, which will not be described in detail herein.

Unlike the MPM-based method, encoding may be performed by assigning indexes to the prediction modes of a prediction mode candidate group.

For example, prediction modes are indexed according to their predefined priorities. When a prediction mode is selected as the prediction mode of the target block, the index of the selected prediction mode is encoded. This means a case in which a fixed prediction mode candidate group is constructed and fixed indexes are assigned to prediction modes.

Alternatively, when the prediction mode candidate group is adaptively constructed, the fixed index assignment method may not be suitable. Thus, prediction modes may be indexed according to adaptive priorities. When a prediction mode is selected as the prediction mode of the target block, the selected prediction mode may be encoded. This method may enable effective encoding of a prediction mode because the indexes of the prediction modes are changed due to the adaptive construction of the prediction mode candidate group. That is, the adaptive priorities may be intended to assign a candidate with a high probability of being selected as the prediction mode of the target block to an index for which short mode bits are generated.

The following description is based on the assumption that 8 prediction modes including preset prediction modes (directional modes and non-directional modes), the color copy mode, and the color mode are supported in a prediction mode candidate group (a case of a chrominance component).

For example, it is assumed that preset four modes among the planar, DC, horizontal, vertical, and diagonal modes (diagonal down left in this example), one color mode C, and three color copy modes CP1, CP2, and CP3 are supported. The prediction modes may be indexed basically in the order of preset prediction mode, color copy mode, and color mode.

In this case, the preset prediction modes which are directional modes and non-directional modes, and the color copy mode are prediction modes which are distinguished by prediction methods and thus may easily be identified. However, the color mode may be a directional mode or a non-directional mode, which is likely to overlap with a preset prediction mode. For example, when the color mode is a vertical mode, the color mode may overlap with a vertical mode that is one of the preset prediction modes.

In the case where the number of prediction mode candidates is adaptively adjusted according to an encoding/decoding configuration, when there is a redundant case, the number of candidates may be adjusted (8→7). Alternatively, in the case where the number of prediction mode candidates is kept fixed, when there is a redundant prediction mode, indexes may be assigned by adding and considering another candidate. Further, the adaptive prediction mode candidate group may be supported even when a variable mode such as a color mode is included. Therefore, an adaptive index assignment case may be regarded as an example of configuring an adaptive prediction mode candidate group.

Now, a description will be given of adaptive index assignment according to a color mode. It is assumed that indexes are assigned basically in the order of Planar(0)-Vertical (1)-Horizontal (2)-DC(3)-CP1(4)-CP2(5)-CP3(6)-C(7). Further, if the color mode does not match any preset prediction mode, it is assumed that index assignment is performed in the above order.

For example, if the color mode matches one of the preset prediction modes (the planar, vertical, horizontal, and DC modes), a prediction mode matching the index 7 of the color mode is filled. A preset prediction mode (diagonal down left) is filled at the index (one of 0 to 3) of the matching prediction mode. Specifically, when the color mode is a horizontal mode, indexes may be assigned in the order of Planar(0)-Vertical (1)-Diagonal down left(2)-DC(3)-CP1 (4)-CP2(5)-CP3(6)-Horizontal(7).

Alternatively, when the color mode matches one of the preset prediction modes, the matching prediction mode is filled at index 0, and a preset prediction mode (diagonal down left) is filled at the index 7 of the color mode. In this case, if the filled prediction mode is not the existing index 0 (that is, it is not the planar mode), the existing index configuration may be adjusted. Specifically, when the color mode is the DC mode, indexes may be assigned in the order of DC(0)-Planar(1)-Vertical(2)-Horizontal(3)-CP1(4)-CP2 (5)-CP3(6)-Diagonal down left (7).

The above example is a mere part of adaptive index assignments. The present disclosure is not limited thereto, and various modification examples may be available. Further, binarization such as fixed length binarization, unary binarization, truncated unary binarization, and truncated Rice binarization may be used based on the indexes in the candidate group.

Another example of performing encoding by assigning indexes to prediction modes belonging to a prediction mode candidate group will be described.

For example, prediction modes and prediction methods are classified into a plurality of prediction mode candidate groups and an index is assigned to a prediction mode belonging to a corresponding candidate group and then encoded. In this case, encoding of candidate group selection information may precede the index encoding. For example, a directional mode, a non-directional mode, and a color mode, which are prediction modes in which prediction is performed in the same color space, may belong to one candidate group (referred to as candidate group S), and a color copy mode, which is a prediction mode in which prediction is performed in a different color space, may belong to another candidate group (referred to as candidate group D).

The following description is based on the assumption that 9 prediction modes including preset prediction modes, a color copy mode, and a color mode are supported in a prediction mode candidate group (a case of a chrominance component).

For example, it is assumed that four preset prediction modes are supported from among the planar, DC, horizontal, vertical, and diagonal modes, one color mode C, and four color copy modes CP1, CP2, CP3, and CP4 are supported. Candidate group S may include 5 candidates being the preset prediction modes and the color mode, and candidate group D may include 4 candidates being the color copy modes.

Candidate group S is an example of an adaptively constructed prediction mode candidate group. An example of adaptive index assignment has been described above, and thus will not be described in detail herein. Since candidate group D is an example of a fixed prediction mode candidate group, a fixed index assignment method may be used. For example, indexes may be assigned in the order of CP1(0)-CP2(1)-CP3(2)-CP4(3).

Binarization such as fixed length binarization, unary binarization, truncated unary binarization, and truncated Rice binarization may be used based on indexes within the candidate group. The present disclosure is not limited to the above example, and various modification examples may also be available.

A candidate group such as an MPM candidate group for prediction mode encoding may be constructed at the block level. Alternatively, the process of constructing a candidate group may be omitted, and a predetermined candidate group or a candidate group obtained in various methods may be used. This may be a configuration supported for the purpose of reducing complexity.

In Example 1, one predefined candidate group may be used, or one of a plurality of predefined candidate groups may be used according to an encoding/decoding setting. For example, in the case of an MPM candidate group, a predefined candidate group of, for example, Planar-DC-vertical-horizontal-Diagonal down left (66 in FIG. 12)-Diagonal down right (34 in FIG. 12} may be used. Alternatively, it may be possible to apply a candidate group constructed when neighbor blocks are all unavailable, among MPM candidate group constructions.

In Example 2, a candidate group for a block which has been completely encoded may be used. The encoded block may be selected based on a coding order (a predetermined scanning scheme such as z-scan, vertical scan, horizontal scan, or the like), or from among blocks neighboring to the base block, such as the left, top, top-left, top-right, and bottom-left blocks. However, the neighbor blocks may be limited to blocks at the positions of partition units which may be mutually referenced with the base block (e.g., partition units having properties to which reference can be made even though the blocks belong to different slices or tiles, such as different tiles belonging to the same tile group). If a neighbor block belongs to a partition unit which does not allow referencing (e.g., when each block belongs to a different slice or tile and has properties which may not be mutually referenced to, for example, when each block belongs to a different block group), the block at the position may be excluded from candidates.

In this case, neighbor blocks may be determined according to the state of the base block. For example, when the base block is square, a candidate group of available blocks may be borrowed (or shared) from among blocks located according to a predetermined first priority. Alternatively, when the base block is rectangular, a candidate group of available blocks may be borrowed from among blocks located according to a predetermined second priority. The second or third priority may be supported according to the width-height ratio of the block. For selecting candidate blocks to be borrowed, priorities may be set in various configurations, such as left-top-top-right-bottom-left-top-left, or top-left-top-left-top-right-bottom-left. In this case, all of the first to third priorities may have the same configuration or different configurations, or a part of the priorities may have the same configuration.

A candidate group for the base block may be borrowed from neighbor blocks, only at or above/above a predetermined boundary value, or only at or below/below a predetermined boundary value. The boundary value may be defined as a minimum or maximum block size that allows borrowing of a candidate group. The boundary value may be represented as the width (W) of a block, the height (H) of the block, W×H, W*H, or the like, where each of W and H may be an integer equal to or greater than 4, 8, 16, or 32.

In Example 3, a common candidate group may be formed from a higher block being a predetermined group of blocks. The common candidate group may be used for lower blocks belonging to the higher block. The number of lower blocks may be an integer equal to or greater than 1, such as 1, 2, 3, or 4.

In this case, the higher block may be an ancestor block (including a parent block) of the lower blocks, or may be an arbitrary group of blocks. An ancestor block may refer to a pre-partitioning block in a previous step (a partitioning depth difference of 1 or more) during partitioning for obtaining lower blocks. For example, the parent block of sub-blocks 0 and 1 of 4N×2N in candidate b of FIG. 4 may be 4N×4N of candidate a in FIG. 4.

The candidate group for the higher block may be borrowed (or shared) from the lower blocks, only at or above/above a predetermined first boundary value or only at or below/below a predetermined second boundary value.

The boundary value may be defined as the minimum size or maximum size of a block for which candidate group borrowing is allowed. Only one or both of the boundary values may be supported, and the boundary value may be expressed as the width W, height H, W×H, W*H, or the like of the block, where each of W and His an integer of 8, 16, 32, 64 or higher.

On the other hand, a candidate group for a lower block may be borrowed from a higher block, only at or above/above a predetermined third boundary value. Alternatively, a candidate group for a lower block may be borrowed from a higher block, only at or below/below a predetermined fourth boundary value.

In this case, the boundary value may be defined as the minimum size or maximum size of a block for which candidate group borrowing is allowed. Only one or both of the boundary values may be supported, and the boundary value may be expressed as the width W, height H, W×H, W*H, or the like of the block, where each of W and H is an integer of 4, 8, 16, 32, or higher.

In this case, the first boundary value (or the second boundary value) may be equal to or greater than the third boundary value (or the fourth boundary value).

Candidate borrowing (or sharing) may be selectively used based on any one of the above-described embodiments, and candidate group borrowing may be selectively used based on a combination of at least two of the first to third embodiments. Further, candidate group borrowing may be selectively used based on any of the detailed configurations of the embodiments, and may be selectively used according to a combination of one or more of the detailed configurations.

Further, information indicating whether a candidate group is borrowed, information about block attributes (size/type/position/width-height ratio) involved in the candidate group borrowing, and information about a partition state (a partition scheme, a partition type, a partitioning depth, and so on) may be explicitly processed. In addition, encoding factors such as an image type and a color component may act as input variables in a candidate group borrowing setting. The candidate group borrowing may be performed based on the information and an encoding/decoding setting.

Prediction-related information generated by the prediction mode encoder may be transmitted to the encoding unit and included in a bitstream.

In the above description, the base block may be determined as one of a target block (coding block, prediction block) or a relative block (upper block), and a description thereof may be derived through the above-described example.

In addition, the explanation was made on the assumption that the adjacent block referred to for constructing the prediction mode candidate group may have the high or low correlation with the base block, but the prediction mode of the corresponding block is not included in the candidate group when constructing the candidate group based on the correlation between blocks. Alternatively, it can be derived from the above example that a setting for changing the candidate group construction ranking to a lower ranking may be applied.

The methods of the present disclosure may be implemented as program instructions executable by various computer means, and recorded in a computer-readable medium. The computer-readable medium may include program instructions, data files, and data structures alone or in combination. The program instructions recorded on the computer-readable medium may be specially designed for the present disclosure or known to those skilled in the art of computer software and thus available.

The computer-readable medium may include a hardware device specially adapted to store and execute program instructions, such as a read only memory (ROM), a random access memory (RAM), a flash memory, and the like. Program instructions may include machine language code that is produced by a compiler or high-level language code that may be executed in a computer by an interpreter. The above-described hardware device may be configured to operate as one or more software modules in order to perform operations according to the present disclosure, and vice versa.

Further, the above-described method or apparatus may be implemented in full or partial combination or separation of its configurations or functions.

While the present disclosure has been described above with reference to preferred embodiments of the present disclosure, those skilled in the art will understand that various modifications and variations can be made to the present disclosure without departing from the scope and spirit of the present disclosure.

INDUSTRIAL APPLICABILITY

The present invention may be used to encode/decode an image.

The invention claimed is:

1. An image decoding method performed by an image decoding apparatus, comprising:

determining an intra prediction mode of a current block;

determining a reference pixel of the current block; and predicting the current block based on the intra prediction mode and the reference pixel, wherein the current block is predicted by interpolating a reference sample on a fractional location by reference sample interpolation filtering based on reference samples on integer locations, either fixed filtering or adaptive filtering is selected for reference sample interpolation filtering based on a color component of the current block, where the fixed filtering is selected, a fixed interpolation filter is applied for reference sample interpolation filtering, where the adaptive filtering is selected, one interpolation filter is selected from a plurality of interpolation filters and applied for reference sample interpolation filtering, the interpolation of the reference sample at the fractional location is not performed where the intra prediction mode of the current block is determined to be an intra prediction mode that only refers to a pixel at an integer location.

2. The method of claim 1, wherein the plurality of interpolation filters for the adaptive filtering includes at least one of a four-tap smoothing filter or a four-tap DCT filter.

3. An image encoding method performed by an image encoding apparatus, comprising:

determining an intra prediction mode of a current block;

determining a reference pixel of the current block; and predicting the current block based on the intra prediction mode and the reference pixel, wherein the current block is predicted by interpolating a reference sample on a fractional location by reference sample interpolation filtering based on reference samples on integer locations, either fixed filtering or adaptive filtering is selected for reference sample interpolation filtering based on a color component of the current block, where the fixed filtering is selected, a fixed interpolation filter is applied for reference sample interpolation filtering, where the adaptive filtering is selected, one interpolation filter is selected from a plurality of interpolation filters and applied for reference sample interpolation filtering, the interpolation of the reference sample at the fractional location is not performed where the intra prediction mode of the current block is determined to be an intra prediction mode that only refers to a pixel at an integer location.

4. The method of claim 3, wherein the plurality of interpolation filters for the adaptive filtering includes at least one of a four-tap smoothing filter or a four-tap DCT filter.

5. A bitstream transmitting method comprising:

generating a bitstream to be decoded by an image decoding method; and transmitting the bitstream, and wherein the image decoding method comprises:

determining an intra prediction mode of a current block;

determining a reference pixel of the current block; and predicting the current block based on the intra prediction mode and the reference pixel, wherein the current block is predicted by interpolating a reference sample on a fractional location by reference sample interpolation filtering based on reference samples on integer locations, either fixed filtering or adaptive filtering is selected for reference sample interpolation filtering based on a color component of the current block, where the fixed filtering is selected, a fixed interpolation filter is applied for reference sample interpolation filtering, where the adaptive filtering is selected, one interpolation filter is selected from a plurality of interpolation filters and applied for reference sample interpolation filtering, the interpolation of the reference sample at the fractional location is not performed where the intra prediction mode of the current block is determined to be an intra prediction mode that only refers to a pixel at an integer location.

6. The method of claim 5, wherein the plurality of interpolation filters for the adaptive filtering includes at least one of a four-tap smoothing filter or a four-tap DCT filter.

* * * * *